United States Patent
Fachan et al.

(10) Patent No.: US 7,900,015 B2
(45) Date of Patent: Mar. 1, 2011

(54) SYSTEMS AND METHODS OF QUOTA ACCOUNTING

(75) Inventors: Neal T. Fachan, Seattle, WA (US); Peter J. Godman, Seattle, WA (US); Justin M. Husted, Seattle, WA (US); Aaron J. Passey, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 730 days.

(21) Appl. No.: 11/787,117

(22) Filed: Apr. 13, 2007

(65) Prior Publication Data

US 2008/0256537 A1    Oct. 16, 2008

(51) Int. Cl.
 G06F 12/00    (2006.01)

(52) U.S. Cl. .......................... 711/172; 711/163

(58) Field of Classification Search .................. 711/172, 711/163
See application file for complete search history.

(56) References Cited

U.S. PATENT DOCUMENTS

| | | |
|---|---|---|
| 4,780,796 A | 10/1988 | Fukuda et al. ............... 361/525 |
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,459,871 A | 10/1995 | Van Den Berg |
| 5,481,699 A | 1/1996 | Saether |
| 5,548,724 A | 8/1996 | Akizawa et al. |
| 5,548,795 A | 8/1996 | Au |
| 5,568,629 A | 10/1996 | Gentry et al. |
| 5,596,709 A | 1/1997 | Bond et al. |
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |

(Continued)

FOREIGN PATENT DOCUMENTS

EP    0774723    5/1997

(Continued)

OTHER PUBLICATIONS 3,4-polyethylenedioxythiophene (PEDT): Conductive coatings technical applications and properties, Synthetic Metal,s, vol. 85 (1-3) (1997) pp. 1397-1398, Jonas et al. Abstract.

(Continued)

*Primary Examiner* — Yong Choe
(74) *Attorney, Agent, or Firm* — Knobbe, Martens, Olson & Bear, LLP

(57) ABSTRACT

Embodiments of the invention relate generally to incremental computing. Specifically, embodiments of the invention include systems and methods that provide for the concurrent processing of multiple, incremental changes to a data value while at the same time monitoring and/or enforcing threshold values for that data value. For example, a method is provided that implements domain quotas within a data storage system.

19 Claims, 31 Drawing Sheets

U.S. PATENT DOCUMENTS

| | | | |
|---|---|---|---|
| 5,774,643 A | 6/1998 | Lubbers et al. | |
| 5,799,305 A | 8/1998 | Bortvedt et al. | |
| 5,805,578 A | 9/1998 | Stirpe et al. | |
| 5,805,900 A | 9/1998 | Fagen et al. | |
| 5,806,065 A | 9/1998 | Lomet | |
| 5,822,790 A | 10/1998 | Mehrotra | |
| 5,862,312 A | 1/1999 | Mann | |
| 5,870,563 A | 2/1999 | Roper et al. | |
| 5,878,410 A | 3/1999 | Zbikowski et al. | |
| 5,878,414 A | 3/1999 | Hsiao et al. | |
| 5,884,046 A | 3/1999 | Antonov | |
| 5,884,098 A | 3/1999 | Mason, Jr. | |
| 5,884,303 A | 3/1999 | Brown | |
| 5,890,147 A | 3/1999 | Peltonen et al. | |
| 5,917,998 A | 6/1999 | Cabrera et al. | |
| 5,933,834 A | 8/1999 | Aichelen | |
| 5,943,690 A | 8/1999 | Dorricott et al. | |
| 5,966,707 A | 10/1999 | Van Huben et al. | |
| 5,996,089 A | 11/1999 | Mann | |
| 6,000,007 A | 12/1999 | Leung et al. | |
| 6,014,669 A | 1/2000 | Slaughter et al. | |
| 6,021,414 A | 2/2000 | Fuller | |
| 6,029,168 A | 2/2000 | Frey | |
| 6,038,570 A | 3/2000 | Hitz et al. | |
| 6,044,367 A | 3/2000 | Wolff | |
| 6,052,759 A | 4/2000 | Stallmo et al. | |
| 6,055,543 A | 4/2000 | Christensen et al. | |
| 6,055,564 A | 4/2000 | Phaal | |
| 6,070,172 A | 5/2000 | Lowe | |
| 6,081,833 A | 6/2000 | Okamoto et al. | |
| 6,081,883 A | 6/2000 | Popelka et al. | |
| 6,108,759 A | 8/2000 | Orcutt et al. | |
| 6,117,181 A | 9/2000 | Dearth et al. | |
| 6,122,754 A | 9/2000 | Litwin et al. | |
| 6,136,176 A | 10/2000 | Wheeler et al. | 205/328 |
| 6,138,126 A | 10/2000 | Hitz et al. | |
| 6,154,854 A | 11/2000 | Stallmo | |
| 6,173,374 B1 | 1/2001 | Heil et al. | |
| 6,202,085 B1 | 3/2001 | Benson et al. | |
| 6,209,059 B1 | 3/2001 | Ofer et al. | |
| 6,219,693 B1 | 4/2001 | Napolitano et al. | |
| 6,279,007 B1 | 8/2001 | Uppala | |
| 6,321,345 B1 | 11/2001 | Mann | |
| 6,334,168 B1 | 12/2001 | Islam et al. | |
| 6,334,966 B1 | 1/2002 | Hahn et al. | 252/500 |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,393,483 B1 | 5/2002 | Latif et al. | |
| 6,397,311 B1 | 5/2002 | Capps | |
| 6,405,219 B2 | 6/2002 | Saether et al. | |
| 6,408,313 B1 | 6/2002 | Campbell et al. | |
| 6,415,259 B1 | 7/2002 | Wolfinger et al. | |
| 6,421,781 B1 | 7/2002 | Fox et al. | |
| 6,434,574 B1 | 8/2002 | Day et al. | |
| 6,449,730 B2 | 9/2002 | Mann et al. | |
| 6,453,389 B1 | 9/2002 | Weinberger et al. | |
| 6,457,139 B1 | 9/2002 | D'Errico et al. | |
| 6,463,442 B1 | 10/2002 | Bent et al. | |
| 6,496,842 B1 | 12/2002 | Lyness | |
| 6,499,091 B1 | 12/2002 | Bergsten | |
| 6,502,172 B2 | 12/2002 | Chang | |
| 6,502,174 B1 | 12/2002 | Beardsley et al. | |
| 6,523,130 B1 | 2/2003 | Hickman et al. | |
| 6,526,478 B1 | 2/2003 | Kirby | |
| 6,546,443 B1 | 4/2003 | Kakivaya et al. | |
| 6,549,513 B1 | 4/2003 | Chao et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1 | 5/2003 | Larson | |
| 6,571,349 B1 | 5/2003 | Mann | |
| 6,574,745 B2 | 6/2003 | Mann | |
| 6,594,655 B2 | 7/2003 | Tal et al. | |
| 6,594,660 B1 | 7/2003 | Berkowitz et al. | |
| 6,594,744 B1 | 7/2003 | Humlicek et al. | |
| 6,598,174 B1 | 7/2003 | Parks et al. | |
| 6,618,798 B1 | 9/2003 | Burton et al. | |
| 6,631,411 B1 | 10/2003 | Welter et al. | |
| 6,658,554 B1 | 12/2003 | Moshovos et al. | |
| 6,662,184 B1 | 12/2003 | Friedberg | |
| 6,671,686 B2 | 12/2003 | Pardon et al. | |
| 6,671,704 B1 | 12/2003 | Gondi et al. | |
| 6,687,805 B1 | 2/2004 | Cochran | |
| 6,725,392 B1 | 4/2004 | Frey et al. | |
| 6,732,125 B1 | 5/2004 | Autrey et al. | |
| 6,742,020 B1 | 5/2004 | Dimitroff et al. | |
| 6,748,429 B1 | 6/2004 | Talluri et al. | |
| 6,801,949 B1 | 10/2004 | Bruck et al. | |
| 6,848,029 B2 | 1/2005 | Coldewey | |
| 6,856,591 B1 | 2/2005 | Ma et al. | |
| 6,871,295 B2 | 3/2005 | Ulrich et al. | |
| 6,895,482 B1 | 5/2005 | Blackmon et al. | |
| 6,895,534 B2 | 5/2005 | Wong et al. | |
| 6,907,011 B1 | 6/2005 | Miller et al. | |
| 6,907,520 B2 | 6/2005 | Parady | |
| 6,917,942 B1 | 7/2005 | Burns et al. | |
| 6,920,494 B2 | 7/2005 | Heitman et al. | |
| 6,922,696 B1 | 7/2005 | Lincoln et al. | |
| 6,922,708 B1 | 7/2005 | Sedlar | |
| 6,934,878 B2 | 8/2005 | Massa et al. | |
| 6,940,966 B2 | 9/2005 | Lee | |
| 6,954,435 B2 | 10/2005 | Billhartz et al. | |
| 6,990,604 B2 | 1/2006 | Binger | |
| 6,990,611 B2 | 1/2006 | Busser | |
| 7,007,044 B1 | 2/2006 | Rafert et al. | |
| 7,007,097 B1 | 2/2006 | Huffman et al. | |
| 7,017,003 B2 | 3/2006 | Murotani et al. | |
| 7,043,485 B2 | 5/2006 | Manley et al. | |
| 7,043,567 B2 | 5/2006 | Trantham | |
| 7,069,320 B1 | 6/2006 | Chang et al. | |
| 7,103,597 B2 | 9/2006 | McGoveran | |
| 7,111,305 B2 | 9/2006 | Solter et al. | |
| 7,113,938 B2 | 9/2006 | Highleyman et al. | |
| 7,124,264 B2 | 10/2006 | Yamashita | |
| 7,146,524 B2 | 12/2006 | Patel et al. | |
| 7,152,182 B2 | 12/2006 | Ji et al. | |
| 7,177,295 B1 | 2/2007 | Sholander et al. | |
| 7,181,746 B2 | 2/2007 | Perycz et al. | |
| 7,184,421 B1 | 2/2007 | Liu et al. | |
| 7,194,487 B1 | 3/2007 | Kekre et al. | |
| 7,206,805 B1 | 4/2007 | McLaughlin, Jr. | |
| 7,225,204 B2 | 5/2007 | Manley et al. | |
| 7,228,299 B1 | 6/2007 | Harmer et al. | |
| 7,240,235 B2 | 7/2007 | Lewalski-Brechter | |
| 7,249,118 B2 | 7/2007 | Sandler et al. | |
| 7,257,257 B2 | 8/2007 | Anderson et al. | |
| 7,290,056 B1 | 10/2007 | McLaughlin, Jr. | |
| 7,313,614 B2 | 12/2007 | Considine et al. | |
| 7,318,134 B1 | 1/2008 | Oliveira et al. | |
| 7,346,720 B2 | 3/2008 | Fachan | |
| 7,370,064 B2 | 5/2008 | Yousefi'zadeh | |
| 7,373,426 B2 | 5/2008 | Jinmei et al. | |
| 7,386,675 B2 | 6/2008 | Fachan | |
| 7,386,697 B1 | 6/2008 | Case et al. | |
| 7,440,966 B2 | 10/2008 | Adkins et al. | |
| 7,451,341 B2 | 11/2008 | Okaki et al. | |
| 7,509,448 B2 | 3/2009 | Fachan et al. | |
| 7,509,524 B2 | 3/2009 | Patel et al. | |
| 7,533,298 B2 | 5/2009 | Smith et al. | |
| 7,546,354 B1 | 6/2009 | Fan et al. | |
| 7,546,412 B2 | 6/2009 | Ahmad et al. | |
| 7,551,572 B2 | 6/2009 | Passey et al. | |
| 7,558,910 B2 | 7/2009 | Alverson et al. | |
| 7,571,348 B2 | 8/2009 | Deguchi et al. | |
| 7,577,258 B2 | 8/2009 | Wiseman et al. | |
| 7,577,667 B2 | 8/2009 | Hinshaw et al. | |
| 7,590,652 B2 | 9/2009 | Passey et al. | |
| 7,593,938 B2 | 9/2009 | Lemar et al. | |
| 7,596,713 B2 | 9/2009 | Mani-Meitav et al. | |
| 7,631,066 B1 | 12/2009 | Schatz et al. | |
| 7,676,691 B2 | 3/2010 | Fachan et al. | |
| 7,680,836 B2 | 3/2010 | Anderson et al. | |
| 7,680,842 B2 | 3/2010 | Anderson et al. | |
| 7,685,126 B2 | 3/2010 | Patel et al. | |
| 7,689,597 B1 | 3/2010 | Bingham et al. | |
| 7,716,262 B2 | 5/2010 | Pallapotu | |

| | | |
|---|---|---|
| 7,739,288 B2 | 6/2010 | Lemar et al. |
| 7,743,033 B2 | 6/2010 | Patel et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,822,932 B2 | 10/2010 | Fachan et al. |
| 7,840,536 B1 | 11/2010 | Ahal et al. |
| 7,870,345 B2 | 1/2011 | Issaquah et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0029200 A1 | 3/2002 | Dulin et al. |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 | 6/2002 | Cheng |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0107877 A1 | 8/2002 | Whiting et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 | 1/2003 | Giotta et al. |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0126522 A1 | 7/2003 | English et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158873 A1 | 8/2003 | Sawdon et al. |
| 2003/0161302 A1 | 8/2003 | Zimmermann et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182325 A1 | 9/2003 | Manley et al. |
| 2003/0233385 A1 | 12/2003 | Srinivasa et al. |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078680 A1 | 4/2004 | Hu et al. |
| 2004/0078812 A1 | 4/2004 | Calvert |
| 2004/0117802 A1 | 6/2004 | Green |
| 2004/0133670 A1 | 7/2004 | Kaminsky et al. |
| 2004/0143647 A1 | 7/2004 | Cherkasova |
| 2004/0153479 A1 | 8/2004 | Mikesell et al. |
| 2004/0158549 A1 | 8/2004 | Matena et al. |
| 2004/0174798 A1 | 9/2004 | Riguidel et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 | 12/2004 | Matthews et al. |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 | 2/2005 | Price |
| 2005/0044197 A1 | 2/2005 | Lai |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131990 A1 | 6/2005 | Jewell |
| 2005/0138195 A1 | 6/2005 | Bono |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094452 A1 | 4/2007 | Fachan |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0255765 A1 | 11/2007 | Robinson |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |
| 2008/0154978 A1 | 6/2008 | Lemar et al. |

| | | | |
|---|---|---|---|
| 2008/0155191 | A1 | 6/2008 | Anderson et al. |
| 2008/0168304 | A1 | 7/2008 | Flynn et al. |
| 2008/0168458 | A1 | 7/2008 | Fachan et al. |
| 2008/0243773 | A1 | 10/2008 | Patel et al. |
| 2008/0256103 | A1 | 10/2008 | Fachan et al. |
| 2008/0256545 | A1 | 10/2008 | Akidau et al. |
| 2008/0294611 | A1 | 11/2008 | Anglin et al. |
| 2009/0055399 | A1 | 2/2009 | Lu et al. |
| 2009/0055604 | A1 | 2/2009 | Lemar et al. |
| 2009/0055607 | A1 | 2/2009 | Schack et al. |
| 2009/0125563 | A1 | 5/2009 | Wong et al. |
| 2009/0210880 | A1 | 8/2009 | Fachan et al. |
| 2009/0248756 | A1 | 10/2009 | Akidau et al. |
| 2009/0248765 | A1 | 10/2009 | Akidau et al. |
| 2009/0248975 | A1 | 10/2009 | Daud et al. |
| 2009/0249013 | A1 | 10/2009 | Daud et al. |
| 2009/0252066 | A1 | 10/2009 | Passey et al. |
| 2009/0327218 | A1 | 12/2009 | Passey et al. |
| 2010/0161556 | A1 | 6/2010 | Anderson et al. |
| 2010/0161557 | A1 | 6/2010 | Anderson et al. |
| 2010/0185592 | A1 | 7/2010 | Kryger |
| 2010/0223235 | A1 | 9/2010 | Fachan |
| 2010/0235413 | A1 | 9/2010 | Patel |
| 2010/0241632 | A1 | 9/2010 | Lemar et al. |
| 2010/0306786 | A1 | 12/2010 | Passey et al. |

FOREIGN PATENT DOCUMENTS

| | | |
|---|---|---|
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |
| WO | WO 2008/127947 | 10/2008 |

OTHER PUBLICATIONS

Nov. 15, 2002 International Search Report PCT/US02/24728.
Apr. 20, 2004 International Search Report PCT/US03/36699.
Aug. 6, 2004 International Search Report PCT/US03/33704.
European Search Report dated May 21, 2007 issued to EP application No. 02756944.1-2201.
Philip A. Bernstein, Vassos Hadzilacos, and Nathan Goodman, Concurrency Control and Recovery in Database Systems, Addison-Wesley, 1987.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, Building Secure and Reliable Network Applications, Manning, 1996, pp. 1-327.
Kenneth P. Birman, Building Secure and Reliable Network Applications, Manning, 1996, pp. 328-619.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. 1-328.
Jim Gray and Andreas Reuter, Transaction Processing: Concepts and Techniques, Morgan Kaufmann, 1993, pp. 329-664.
Jim Gray and Andreas Reuter, Transaction Processing: Concepts and Techniques, Morgan Kaufmann, 1993, pp. 665-1105.
Nancy A. Lynch, Distributed Algorithms, Morgan Kaufmann, 1996, pp. 1-409.
Nancy A. Lynch, Distributed Algorithms, Morgan Kaufmann, 1996 pp. 410-871.
Sape Mullender, editor, Distributed Systems (2nd Ed.), ACM Press/ Addison-Wesley Publishing Co., New York, NY, USA, 1993, pp. 1-327.
Sape Mullender, editor, Distributed Systems (2nd Ed.), ACM Press/ Addison-Wesley Publishing Co., New York, NY, USA, 1993, pp. 328-604.
Gibson, Garth A. et al., The Scotch Parallel Storage System, IEEE, 1995, pp. 403-410.
Gerhard Weikum, et al., Transactional Information Systems: Theory, Algorithms, and the Practice of Concurrency Control and Recovery, Morgan Kaufmann, 2002, pp. 1-450.
Gerhard Weikum, et al., Transactional Information Systems: Theory, Algorithms, and the Practice of Concurrency Control and Recovery, Morgan Kaufmann, 2002, pp. 451-863.
Sanjay Ghemawat et al., The Google File System, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Bob Duzett, et al., An Overview of the nCube 3 Supercomputer, IEEE, Jul. 1992, pp. 458-464.
John Henry Hartman, The Zebra Striped Network File System, (Sc.B. (Brown University) 1987, pp. 1-148.
Darrell D.E, Long et al., Swift/RAID: A Distributed Raid System, Computing Systems, vol. 7, No. 3 Summer 1994, pp. 333-359.
Michael Stonebraker et al., Distributed Raid: A new Multiple copy Algorithm, IEEE 1990, pp. 430-434, Berkeley, California.
Stallings, William, Operating Systems, Prentice Hall, Fourth Edition; 2001, pp. 197-253 and 265-293.
United States Court of Appeals, Federal Circuit, Seachange International, Inc. Vs. nCUBE, Corp., Oct. 26, 2004, 28 pages.
United States Court of Appeals, Federal Circuit, Seachange International, Inc. Vs. C-Corp, Inc., Jun. 29, 2005, 22 pages.
United States District Court, Delaware, Seachange International, Inc. Vs. nCUBE, Corp., Apr. 7, 2004, 13 pages.
United States District Court, Delaware, Seachange International, Inc. Vs. nCUBE, Corp., Aug. 29, 2000, 12 pages.
Feb. 22, 2008 Int'l Search report PCT/US07/018326, 20 pages.
May 8, 2008 Int'l Search report PCT/US07/018324, 13 pages.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1-p. 447, last line.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.

MCSA/MSCE/MCDBA Self Paced Training Kit: MS SQL Server 2000 System Administration, May 14, 2003, Microsoft Press, Second Edition, 12 pages.

Supp EPO Search Report, App. No. EP 03 78 3599; dated Apr. 29, 2008, 2 pages.

Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.

Haerder T et al: "Principles of Transaction-Oriented Database Recovery" ACM Computing Surveys, ACM, New York, NY, US, vol. 15, No. 4, Dec. 1, 1983, pp. 287-317.

Gray J et al: "Transaction processing: concepts and techniques (excerpt), Passage" Transaction Processing: Concepts and Techniques, Jan. 1, 1993, pp. 373-445.

Garcia-Molina H et al: "Database System Implementation, passage" Database System Implementation, Jan. 1, 2000, pp. I-V, 423-509.

Wedde H. F., et al.: "A universal framework for managing metadata in the distributed Dragon Slayer System", Proceedings of the Euromicro Conference. Euromicro. Informatics: Inventing the Future, Proceedings of Euromicro Workshop On Multimedia and Telecommunications, vol. 2, Sep. 5, 2000, pp. 96-101.

Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.

Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.

Lougher P. et al., "Scalable storage servers for digital audio and video". Storage and Recording Systems, 1994. International Conference on Keele, UK, London. Jan. 1, 1994 pp. 140-143.

May 18, 2009 Int'l Search report PCT/US08/059798, 18 pages.

Oct. 8, 2008 European Supplemental Search Report EP 02 75 6944, 6 pages.

Jan. 23, 2009 Examination Report EP 02 75 6944, 5 pages.

Oct. 22, 2009 Int'l Preliminary Report on Patentability PCT/US08/059798, 10 pages.

Keidar, et al.: Increasing the Resilience of Distributed and Replicated Database Systems (1998) pp. 1-25.

Reddy, P. Krishna et al., Reducing the blocking in two phase commit with backup sites Apr. 15, 2003, Elsevier, pp. 39-47.

IOS Commands, Feb. 6, 2005, Pantz.org, [online], <web.archive.org/web/20050206184604/http://pantz.org/os/ios/ioscommands.shtml>, pp. 1-12 as printed.

IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.

Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.

Yoshitake Shinkai, Cluster File System: HAMFS, Fujitsu, Japan, Fujitsu Limited, Jul. 9, 1999, vol. 50, No. 4, pp. 210 to 214 (stamped Citation 2 / English Translation attached) total 16 pages.

Sep. 18, 2009 Office Action in U.S. Appl. No. 11/787,225, filed Apr. 13, 2007.

Nov. 17, 2009 Amendment and Response to Office Action Dated Sep. 18, 2009 in U.S. Appl. No. 11/787,225, filed Apr. 13, 2007.

Apr. 12, 2010 Notice of Allowance in U.S. Appl. No. 11/787,2251 filed Apr. 13, 2007.

Jun. 10, 2010 Amendment After Notice of Allowance Dated Apr. 12, 2010 in U.S. Appl. No. 11/787,225, filed Apr. 13, 2007.

Jun. 29, 2010 Response to Rule 312 Communication in U.S. Appl. No. 11/787,225, filed Apr. 13, 2007.

Duchamp, Dan: "Analysis of Transaction Management Performance", ACM Symposium on Operating Systems Principles, Dec. 1989, pp. 177-190.

Silaghi, Raul et al.: "Porting OMTTs to Corba", Lecture Notes in Computer Science, vol. 2888/2003, Nov. 2003, pp. 1521-1542.

Dorai et al.:, "Transport Threads: Resource Sharing in SMT Processor for High Single-Thread Performance", proceedings of the 2002 International Conference on Parallel Architectures and Complication Techniques, Sep. 2002, 12 pages.

Peterson, Zachary Nathaniel Joseph, "Data Placement for Copy-On-Write Using Virtual Contiguity," Master of Science in Computer Science Thesis, University of California, Santa Cruz, Sep. 2002, 67 pages.

Jul. 28, 2010 Issue Notification in U.S. Appl. No. 11/787,225 filed on Apr. 13, 2007.

Nov. 16, 2010 Office Action in U.S. Appl. No. 12/832,904, filed on Jul. 8, 2010.

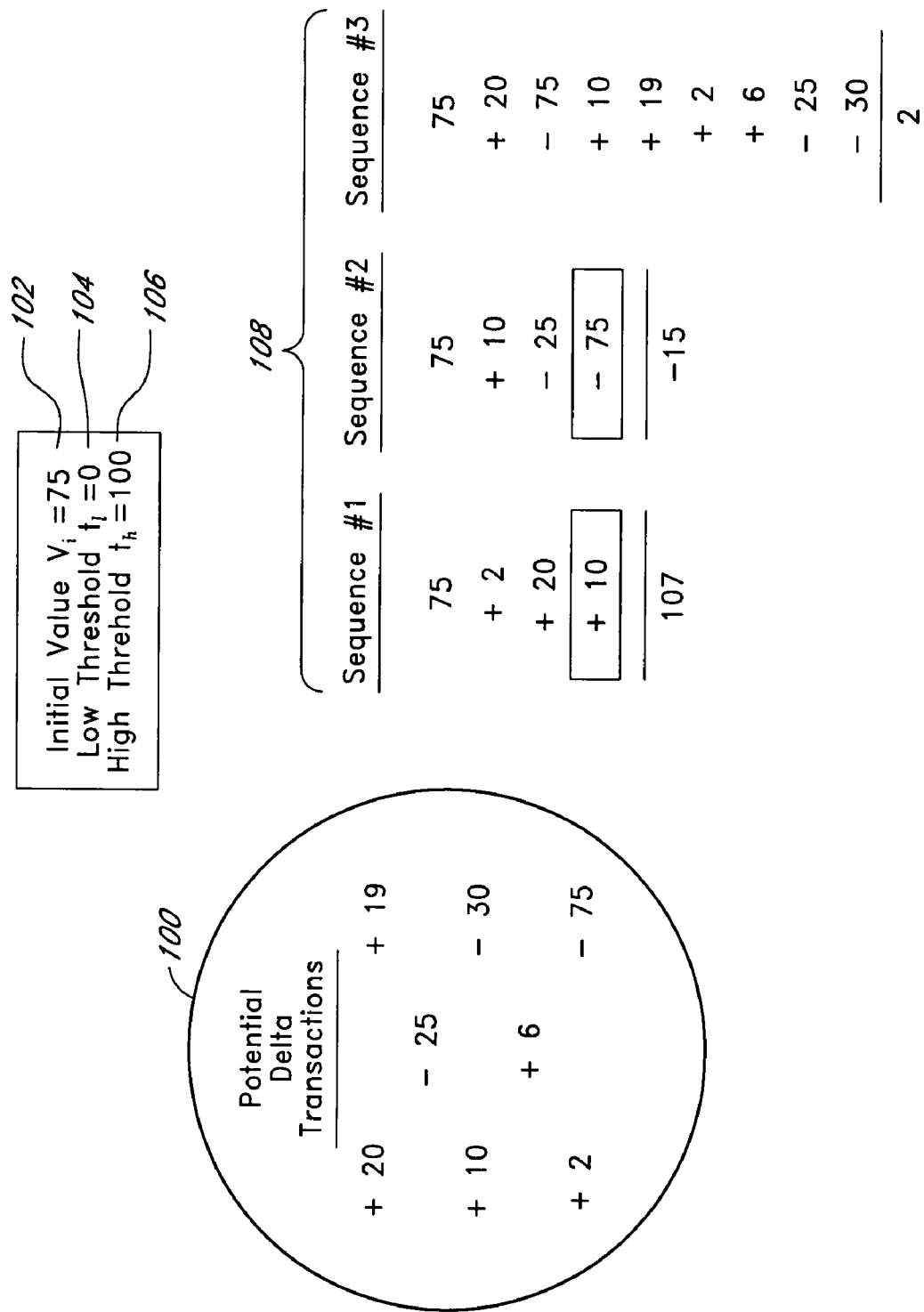

States for Thresholds

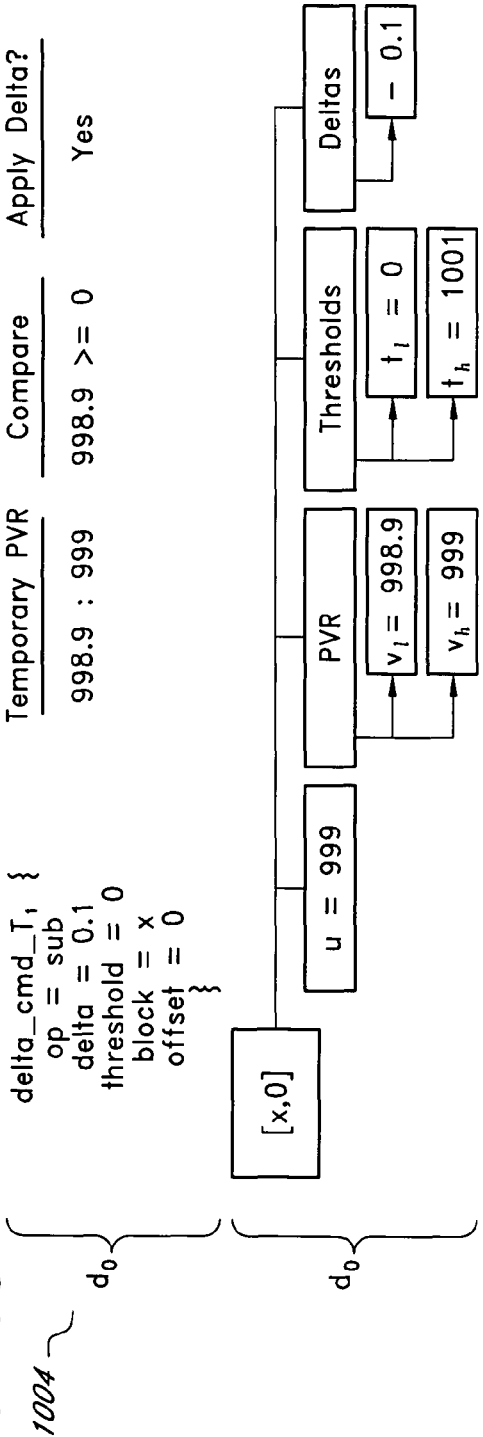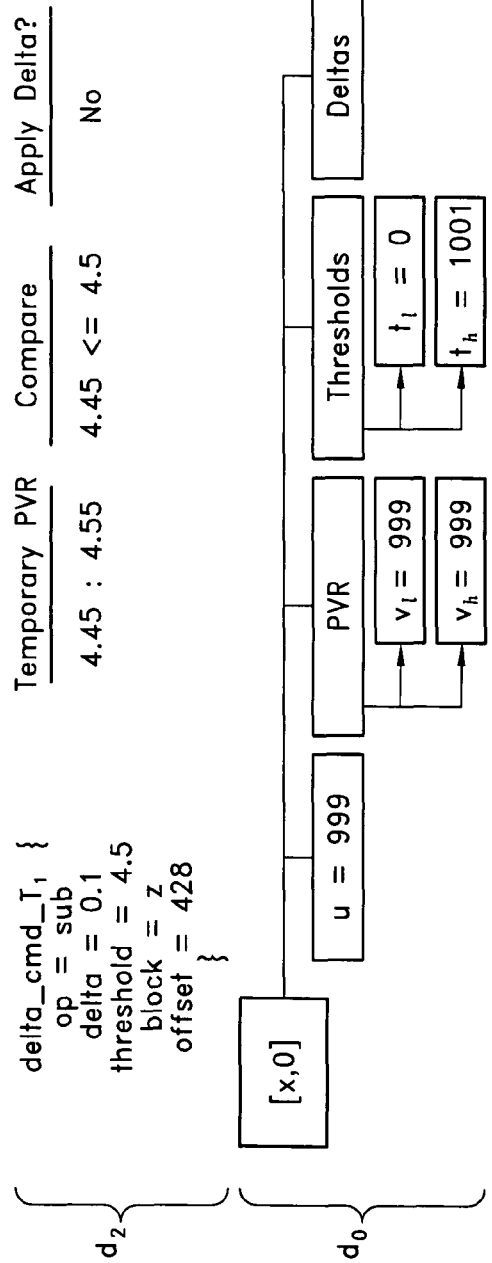
FIG. 10C

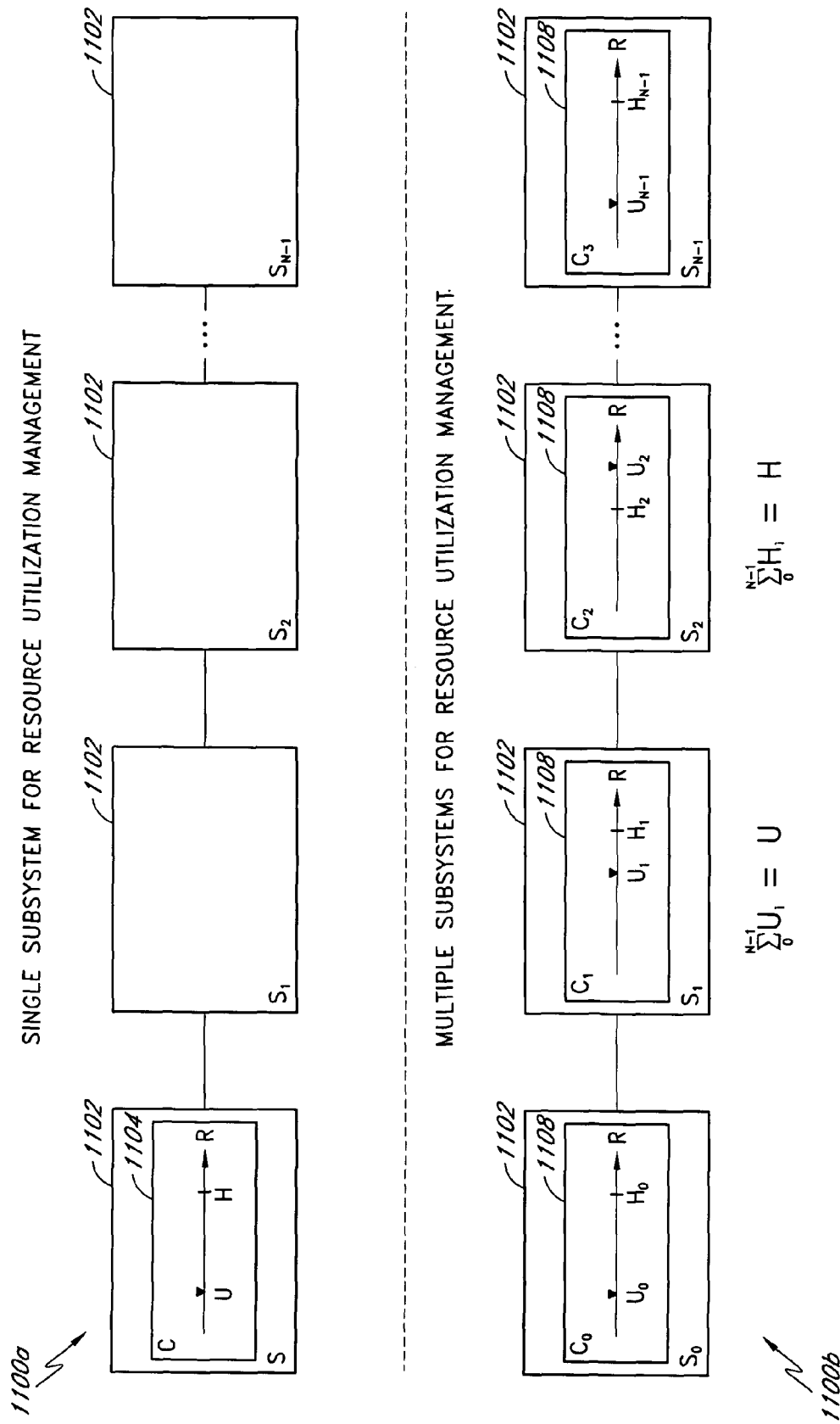

| QUOTA DOMAIN | PHYSICAL LIMIT | FILE LIMIT | LOGICAL LIMIT | USAGE | DELTA OPERATIONS EXAMPLE |
|---|---|---|---|---|---|
| $C_0$ | 2 GB | 302 | 1.5 GB | 1 GB | + 20 MB<br>− 100 MB<br>+ 300 MB<br>+ 50 MB | ← 1210

1200b →

| DOMAIN | PHYSICAL LIMIT | FILE LIMIT | LOGICAL LIMIT | USAGE | DELTA OPERATIONS EXAMPLE1 | DELTA OPERATIONS EXAMPLE2 |
|---|---|---|---|---|---|---|
| $C_{00}$ | 667 MB | 101 | 500 MB | 334 MB | + 20 MB<br>− 100 MB | − 100 MB |
| $C_{01}$ | 667 MB | 101 | 500 MB | 333 MB | + 300 MB | + 50 MB<br>+ 20 MB |
| $C_{02}$ | 666 MB | 100 | 500 MB | 333 MB | + 50 MB | + 300 MB |

1210a ↙    1210b ↙

NODES = 8
P = 3 TIMES PROTECTION
R = 1 CONSTITUENT PER NODE
N = $\left\lfloor \frac{NODES}{P} \cdot R \right\rfloor$ = 2 CONSTITUENTS

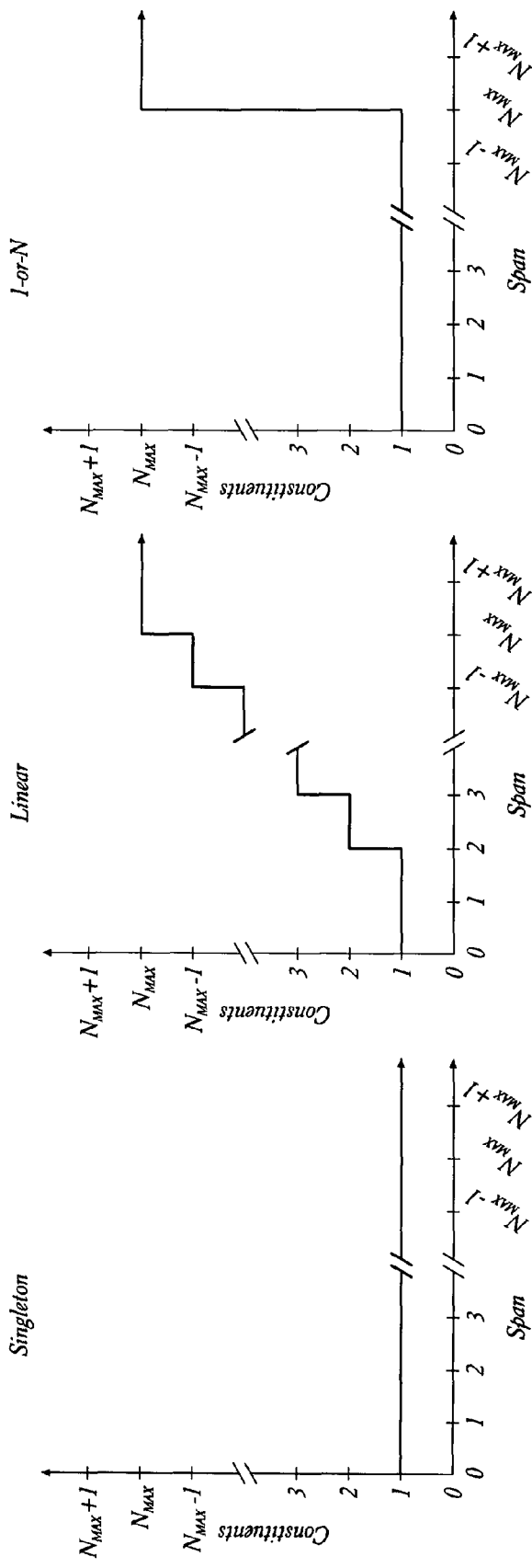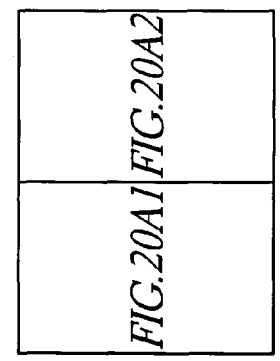

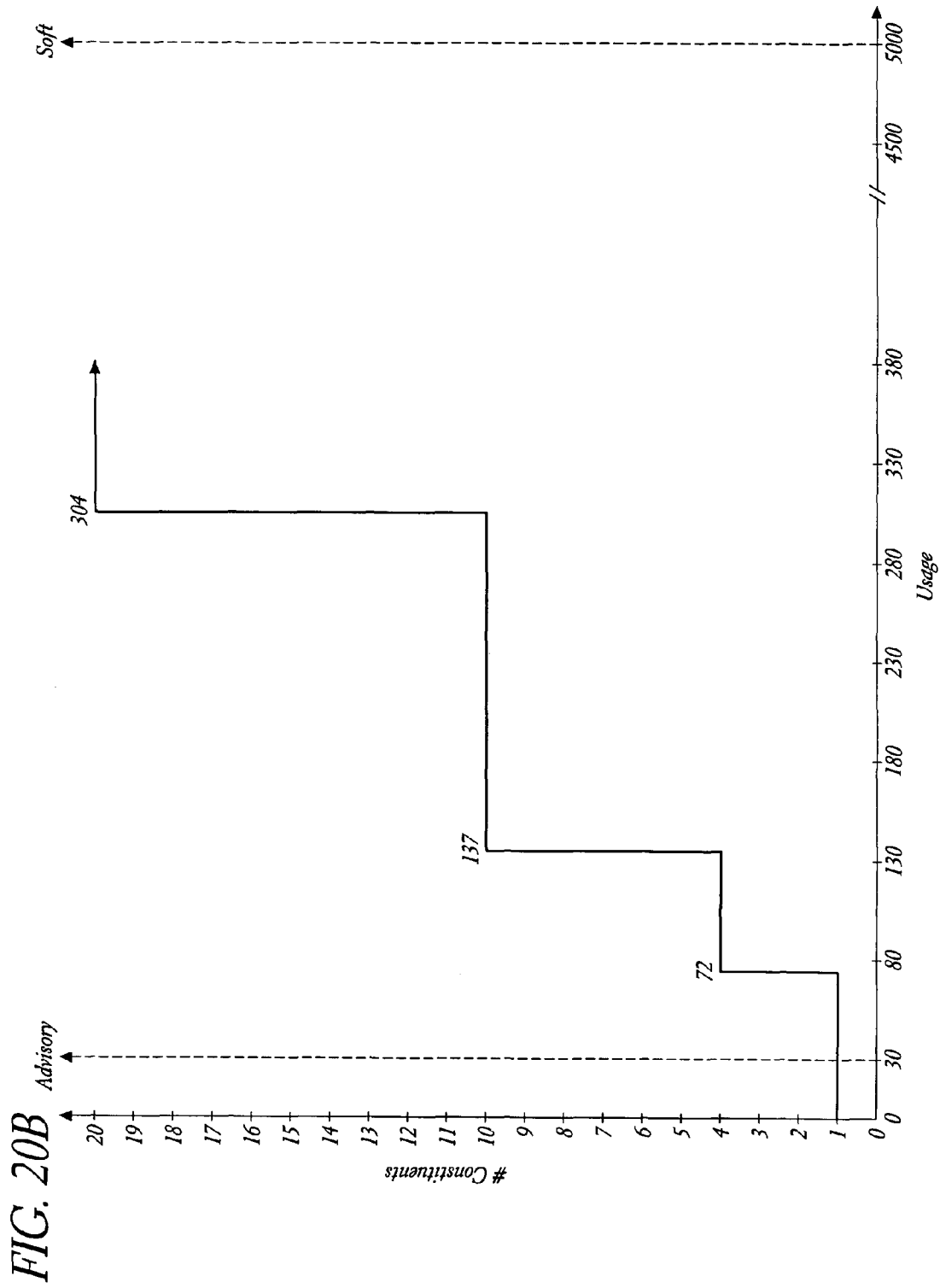

SYSTEMS AND METHODS OF QUOTA ACCOUNTING

CROSS-REFERENCE TO RELATED APPLICATIONS

This application was filed on the same day as the following applications: U.S. patent application Ser. No. 11/787,225, entitled "SYSTEMS AND METHODS OF PROVIDING POSSIBLE VALUE RANGES," and U.S. patent application Ser. No. 11/787,224, entitled "SYSTEMS AND METHODS OF MANAGING RESOURCE UTILIZATION ON A THREADED COMPUTER SYSTEM," all of which are hereby incorporated by reference in their entirety herein.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE INVENTION

In general, embodiments of the invention relate to incremental computing.

BACKGROUND

The increase in processing power of computer systems has ushered in a new era in which information is accessed on a constant basis. Multiple transactions in a computing environment often access the same data with incremental changes. In some systems, it may be advantageous to process incremental change requests, or delta transactions, concurrently. In some systems, it may also be advantageous to establish thresholds for the value of the data being changed incrementally. Additionally, it may be advantageous to manage utilization of resources in the computing environment while managing requests for changing data.

SUMMARY OF THE INVENTION

In general, embodiments of the invention relate to incremental computing. More specifically, systems and methods embodying the invention provide support for concurrent processing of delta transactions while monitoring and/or enforcing thresholds for the data values being changed incrementally.

In one embodiment, a method of determining whether multiple incremental changes to a data field could pass a threshold is provided. The method may include receiving at least one threshold related to a data field; receiving a request to incrementally modify a data value of the data field; and determining whether the request, in combination with a subset of other pending requests to incrementally modify the data value, could pass the at least one threshold.

In another embodiment, a computer-readable medium having instructions stored thereon for determining, when the instructions are executed, whether multiple incremental changes to a data field could pass a threshold is provided. The instructions may include receiving at least one threshold related to a data field; receiving a request to incrementally modify a data value stored in the data field; and determining whether the request could cause an incremented data value to pass the at least one threshold in combination with any subset of other pending incremental requests.

In another embodiment, a system that determines whether a subset of pending transactions could pass a threshold is provided. The system may include a module configured to receive at least one threshold related to a data field; to receive an incremental transaction on the data field; and to determine whether the incremental transaction could cause the data field to pass the at least one threshold in combination with any subset of other pending incremental transactions.

In another embodiment, a method of tracking a boundary for a field stored in a computer system is provided. The method may include receiving a delta request associated with a field stored in a computer system; and computing an updated boundary value of possible values for the field, wherein the possible values are based on the delta request and a previous boundary value, the previous boundary value derived from a subset of other pending delta requests for the field.

In another embodiment, a system for tracking a boundary of a field stored in a computer system is provided. The system may include a boundary module configured to receive a delta transaction associated with a field stored in a computer system; and to compute an updated boundary value based on possible values for the field, wherein the possible values are based on the delta transaction and a previous boundary value, the previous boundary value derived from a subset of other pending delta transactions for the field.

In another embodiment, a computer-readable medium having data structures stored thereon for tracking a boundary of a data field is provided. The data structures may include a data value field, wherein the data value field comprises a stored data value capable of being modified incrementally; a plurality of delta value fields, wherein the delta value fields comprise, respectively, ones of a plurality of pending incremental values to be combined with the stored data value; and at least one boundary field, wherein the at least one boundary field comprises a boundary value of possible data values resulting from a combination of the stored data value with a subset of the plurality of pending incremental values.

In another embodiment, a method of implementing domain quotas within a data storage system is provided. The method may include receiving at least one quota related to a size of a data domain, wherein the data domain associates a subset of data storage within a data storage system, wherein the size measures the subset, and wherein the at least one quota defines a threshold size for the data domain; receiving a data transaction that could change the size of the data domain; and determining whether the data transaction could cause the size of the data domain to pass the at least one quota in combination with a subset of other pending data transactions that could also change the size of the data domain.

In another embodiment, a computer-readable medium having instructions stored thereon for implementing, when the instructions are executed, domain quotas within a data storage system is provided. The instructions may include receiving at least one quota related to a size of a data domain, wherein the data domain associates a subset of data storage within a data storage system, wherein the size measures the subset, and wherein the at least one quota defines a threshold size for the data domain; receiving a data transaction that could change the size of the data domain; and determining whether the data transaction could cause the size of the data domain to pass the at least one quota in combination with a subset of other pending data transactions that could also change the size of the data domain.

In another embodiment, a system for implementing domain quotas within a data storage system is provided. The system may include a quota module configured to receive at least one quota related to a size of a data domain, wherein the data domain associates a subset of data storage within a data storage system, wherein the size measures the subset, and wherein the at least one quota defines a threshold size for the data domain; to receive a data transaction that could change the size of the data domain; and to determine whether the data transaction could cause the size of the data domain to pass the at least one quota in combination with a subset of other pending data transactions that could also change the size of the data domain.

In another embodiment, a computer-readable medium having data structures stored thereon for implementing domain quotas within a data storage system is provided. The data structures may include a domain size field, the domain size field comprising a value that reflects a size of a data domain comprising committed transactions; a bounded size field, the bounded size field comprising a value that reflects a maximum possible size or a minimum possible size of the data domain based on a plurality of pending data transactions that have not committed or aborted; an incremental value field, the incremental value field comprising a value that reflects a change in the size of the data domain caused by a data transaction; an operation type field, the operation type field comprising a value that indicates whether the change in the size of the data domain caused by the data transaction is either an increment or a decrement; and a quota field, the quota field comprising a value that indicates a size threshold for either a minimum or maximum size for the size of the data domain to be within a quota defined for the data domain.

In another embodiment, a method of managing utilization of a resource of a computer system having a number of threads is provided. The method may include receiving a usage threshold for a resource on the computer system and determining a usage for the resource on the system. The method may further include organizing the system into a number of subsystems, wherein the number of subsystems is two or more, and wherein the number is determined at least in part on factors including the number of threads, the usage threshold, and the usage. The method may further include allocating the subsystems among the threads, tracking resource usage for each subsystem, and distributing a request to modify resource usage to at least one subsystem.

In another embodiment, a computer-readable medium having instructions stored thereon for managing, when the instructions are executed, utilization of a resource of a computer system having a number of threads is provided. The instructions may include receiving a usage threshold for a resource on the computer system and determining a usage for the resource on the system. The instructions may further include organizing the system into a number of subsystems, wherein the number of subsystems is two or more, and wherein the number is determined at least in part on factors including the number of threads, the usage threshold, and the usage. The instructions may further include allocating the subsystems among the threads, tracking resource usage for each subsystem, and distributing a request to modify resource usage to at least one subsystem.

In another embodiment, a system for managing utilization of a resource of a computer system having a number of threads is provided. The system may include a module configured to receive a usage threshold and to determine usage for a resource on the computer system. The module may be further configured to organize the computer system into a number of subsystems, wherein the number is two or more and depends at least in part on factors including the number of threads, the usage threshold, and the usage. The module may be further configured to allocate the subsystems among the threads for tracking resource usage for each subsystem, and to distribute a request to modify resource usage to at least one subsystem.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIGS. 1A and 1B illustrate a problem that may arise with concurrent incremental changes and one embodiment of a possible solution using possible value ranges.

FIGS. 10A, 10B, 10C, 10D, 10E, 10F, and 10G illustrate embodiments of determining whether a delta transaction can be applied without passing a threshold.

FIG. 11 illustrates embodiments of resource usage management systems on a distributed computing system.

FIG. 12 illustrates an embodiment of an example accounting system $C_0$ for the domain $d_0$ that has been organized into three example accounting subsystems $C_{00}$, $C_{01}$, and $C_{02}$ each of which tracks usage in a portion of the domain.

FIG. 19A is one embodiment of a graph that illustrates the number of constituents in a singleton mode of reorganization as a function of span at the time of the reorganization.

FIG. 19B is one embodiment of a graph that illustrates the number of constituents that may be selected during a linear mode of reorganization as a function of span at the time of reorganization.

FIG. 19C is one embodiment of a graph that illustrates the number of constituents that may be selected during a 1-or-N mode of reorganization as a function of span at the time of reorganization.

FIG. 20B is one example of a graph that shows the number of constituents as a function of usage for the example system illustrated in FIG. 20A.

Figure 1B:
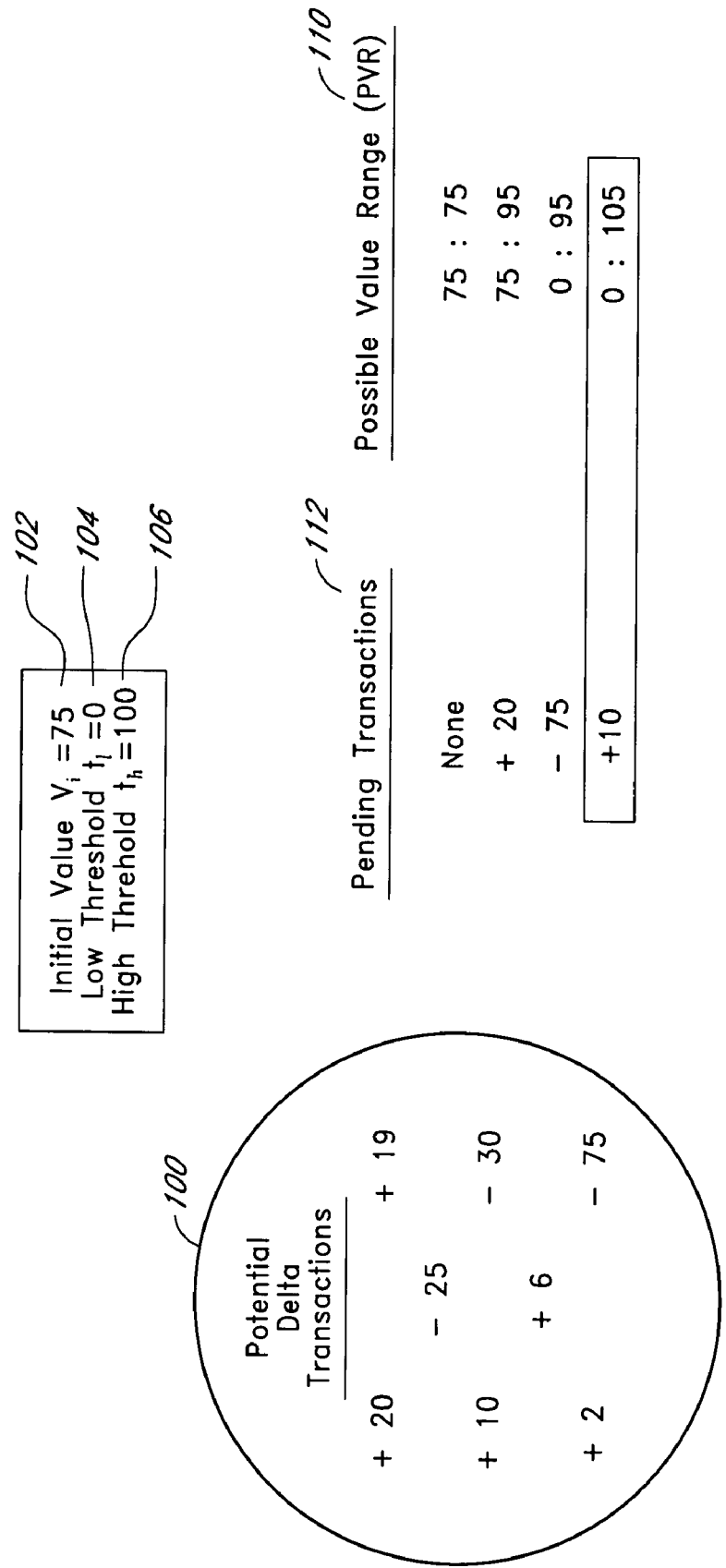

These and other features will now be described with reference to the drawings summarized above. The drawings and the associated descriptions are provided to illustrate embodiments of the invention and not to limit the scope of the invention. Throughout the drawings, reference numbers may be reused to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described.

For purposes of illustration, some embodiments will be described in the context of a distributed file system. The present invention is not limited by the type of environment in which the systems and methods are used, however, and systems and methods may be used in other environments, such as, for example, other file systems, other distributed systems, the Internet, the World Wide Web, a private network for a hospital, a broadcast network for a government agency, and an internal network for a corporate enterprise, an Intranet, a local area network, a wide area network, a wired network, a wireless network, and so forth. Some of the figures and descriptions, however, relate to an embodiment of the invention wherein the environment is that of a distributed file system. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

One example of a distributed file system, in which embodiments of systems and methods described herein may be implemented, is described in U.S. patent application Ser. No. 10/007,003 entitled "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001, which claims priority to Application No. 60/309,803 filed Aug. 3, 2001, U.S. Pat. No. 7,146,524 entitled "SYSTEMS AND METHODS FOR PROVIDING A DISTRIBUTED FILE SYSTEM INCORPORATING A VIRTUAL HOT SPARE," filed Oct. 25, 2002, and U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002, all of which are hereby incorporated by reference herein in their entirety.

I. Overview

In general, embodiments of the invention relate to incremental computing. More specifically, embodiments of the invention allow for the concurrent processing of multiple, incremental changes to a data value while at the same time monitoring and/or enforcing threshold values for that data value. FIG. 1A illustrates a problem addressed by embodiments of the invention. FIG. 1A illustrates a group of potential delta transactions 100. These potential delta transactions 100 are associated with data 102, a low threshold 104 and a high threshold 106. Specifically, the initial value of data 102 is seventy-five; the value of the low threshold 104 is zero; and the value of the high threshold 106 is one-hundred. In other words, two threshold values have been defined for data 102, which collectively define a range of possible values for data 102 that do not pass either threshold. In the illustrated example, there are eight incremental values in the group of potential delta transactions 100. Delta transactions may be incremental changes to, for example, a data field. The illustrated delta transactions include an incremental value and an associated operation type that is either positive or negative, corresponding to increment or decrement, respectively. Taken together, the incremental value and the operation type define an incremental operation to be performed on the value of data 102. Depending on the sequence in which these potential incremental changes are processed, the data value may or may not pass one of the two thresholds, low threshold 104 or high threshold 106. There are three illustrated transaction sequences 108. In Sequence #1, the third incremental change causes the value of data 102 to pass the value of high threshold 106. In Sequence #2, the third incremental change causes the value of data 102 to pass the value of low threshold 104. In Sequence #3, the incremental changes are processed in such an order that the value of data 102 never passes either the value of low threshold 104 or the value of high threshold 106.

In many computing environments, there may be no fixed sequence order for processing pending transactions. Furthermore, in some computing environments, some pending transactions may be aborted, adding increased variability to the possible value of a certain data. In such environments, it may be advantageous to know whether any combination of pending delta transactions could cause, for example, an affected data field to pass a defined threshold. FIG. 1B illustrates one embodiment of an example of using possible value ranges 110 to determine whether a combination of pending transactions 112 would cause a value of data 102 to pass the value of either low threshold 104 or the value of high threshold 106. There are eight potential delta transactions 100 illustrated in FIG. 1B. As these incoming, potential transactions are considered as possible candidates to become pending transactions—that is, transactions that may be processed, for example, without regard to their order of arrival—a computing system may evaluate whether the newly considered transaction could cause, in combination with any other subset of pending transactions, the value of data 102 to pass, for example, the value of low threshold 104 or the value of high threshold 106. Determining a possible value range is one method for determining whether any subset of pending transactions may exceed a threshold. In the example illustrated in FIG. 1B, the delta transaction "+20" is considered first. If transaction "+20" becomes pending, the lowest possible value of data 102 would not be affected because transaction "+20" could only cause the value of data 102 to increase. In contrast, if transaction "+20" becomes pending, the highest possible value of data 102 would be ninety-five because, if transaction "+20" completes and there are no other pending transactions, the value of data 102 would be the initial value, seventy-five, plus twenty. In some embodiments of an incremental computing system, transaction "+20" would be allowed to become pending because it could not cause the value of data 102 to pass either the value of low threshold 104 or the value of high threshold 106.

In the example illustrated in FIG. 1B, transaction "−75" is considered second. If transaction "−75" becomes pending, the lowest possible value of data 102 would be zero. The value of data 102 would be zero if the transaction "+20" aborts and the transaction "−75" completes. The highest possible value of data 102 would not be affected, if transaction "−75" became pending, because transaction "−75" could only cause the value of data 102 to decrease. In some embodiments of an incremental computing system, transaction "−75" would be allowed to become pending because it could not cause the value of data 102 to pass either the value of low threshold 104 or the value of high threshold 106.

In the example illustrated in FIG. 1B, transaction "+10" is considered third. If transaction "+10" becomes pending, the lowest possible value of data 102 would still be zero because transaction "+10" could only cause the value of data 102 to increase. If transaction "+10" becomes pending, however, the highest possible value of data 102 would be one-hundred and five. The value of data 102 could be one-hundred and five if the "+20" and "+10" transactions complete and the "−75" transaction aborts. In some embodiments of an incremental computing system, transaction "+10" would not be allowed to become pending, as an incremental transaction, because it could cause the value of data 102 to pass the value of high threshold 106, which is one-hundred. In other embodiments, transactions that could cause a data value to pass a threshold may still be allowed to become pending, once other transactions have resolved, but may, for example, trigger a notification or trigger a condition to be monitored.

Although, in the incremental computing system described above, possible value ranges are used to monitor thresholds in a transaction environment where some transactions fail, in other incremental computing systems possible value ranges may be used to monitor thresholds even where all transactions complete. For example, it may be advantageous to know prior to transaction completion whether a certain pending value could cause, in combination with the other pending values, a data value to pass a threshold. If a potential transaction could later cause, in combination with the pending transactions, a threshold to be passed, an incremental computing system may, for example, prevent such a potential transaction from becoming pending, may notify a resource that the newest pending transaction will cause a threshold to be passed, and/or may monitor a condition associated with the forecasted passing of the threshold value.

A storage system is one example of a computing system that may use possible value ranges to determine whether a transaction could cause, in combination with a subset of previously pending transactions, to pass a threshold. For example, in a storage system, it may be advantageous to process multiple incremental requests to change a value at a storage location. In some systems, writing a new incremental value may include requesting permission from a resource, such as a disk drive, in order to write the transaction to a specified storage location. Processing a single write request may involve many different processes including, for example, writing a copy of the value to a journal that temporarily stores the value before verification that the value has been written to long-term storage, such as a hard-disk drive; verifying that a data value has been successfully written to a storage device, such as a hard-disk drive; and communicating with other computing devices that may be involved with a related transaction that could cause the incremental transaction to either commit or abort. While these operations are being performed, other incremental change requests, or delta transactions, may arrive at the same time. It may be advantageous to process concurrently as many relevant operations for each delta transaction as possible. In some systems, it may be possible to write multiple pending delta transactions to a journal. These pending delta transactions may be recorded in the journal during overlapping periods of time until, for example, a long-term storage device is available to write the value at a particular storage location, including the cumulative value of the pending incremental changes to the value that accumulated while attempting to gain access to the long-term storage device.

Embodiments of a journal system, in which embodiments of systems and methods described herein may be implemented, are described in U.S. patent application Ser. No. 11/506,597, entitled "SYSTEMS AND METHODS FOR PROVIDING NONLINEAR JOURNALING," filed Aug. 18, 2006; U.S. patent application Ser. No. 11/507,073 entitled "SYSTEMS AND METHODS FOR PROVIDING NONLINEAR JOURNALING," filed Aug. 18, 2006; U.S. patent application Ser. No. 11/507,070, entitled "SYSTEMS AND METHODS FOR PROVIDING NONLINEAR JOURNALING," filed Aug. 18, 2006; and U.S. patent application Ser. No. 11/507,076, entitled "SYSTEMS AND METHODS FOR ALLOWING INCREMENTAL JOURNALING," filed Aug. 18, 2006. All four of the foregoing applications are hereby incorporated by reference herein in their entirety.

II. Computing System

Figure 2A:
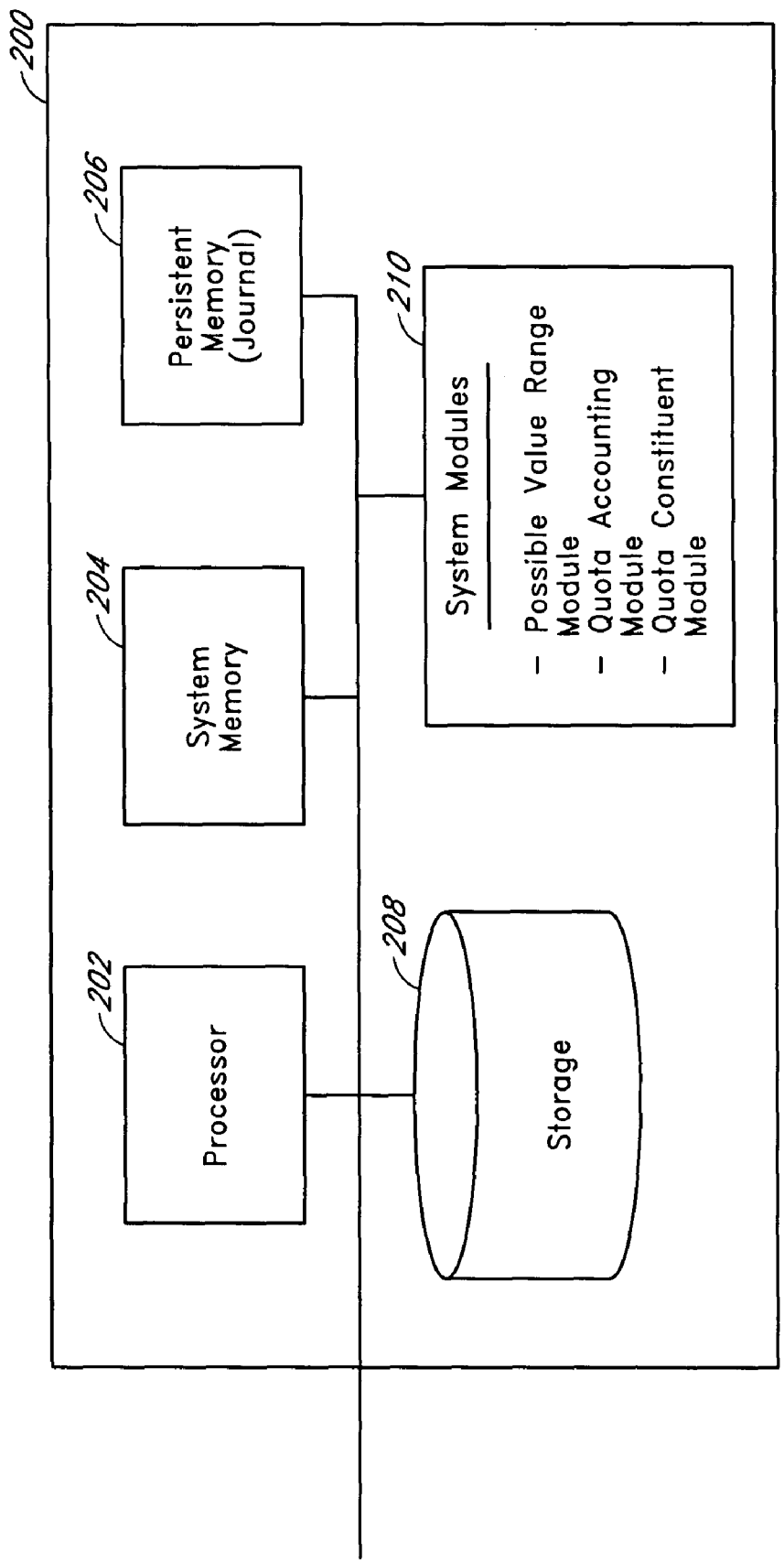
FIGS. 2A and 2B illustrate embodiments of a computer system configured to implement possible value ranges for incremental computing.
Figure 2B:
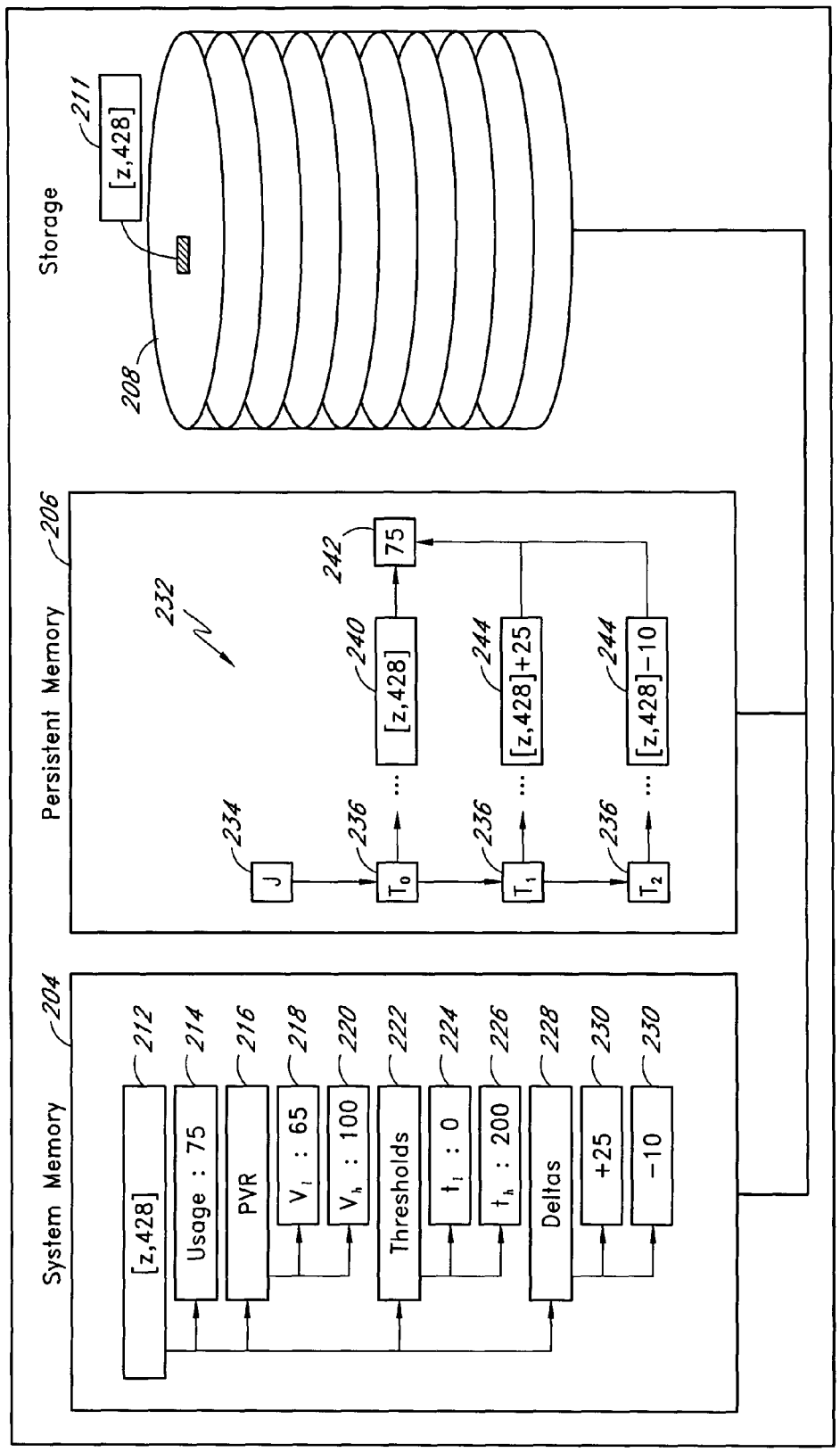

FIGS. 2A and 2B illustrate embodiments of a computing system that implements possible value ranges for incremental computing. FIG. 2A illustrates a computing system 200 with a processor 202, a system memory 204, a persistent memory 206, a storage 208, and system modules 210. These components and modules are connected via an internal communication system. Typically, computing system 200 processes system modules 210 with processor 202, and writes data associated with system modules 210 to system memory 204, persistent memory 206, and/or storage 208. In the illustrated embodiment, persistent memory 206 is designated as a journal for computing system 200. In other embodiments, computing system 200 may have additional components and/or modules. Alternatively, computing system 200 may have fewer components and/or modules than illustrated in FIG. 2A. For example, in some embodiments, computing system 200 may not have persistent memory 206. In addition, one or more of the components or modules may be combined or divided as subcomponents or submodules.

A. Example Components/Modules

Although storage 208 is illustrated as a single storage device, in other embodiments storage 208 may include an array of one or more types of storage devices. Multiple processors, system memory components, and persistent memory components may also be included. Furthermore, although embodiments of the invention are generally described with respect to storage devices based on hard-disk drives, other embodiments may be implemented on systems including alternative forms of storage, such as solid state disks (or drives), random access memory (RAM) disks, Flash disks, combinations of the same, and suitable equivalents. Similarly, embodiments of the invention may include storage devices with various implementations of system memory 204, including memory based on static RAM (SRAM), nonvolatile RAM (NVRAM), dynamic RAM (DRAM), combinations of the same, and suitable equivalents. It will be appreciated by one skilled in the art how to implement embodiments of the invention on storage systems using suitable alternative storage-related devices.

In the illustrated embodiment, a journal of disk writes to storage 208 is stored in persistent memory 206. Persistent memory, as described herein, may refer to memory devices whose content remain stable despite power failure to the device. For example, a hard-disk drive is an example of persistent storage. Hard-disk drives retain their content, even in the absence of a power supply. Hard-disk drives do not, however, have efficient random access. Relatively long seek times limit the advantageous use of hard-disk drives for journal storage. Although a hard-disk drive may be used to store a journal, in some embodiments nonvolatile random access memory (NVRAM) is preferred. Flash memory, for example, has faster access times in comparison with hard-disk drives. One disadvantage of Flash memory, however, is its relatively limited lifecycle. In one embodiment, persistent memory 206 is battery-backed RAM, such that if it loses power, the backup battery maintains its persistent state. Battery-backed RAM has the advantage of efficient access time, long lifecycle, and persistent state, making it a suitable source of persistent memory 206 for storing a journal. Because battery-backed RAM can lose its memory contents in the event that the battery fails, persistent memory 206 includes not only those storage mediums that maintain their contents without any power; such as a hard-disk drive, but may also include storage mediums with suitable power-supply backups. Persistent memory 206 may also include magnetic random access memory (MRAM), which has access time and lifecycle advantages of battery-backed RAM without having a backup power supply. It will be appreciated by one skilled in the art that persistent memory 206 may include many suitable forms of nonvolatile memory, including, for example, magnetic random access memory (MRAM), Flash RAM, battery-backed RAM, combinations of the same, and suitable equivalents.

Although in the illustrated embodiment system modules 210 are illustrated as a separate component, the system modules 210 are program instructions that may be stored in a variety of suitable locations, including, for example, local partitions on storage 208 or dedicated storage devices. In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In some embodiments, computing system 200 may comprise a variety of computer systems such as, for example, a computer, a server, a smart storage unit, and so forth. In one embodiment, the computer may be a general purpose computer using one or more microprocessors, such as, for example, a Pentium processor, a Pentium II processor, a Pentium Pro processor, a Pentium IV processor, an x86 processor, an 8051 processor, a MIPS processor, a Power PC processor, a SPARC processor, an Alpha processor, and so forth. The computer may run a variety of operating systems that perform standard operating system functions such as opening, reading, writing, and closing a file. It is recognized that other operating systems may be used, such as, for example, Microsoft® Windows® 3.X, Microsoft® Windows® 98, Microsoft® Windows® 2000, Microsoft® Windows® NT, Microsoft® Windows® Vista®, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, IBM® OS/2® operating systems, and so forth.

In some embodiments, computing system 200 may be connected to a cluster of networked computing devices, forming a distributed network system. A distributed network system may be arranged in many topologies, including, but not limited to, the following topologies: fully-connected, ring, mesh, star, line, tree, bus topologies, and so forth. It will be appreciated by one skilled in the art that various network topologies and/or combinations thereof may be used to implement different embodiments of the invention. In addition, it is recognized that nodes in a distributed network system may be connected directly, indirectly, or a combination of the two, and that all of the nodes may be connected using the same type of connection or one or more different types of connections. It is also recognized that in other embodiments, a different number of nodes may be included in the cluster, such as, for example, 2, 16, 83, 6, 883, 10,000, and so forth.

In one embodiment, the nodes of a distributed network system are interconnected through a bi-directional communication link where messages are received in the order they are sent. In one embodiment, the link comprises a "keep-alive" mechanism that quickly detects when nodes or other network components fail, and the nodes are notified when a link goes up or down. In one embodiment, the link includes a Transmission Control Protocol (TCP) connection. In other embodiments, the link includes a Session Description Protocol (SDP) connection over Infiniband, a wireless network, a wired network, a serial connection, Internet Protocol (IP) over FibreChannel, proprietary communication links, connection based datagrams or streams, and/or connection based protocols.

B. Example Data Structures

FIG. 2B illustrates one embodiment of three of the components of computing system 200 in more detail. Specifically, FIG. 2B illustrates some of the data and data structures stored in system memory 204, persistent memory 206, and storage 208. Storage 208 is a hard-disk drive with multiple disk platters. The disk platters are divided into smaller data blocks, or disk blocks. Within a disk block, there may be multiple offset values that define different storage locations on the block. In the illustrated embodiment, the storage location 211 is defined as being on disk block "z" at offset "428." Conceptually, a data block may be any size of data, such as a single bit, a byte, a gigabyte, or even larger. In some embodiments, a data block is the smallest logical unit of data storage in a file system. Additionally and/or alternatively, a file system may use data block sizes that are different from the native block size of a disk. For example, a disk may have a native size of 512 bytes, but a file system may address 4096 bytes or 8192 bytes. One skilled in the art will appreciate that file systems may be implemented with many suitable data block sizes, including, but not limited to, 512 bytes, 4096 bytes, and 8192 bytes. In some embodiments, the block size may be configurable. It will be further appreciated that, although the illustrated embodiment illustrates a single data block size, file systems may be implemented with variably sized data blocks.

There are various data values stored in system memory 204 that correspond to storage location 211. Storage reference 212 is a pointer value that refers to the storage location 211 on storage 208. Usage 214 stores the value of the data stored at storage location 211. In the illustrated embodiment, usage 214 corresponds to a "usage" value of, for example, a defined domain of directories and files within a file system. PVR reference 216 is a pointer to possible value range (PVR) variables including, low value 218, and high value 220. Threshold reference 222 is a pointer to threshold variables for usage 214, including low threshold 224 and high threshold 226. Delta reference 228 is a pointer reference to the values of delta transactions for usage 214, including delta values 230. Although in the illustrated embodiment the delta values 230 are illustrated as positive and negative values, in other embodiments the delta values 230 may be unsigned values. Additionally and/or alternatively, there may be additional variables defining the respective signs of data values 230.

Persistent memory 206 includes a journal data structure 232. Journal data structure 232 includes a journal block 234 that is a pointer reference to a linked list of transaction blocks 236. The transaction blocks 236, respectively, link together all of the associated data block writes for respective transactions. For example, the transaction $T_0$ includes a block descriptor 240 and a block value 242. Block descriptor 240 includes a pointer reference to storage location 211. Block value 242 stores the value that is to be written to storage location 211. Transactions $T_1$ and $T_2$ include delta transactions that modify the value stored at storage location 211. These delta transactions 244 include a reference to the storage location 211 to which they correspond, as well as an incremental value and associated sign. When it comes time to write the value of usage 214 to storage location 211, the incremental values of the delta transactions 244 will be combined with the data value 242 and written to storage location 211.

III. Possible Value Range (PVR) Module

In some embodiments, a possible value range is a closed range $[v_l, v_h]$ describing bounds (or boundaries) for the possible values of a variable. A possible value range module tracks one or more boundaries for a data field stored in a computer system. The boundaries are the lowest and/or highest possible values that may be stored in the data field. Thus, the possible value range is a set of boundary limits for the value of a given data field. Table 1 describes one embodiment of a possible value range (PVR).

TABLE 1

| | |
|---|---|
| Initial State | 100 |
| Uncommitted TXN 1 | +1 |
| Uncommitted TXN 2 | −2 |
| Uncommitted TXN 3 | −10 |
| Possible value Range | [88:101] |

The illustrated PVR keeps track of both a lower and upper (or low and high) boundary value for a variable with an initial value of "100." Three subsequent transactions that incrementally modify this same data field are processed. Because these transactions are "uncommitted," the system cannot determine with certainty the exact value of the data field. In other words, in one embodiment, until the system has determined whether certain pending (uncommitted) transactions, affecting a particular variable, will execute (commit) or not execute (abort), the PVR module can track the lower and upper bounds of the possible values for the particular variable. Therefore, the PVR module uses the PVR to track the possible lower and upper boundary values of the data field.

Specifically, when the first uncommitted transaction is accounted for, the PVR for the variable would be "[100:101]," indicating that the lowest possible value of the variable would be "100" and the highest possible value would be "101." When the second uncommitted transaction is accounted for, the PVR for the variable would then be "[98:101]." If the first transaction aborted and the second transaction committed, the variable with initial state of "100" would be decremented "−2" without being incremented "+1", yielding a result of "98." Finally, when the third uncommitted transaction is accounted for, the PVR for the variable would be "[88:101]," as illustrated. If both the second and third transactions committed, but the first transaction aborted, the variable would have a value of "88." On the other hand, if the first transaction committed and the second and third transactions aborted, then the variable would have a value of "101." There are, of course, other possible values, including "99" (TXN 1 and TXN 2 commit; TXN 3 aborts), "89" (TXN 1, TXN 2, and TXN 3 commit), "100" (TXN 1, TXN 2, TXN 3 abort), "91" (TXN 1 and TXN 3 commit; TXN 2 aborts), "98" (TXN 2 commits; TXN 1 and TXN 3 abort), and "90" (TXN 3 commits; TXN 1 and TXN 2 abort). The embodiments described herein, generally, describe a PVR module that tracks upper and lower boundary values. Other embodiments could track the possible middle boundaries/values. In some embodiments, the boundary values of a PVR may be inclusive, and, in other embodiments, the boundary values may be exclusive. In other words, in some embodiments, the possible value range of a variable may include the boundary value, and, in other embodiments, the possible value range of a variable excludes the boundary value.

Table 2 illustrates one embodiment of operations to track a low value $v_l$ and high value $v_h$ (in other words, a lower bound and an upper bound) of a variable. These possible values are modified as uncommitted incremental, or delta ($\Delta$), transactions are accounted for, causing a "change" in the PVR (incrementing the high value for increments and decrementing the low value for decrements) and then either committed (incrementing the low value for increments and decrementing the high value is decrements) or aborted (decrementing the high value for increments and incrementing the low value for decrements).

TABLE 2

| Operation | Increment | Decrement |
|---|---|---|
| Change | $v_h += \Delta$ | $v_l -= \Delta$ |
| Commit | $v_l += \Delta$ | $v_h -= \Delta$ |
| Abort | $v_h -= \Delta$ | $v_l += \Delta$ |

If, for example, the PVR is [88:101], and TXN 2 commits, then the high value is decremented by the respective delta ("2"), yielding a PVR of [88:99]. As described here, the "delta" refers to the unsigned incremental value. If TXN 3 then aborts, the low value is incremented by the respective delta ("10"), yielding a PVR of [98:99]. If TXN 1 then commits, the low value is incremented by the respective delta ("1"), yielding a PVR of [99:99].

A. Exemplary PVR Enabled Journal

Figure 3:
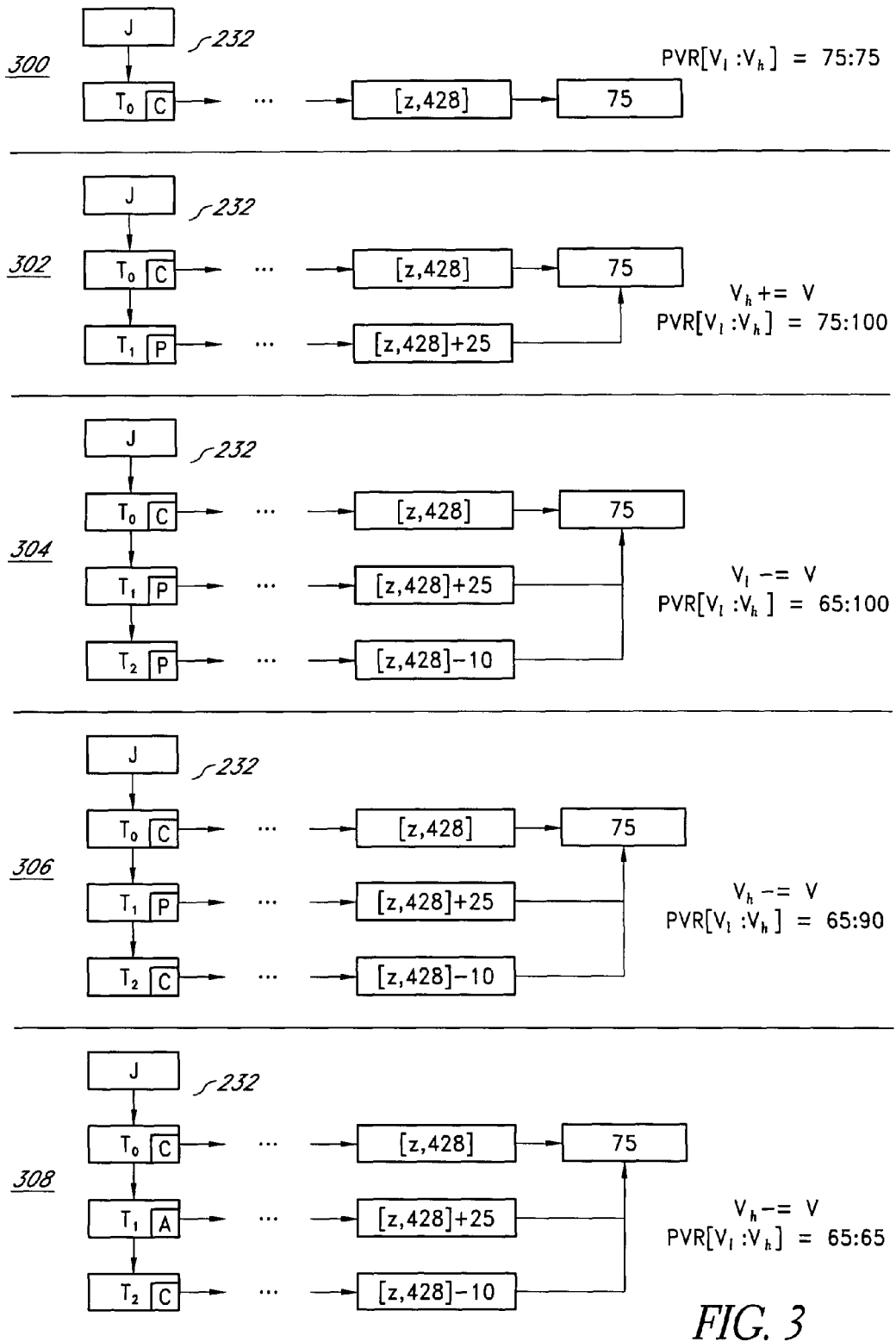
FIG. 3 illustrates embodiments of writing delta transactions to a journal and determining the possible value range of the delta transactions.

FIG. 3 illustrates one embodiment of tracking PVRs in a journal subsystem. As described above with reference to FIG. 2B, computing system 200 includes persistent memory 206, which keeps a journal of data writes to storage 208. In one embodiment of a journal subsystem, transactions are stored in a journal in, for example, one of three states: prepared (p), committed (c), or aborted (a). Prepared transactions are uncommitted transactions that have been written to the journal in preparation to being written to the storage (if committed). If these prepared transactions include incremental changes (or delta transactions) to a storage location already written to the journal (in another transaction, for example), a PVR module adjusts the PVR of the storage location to account for the incremental change (or delta transaction) included in the newly prepared transaction. One skilled in the art will appreciate that a PVR module may adjust the PVR of a storage location before or after an incremental change (or delta transaction) is written to a journal. Committed transactions are transactions that have been committed by the system to be written to storage. In the illustrated embodiment, if a committed transaction includes delta transactions for any storage locations, the PVRs of these storage locations are adjusted to reflect that the respective incremental changes (or delta transactions) are committed, and, therefore, no longer contribute to the uncertainty of the "possible" value ranges corresponding to the respective storage locations. Aborted transactions are transactions that have been aborted by the system and are not written to storage. In the illustrated embodiment, if an aborted transaction includes delta transactions for any storage locations, the PVRs of these storage locations are adjusted to reflect that the respective incremental changes (or delta transactions) are aborted, and, therefore, no longer contribute to the uncertainty of the "possible" value ranges corresponding to the respective storage locations.

In 300, there is one transaction, $T_0$, linked into the journal. Transaction $T_0$ is "committed," meaning that computing system 200 has committed to write the storage locations associated with transaction $T_0$ to their respective storage locations. One of the storage locations associated with transaction $T_0$ is storage location [z, 428]. This storage location corresponds to disk block "z" at offset "428" on storage 208. The PVR of the data to be stored at storage location [z, 428] is [75:75]. In other words, the lowest possible value of storage location [z, 428] is "75," and the highest possible value of storage location [z, 428] is also "75." This indicates that there are no deltas corresponding to storage location [z, 428].

In 302, a new transaction is linked into the journal. Transaction $T_1$ is in the "prepared" state, meaning that it has been recorded in the journal, but the computing system 100 has not committed to executing transaction $T_1$. One of the storage locations affected by transaction $T_1$ is storage location [z, 428]. Transaction $T_1$ adds the incremental value of "25" to the value stored at location [z, 428]. Because the incremental change is an increment, the high value of the PVR corresponding to [z, 428] is increased to "100," the value of the storage location in transaction $T_0$ and the incremental value in transaction $T_1$. Because the delta transaction corresponding to transaction $T_1$ would not cause a decrement to the value of the data corresponding to storage location [z, 428], the lowest possible value remains the same. Thus, the total possible value range in 302 is [75:100].

In 304, a new transaction, $T_2$, is linked into the journal. It is also in the "prepared" state, meaning that the computing system 100 has not committed to modifying the relevant storage locations. One of the storage locations affected by transaction $T_2$ is storage location [z, 428]. Transaction $T_2$ decrements the value stored at [z, 428] by 10. Thus, the low value of the PVR for the value of the data stored at [z, 428] is now 65. The high value remains the same. Thus, the possible value range for the data stored at [z, 428] is [65: 100].

In 306, transaction $T_2$ commits, meaning that the system is committed to writing the storage locations corresponding to transaction $T_2$. Because $T_2$ has been committed, the PVR for the data stored at [z, 428] is adjusted. The high value is decremented by 10, resulting in the value of "90." The low value of the data stored at [z, 428] is still 65. Thus, the possible value range is [65:90].

In 308, transaction $T_1$ aborts, meaning that the corresponding storage locations will not be modified by $T_1$. Because $T_1$ will no longer be executed, the PVR of the data stored at [z, 428] is adjusted. The high value of the PVR is now 65, which is also the low value because there are no uncommitted delta transactions pending. Thus, the PVR is the cumulative sum of the data value "75" and the committed delta transactions, which in this example is the delta transaction "-10."

B. Threshold Evaluation Procedures

FIG. 4 illustrates a flow chart of one embodiment of determining whether to write a delta to a journal, such as journal 232. In the illustrated embodiment, a delta transaction is written to the journal if the delta transaction could not, in combination with any other set of pending uncommitted transactions, cause the PVR for the associated storage location to pass a threshold. To determine whether a threshold could be passed, the PVR module determines a temporary PVR—the PVR that could result with the addition of the delta transaction—and compares the adjusted low/high value to the corresponding threshold.

In state 402, the PVR module receives a delta, an operation, and a threshold for a storage location—for example, a particular data block and offset stored on storage 208. In state 404, the PVR module determines the current PVR for the block and the offset. In state 406, the PVR module determines whether the delta can be applied without passing the threshold. This determination is discussed in greater detail below with reference to FIG. 4B. If the delta cannot be applied without passing the threshold, then the PVR module returns an error. In some embodiments, the system may respond to the error by, for example, retrying after an elapse of time or some other suitable condition or allowing the delta transaction in a serial, exclusive, or locked mode. In state 408, if the PVR module determines that the delta can be applied without passing the threshold, the PVR module writes the delta to the journal, in state 410.

The following is exemplary pseudocode of one embodiment of determining whether to write a delta to a journal. It will be appreciated by one skilled in the art that there are many suitable ways to determine whether to write a delta to a journal.

```
write_delta(transaction, address, offset, op, delta, threshold)
{
    /*
    * Look up the disk block for the given address so we can
    * try to apply a delta to it.
    */
    block = get_block_for_delta(transaction, address);
```

-continued

```
/*
 * Look up the pvr for this disk block and offset,
 * creating one if necessary.
 */
pvr = get_or_create_pvr(block, offset);
/* Try to apply the delta */
error = apply_delta(op, delta, pvr, threshold);
if (error)
    goto out;
/*
 * If the delta didn't cross the threshold, write it to the
 * journal as part of this transaction
 */
write_delta_to_journal(transaction, block, offset, op, delta);
out:
    return error;
}
```

Figure 4A:
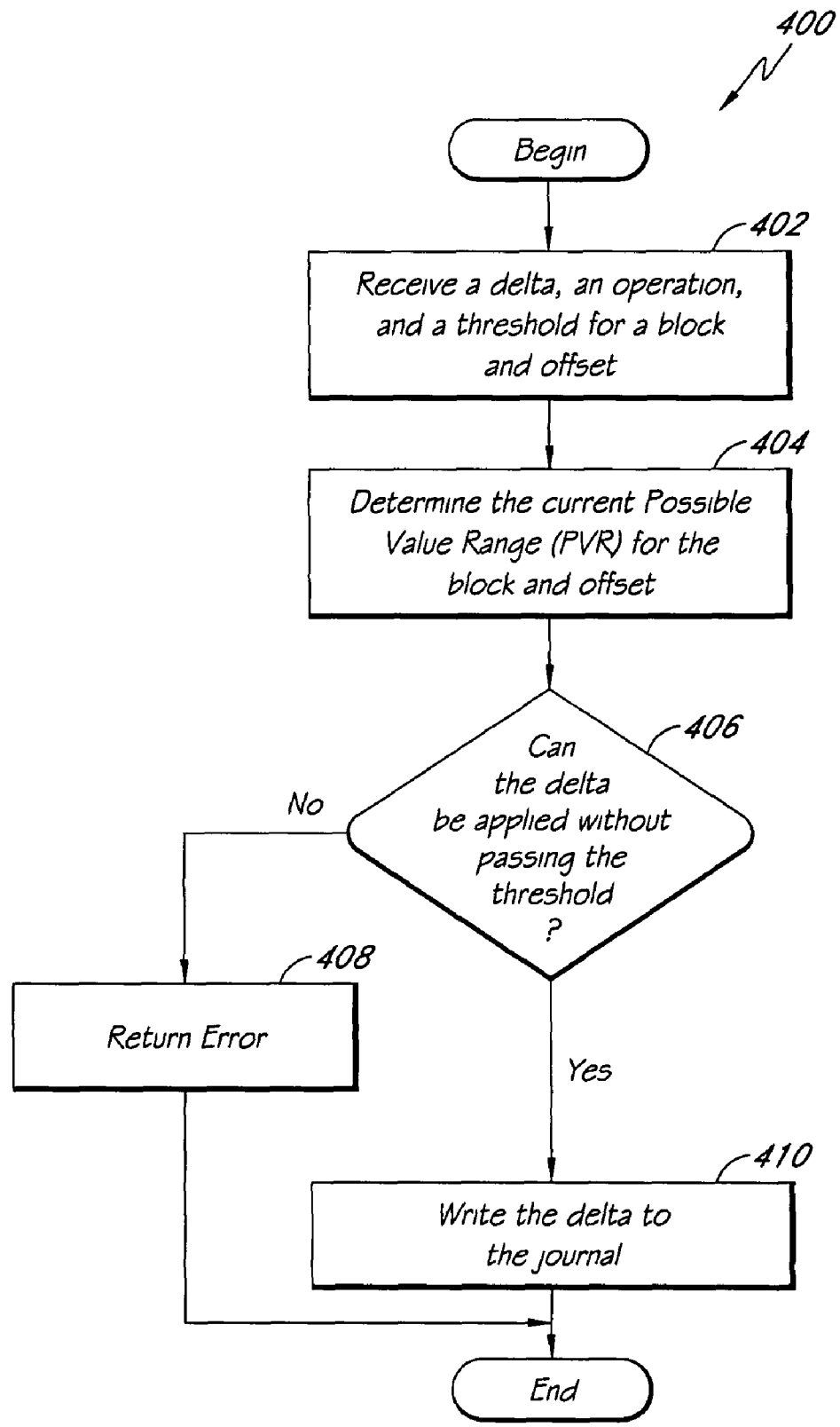
FIGS. 4A and 4B illustrate flow charts of embodiments of writing a delta transaction to a journal after determining whether the delta can be applied without passing a threshold.
Figure 4B:
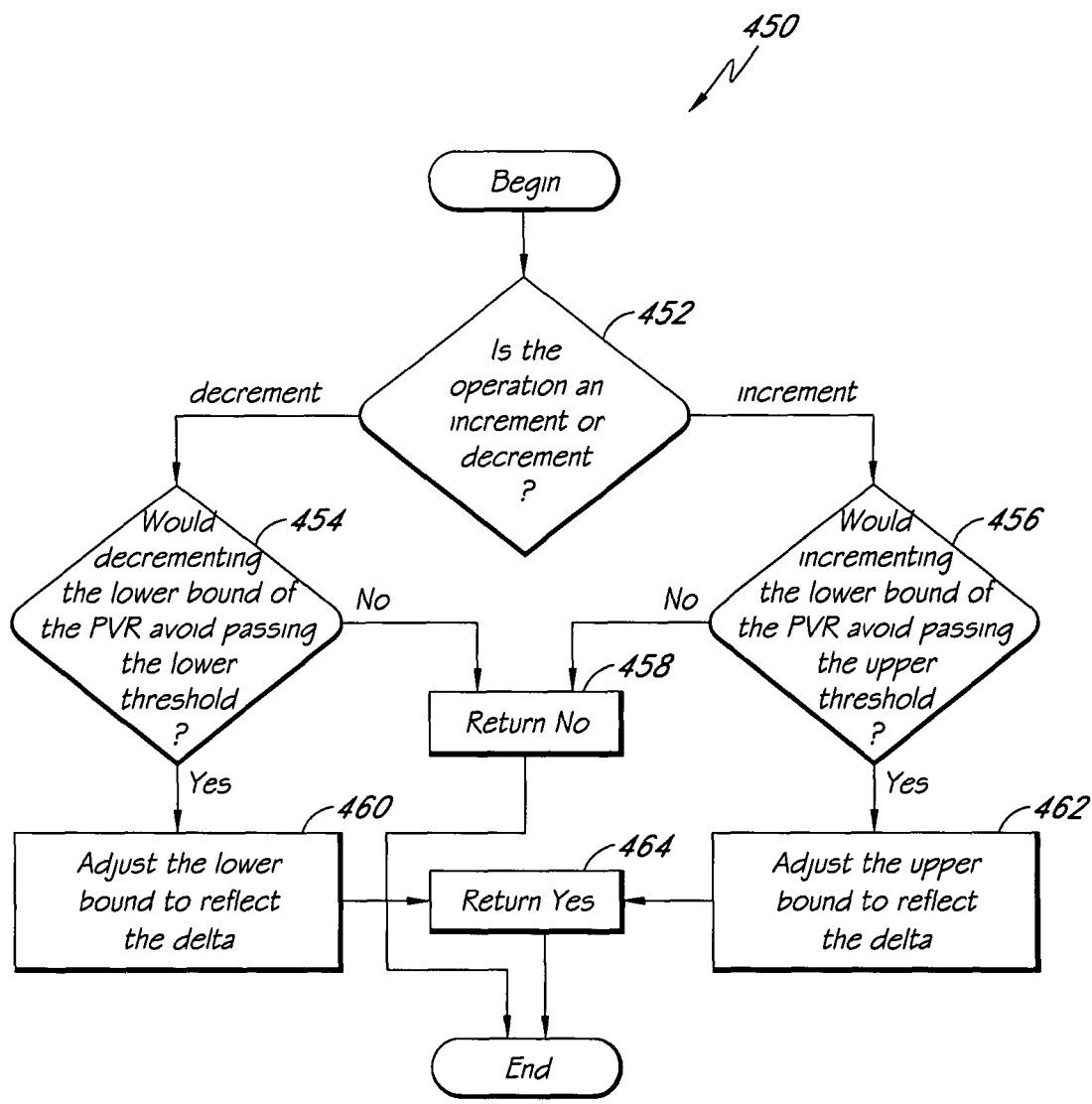

FIG. 4B illustrates, in greater detail, one embodiment of state 406 of FIG. 4A, which determines whether a delta can be applied without passing a threshold. In state 452, the PVR module determines whether the operation is an increment or decrement. If the operation is a decrement, the PVR module determines whether decrementing the lower bound of the PVR would avoid passing the lower threshold, in state 454. If the operation is an increment, the PVR module determines whether incrementing the upper bound of the PVR would avoid passing the upper threshold, in state 456. If decrementing the lower bound or incrementing the upper bound would cause the possible value to pass the lower or upper thresholds, respectively, the PVR module returns the answer "no," in state 458. If decrementing the lower bound of the PVR would not pass the lower threshold, the PVR module adjusts the lower bound to reflect the delta, in state 460. If incrementing the upper bound of the PVR module would avoid passing the upper threshold, the PVR module adjusts the upper bound to reflect the delta, in state 462. After adjusting either the lower bound or the upper bound, the PVR module returns the answer "yes," in state 464.

The following is exemplary pseudocode of one embodiment of determining whether a delta can be applied without passing a threshold. It will be appreciated by one skilled in the art that there are many suitable ways to determine whether a delta can be applied without passing a threshold.

```
apply_delta(op, delta, pvr, threshold)
{
    pvr_orig = pvr;
    pvr_tmp = pvr;
    error = 0;
    switch (op) {
    case ADD:
        pvr_tmp.high += delta;
        if (pvr_tmp.high < pvr_orig.high /* overflow */ ||
            pvr_tmp.high > threshold /* crossed threshold */) {
                error = ESPANSRANGE;
                goto out;
        }
    case SUB:
        pvr_tmp->low -= delta;
        if (pvr_tmp.low > pvr_orig.low /* overflow */ ||
            pvr_tmp.low < threshold /* crossed threshold */) {
                error = ESPANSRANGE;
                goto out;
        }
    }
    /* Copy out the modified pvr */
    pvr = pvr_tmp;
out:
    return error;
}
```

C. Example Transactions

Figure 5:
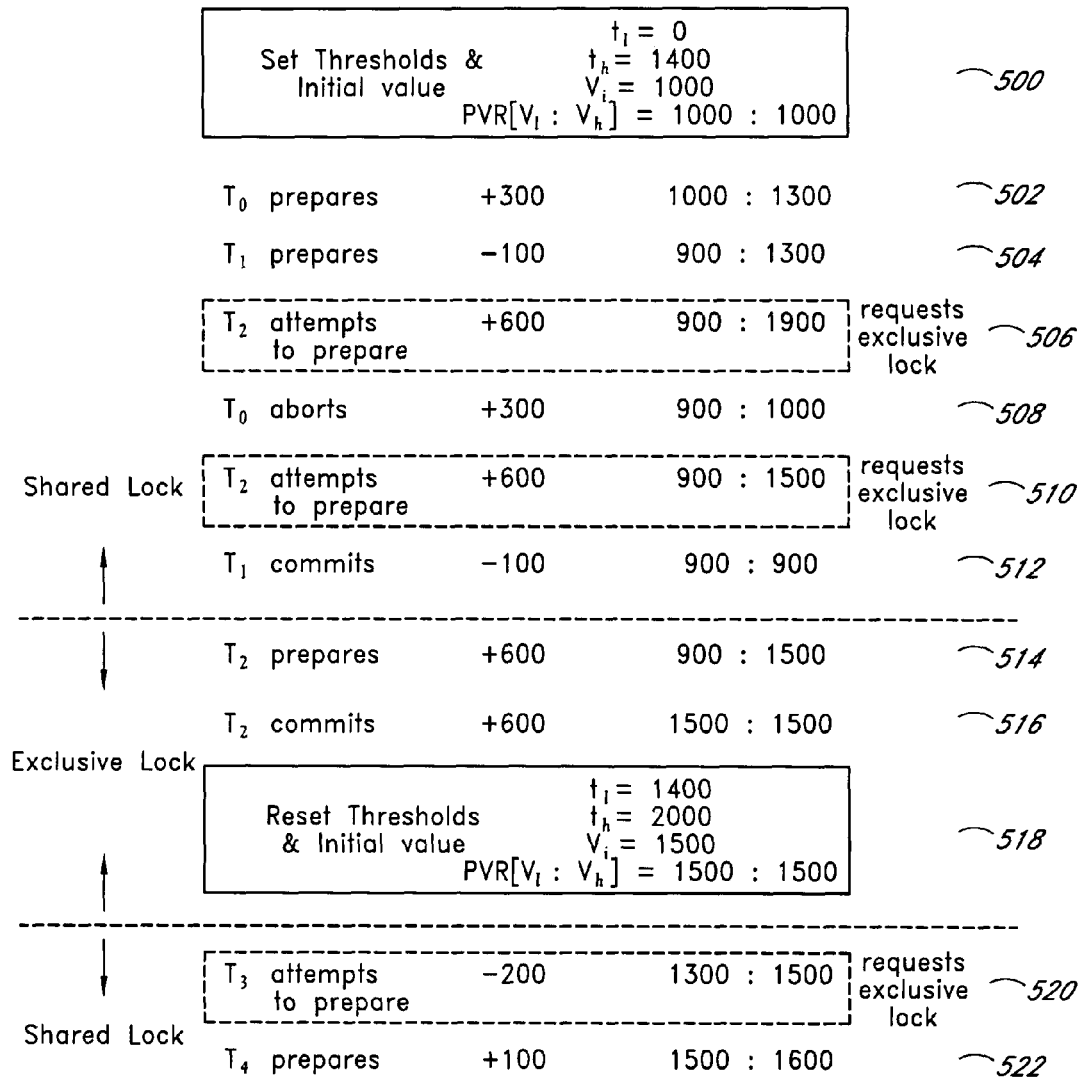
FIG. 5 illustrates one embodiment of processing delta transactions with a shared and an exclusive lock, respectively.

FIG. 5 illustrates one embodiment of how a group of transactions use possible value ranges (PVRs) to acquire an exclusive lock to pass a threshold. State 500 illustrates a set of initial conditions. A computing system, such as computing system 200, has a data field with an initial value $V_i$ set to "1000," a low threshold set to "0," and a high threshold set to "1400." Because there are no deltas defined in the initial state, the PVR of the data value, initially, is [1000:1000].

In state 502, transaction $T_0$ prepares. In the illustrated embodiment, when a transaction prepares, the associated delta is written to the journal. Because the transaction has not yet committed, the value of the associated data block is not certain. If transaction $T_0$ aborts, the value remains "1000." If the transaction $T_0$ commits, then the value would be 1300, as the incremental value of transaction $T_0$ for the data value is "300" and the operation type is increment. Thus, in state 502, the PVR is [1000:1300].

In state 504, transaction $T_1$ prepares. Transaction $T_1$, if committed, would decrement the value by "100." If transaction $T_0$ aborted and transaction $T_1$ committed, then the data value would be "900." Thus, the lowest possible value is "900." If transaction $T_0$ commits and transaction $T_1$ aborts, then the data value would be "1300," which is the highest possible value. Thus, the PVR is [900:1300]. If both $T_0$ and $T_1$ commit, then the data value would be "1200." If transaction $T_0$ and transaction $T_1$ both abort, then the data value would be "1000."

In state 506, transaction $T_2$ attempts to prepare. Because transaction $T_2$ would cause the PVR to pass the high threshold of "1400," transaction $T_2$ is not written to the journal. Subsequently, transaction $T_2$ requests an exclusive lock in order to serially handle the application of the delta, which could pass a threshold. In state 508, transaction $T_0$ aborts, and the PVR module adjusts the possible value range to [900:1000]. In state 510, transaction $T_2$ attempts to prepare again. Because transaction $T_2$ would still cause the possible value range to pass the high threshold, transaction $T_2$ is not allowed to prepare. Transaction $T_2$ continues to request the exclusive lock. In the illustrated embodiment, a disallowed transaction could repeatedly check to see if it still should request an exclusive lock before it receives one. Alternatively, a disallowed transaction would request an exclusive lock just once, and then wait for it. One skilled in the art will appreciate the various possible implementations of requesting/granting shared and exclusive locks. In state 512, transaction $T_1$ commits, causing the possible value range to be [900:900]. Although not illustrated, in some embodiments, transaction $T_2$ could check whether it still should request an exclusive lock.

In state 514, transaction $T_2$ acquires an exclusive lock. Transaction $T_2$ then prepares, causing the possible value range to adjust to [900:1500]. In state 516, transaction $T_2$ commits, causing the possible value range to change to [1500:1500]. In state 518, the PVR module resets the thresholds and the initial value because a threshold has been passed. The data value is updated to the current value of 1500. In the illustrated embodiment, an upper threshold is now set at 2000, and the previous upper threshold becomes a lower threshold. The PVR of the data value is now [1500:1500]. In the embodiment just described, a transaction is allowed to pass a threshold after acquiring an exclusive lock. Thresholds may be defined with different characteristics that cause different handling after acquiring an exclusive lock. Some thresholds, for example, may merely issue an advisory notice that a threshold has been passed, some may prevent a threshold from being passed, and some may prevent a threshold to be passed while certain conditions are met. One skilled in the art will appreciate that there are many suitable ways to define characteristics of thresholds. Some exemplary threshold types are discussed in greater detail below with reference to FIG. 6.

In state 520, transaction $T_3$ acquires a shared lock, and attempts to prepare. Because transaction $T_3$ could cause the possible value range to pass the lower threshold, it is not allowed to prepare. Transaction $T_3$ then requests an exclusive lock. In state 522, transaction $T_4$ prepares because it would not cause the possible value range to pass either the low or high threshold. The possible value range is now 1500:1600. The resolution of transactions $T_3$ and $T_4$ are not illustrated. Although the illustrated embodiments have resolved transactions that could pass thresholds by implementing shared and exclusive locks, in other embodiments there are other suitable ways to resolve these transactions, such as, for example, rejecting such transactions.

IV. Threshold Types

Figure 6:
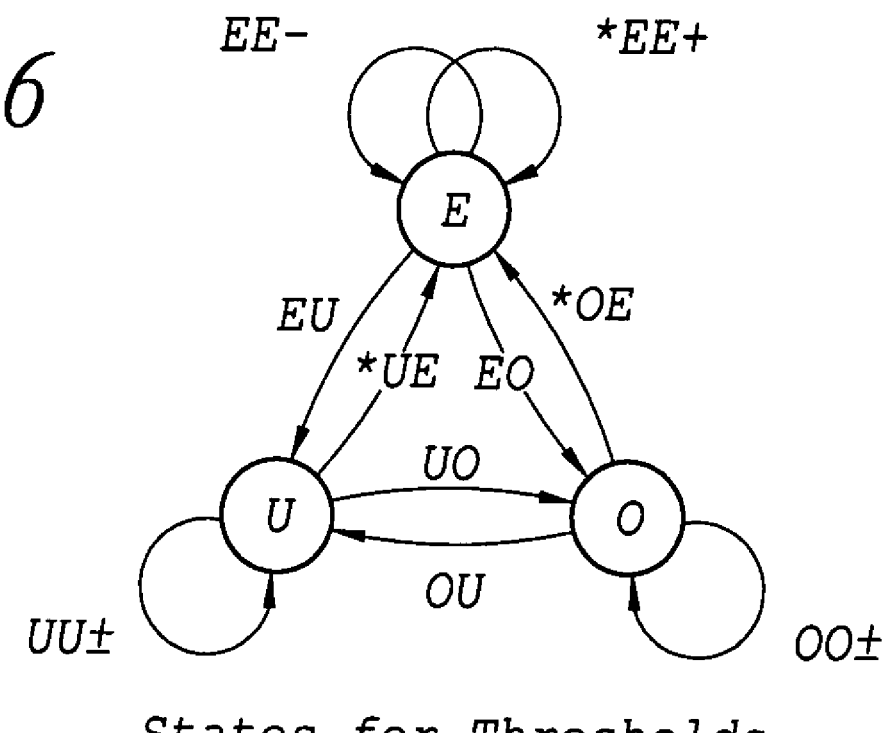
FIG. 6 illustrates one embodiment of a state diagram of thresholds for a data value being changed incrementally.

FIG. 6 illustrates embodiment of a state diagram that defines, for example, advisory, soft, and hard thresholds. For an advisory threshold, the PVR module allows the threshold to be passed, and sends an advisory notice that the threshold has been passed. A soft threshold also allows the threshold to be passed, but the passing of the threshold triggers a monitor of one or more conditions that, if satisfied, signal the PVR module to disallow the threshold to be passed subsequently. A hard threshold signals the PVR module to prevent the threshold from being passed. Transactions that attempt to pass a hard threshold are aborted.

Described below are enforcement states and state transitions corresponding to the state diagram illustrated in FIG. 6. As used below, "usage" refers to a data variable with defined thresholds. Furthermore, as used below, "grace period" refers to the amount of time a threshold may be exceeded before becoming another type of threshold, such as, for example, becoming a hard threshold after the grace period for a soft threshold has expired. A grace period is one embodiment of a condition which may be monitored to implement advisory, soft, and hard threshold semantics. In the described embodiment, all thresholds have an associated grace period. Advisory thresholds have an infinite grace period; hard thresholds have a grace period of zero; and anything else is a soft threshold. It is recognized that, in other embodiments, one or more, or even all, thresholds may not have an associated grace period. As described in greater detail below with reference to the embodiments disclosed in FIGS. 7, 8, 9, 10A, 10B, 10C, 10D, 10E, 10F, and 10G, "usage" refers to domain usage.

The following enforcement states correspond to the state diagram.

U (Under) If the usage is less than the enforcement threshold, the enforcement is in state U.

O (Over) If the usage is greater than the enforcement threshold, the enforcement is in state O. At the time the system transitioned to state O, the grace period for the given threshold was not yet expired. It is possible for the grace period to be expired while the enforcement remains in state O, if the corresponding domain has not been accessed since the grace period has expired.

E (Expired) If the usage is greater than the threshold, and the usage has remained over the enforcement threshold past the grace period expiration, and an attempt to access the domain has been made since the expiration, then the threshold is in state E. If the threshold is modified but not the grace period, and the usage still exceeds the threshold, the enforcement remains in state E.

The following state transitions correspond to the state diagram. State transitions marked with an asterisk define state transitions where errors may be returned and where the action may be denied.

UO An enforcement moves from state U to O when the usage is increased or the threshold is changed such that the usage exceeds the threshold, and the grace period on the threshold is non-zero (that is, not a hard threshold). The UO transition sets the expiration time.

UE An enforcement moves from state U to E when the usage is increased or the threshold is changed by an administrator such that the usage exceeds the threshold, and the enforcement has a grace period of zero (that is, a hard threshold). The UE transition also sets the expiration time, but, in this case, the time is already exceeded.

OU An enforcement moves from state O to U when usage is reduced or the threshold is changed such that the usage no longer exceeds the threshold. The OU transition resets the expiration time.

OE An enforcement moves from state O to state E once the grace period expiration is noticed. Expiration is only noticed during operations that involve the domain in some way (for example, allocation, queries, and so forth); in other words, an active timer for the grace period is not kept. Once the OE transition occurs, the action is reevaluated in the context of state E, meaning that if the action causes the usage to increase, the action is denied. An enforcement also moves from state O to state E if the grace period is lowered and, thus, now expired.

EO If an administrator raises the grace period for a threshold such that the grace period for an enforcement is no longer expired, the enforcement moves from state E to O.

EU An enforcement moves from state E to state U when usage is reduced or the threshold is changed such that the soft threshold is no longer exceeded. The EU transition resets the expiration time.

The following are situations where the full state does not change, but which are helpful to consider:

UU± An attempt to increase usage (UU+) or decrease usage (UU−) may cause an enforcement to stay within state U.

OO± An attempt to increase usage (OO+) or decrease usage (OO−) may cause an enforcement to stay within state O.

UEU An attempt to increase usage by a non-administrator may be denied as a result of a hard threshold. If the action had been allowed to continue, it would have resulted in a transition from U to E.

EE± An attempt to increase usage (EE+) or decrease usage (EE−) may cause an enforcement to stay within state E. The EE+ case is denied for non-administrators.

Although the above description relates to one embodiment of a state diagram, it is recognized that other embodiments may be used.

V. Quota Accounting

FIGS. 7, 8, 9, 10A, 10B, 10C, 10D, 10E, 10F, and 10G, and the accompanying text, describe one embodiment of a quota accounting module that uses PVRs to implement domain quotas within a data storage system. Domain quotas are quotas for the usage of a particular domain, for example, a file system domain. In some embodiments, it may be advantageous to define certain domains in a file system, and to set thresholds for the usage of such domains. By monitoring usage levels and/or enforcing thresholds, system administrators may maintain control over the amount of file system space allocated to a user or group of users. Because many transactions may be processed in close proximity, it may be advantageous to track the possible value ranges of domain usage, as uncommitted transactions become pending.

Figure 7:
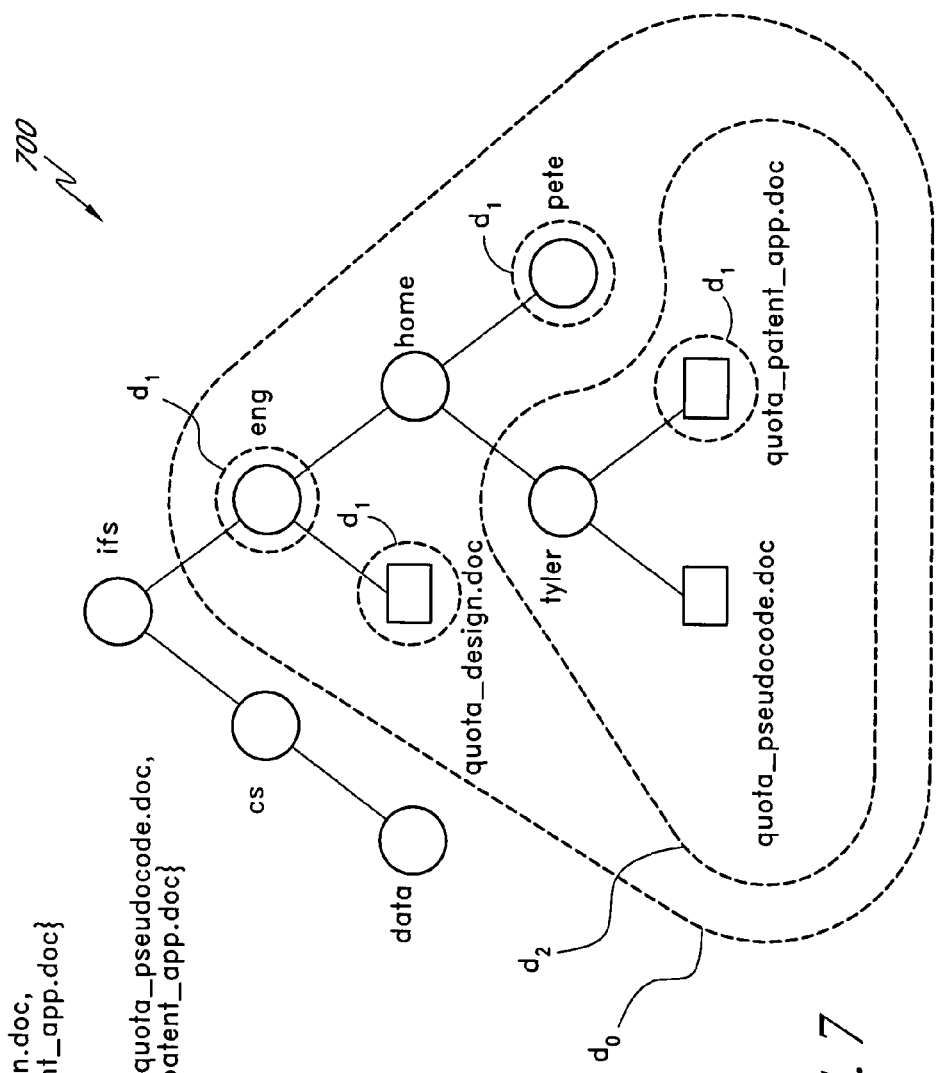
FIG. 7 illustrates one embodiment of three domains within a file system.
Figure 8:
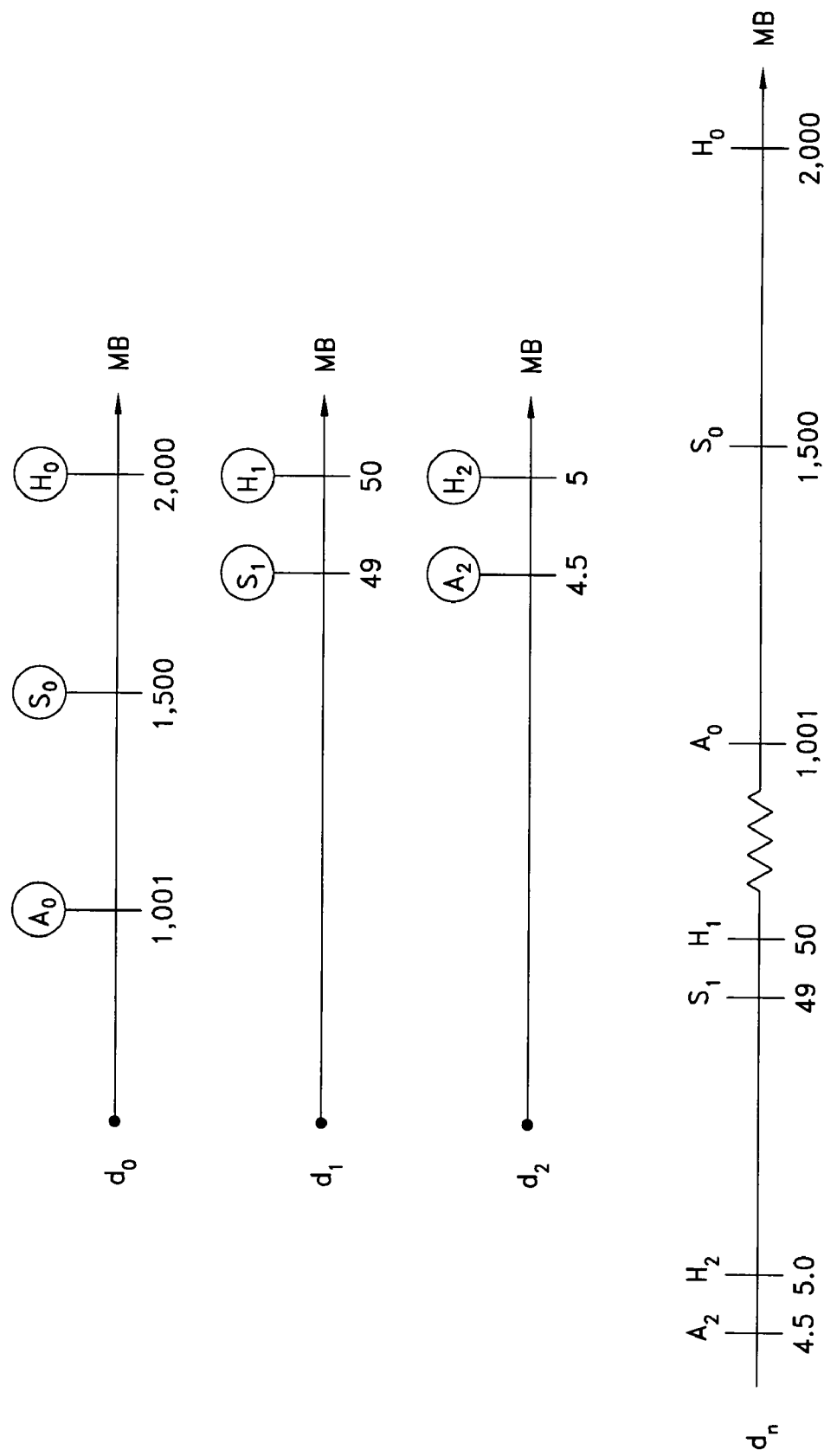
FIG. 8 illustrates various threshold values defined for three different domains.
Figure 9:
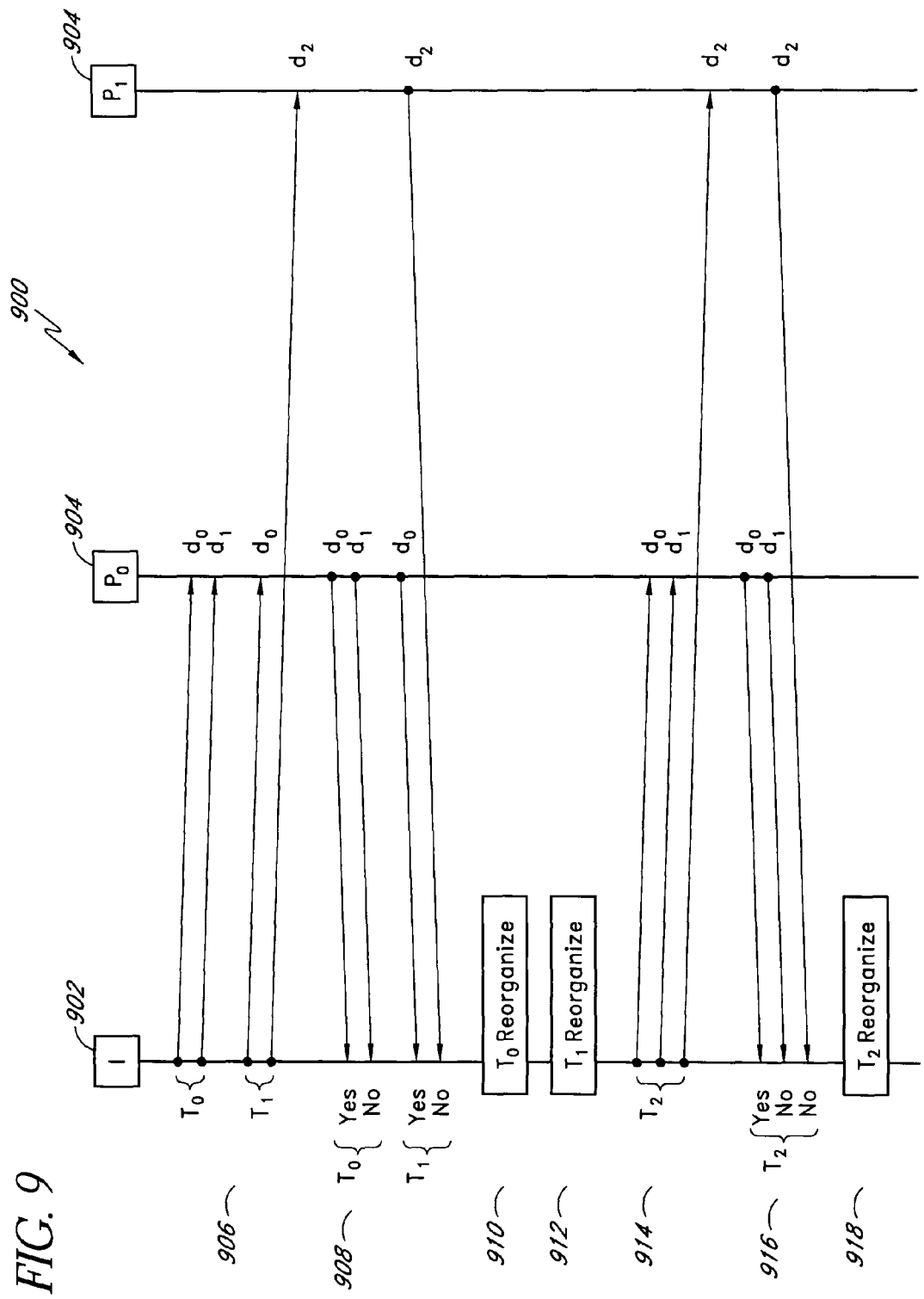
FIG. 9 illustrates one embodiment of a timing diagram of a distributed computing system that implements incremental computing.
Figure 10A:
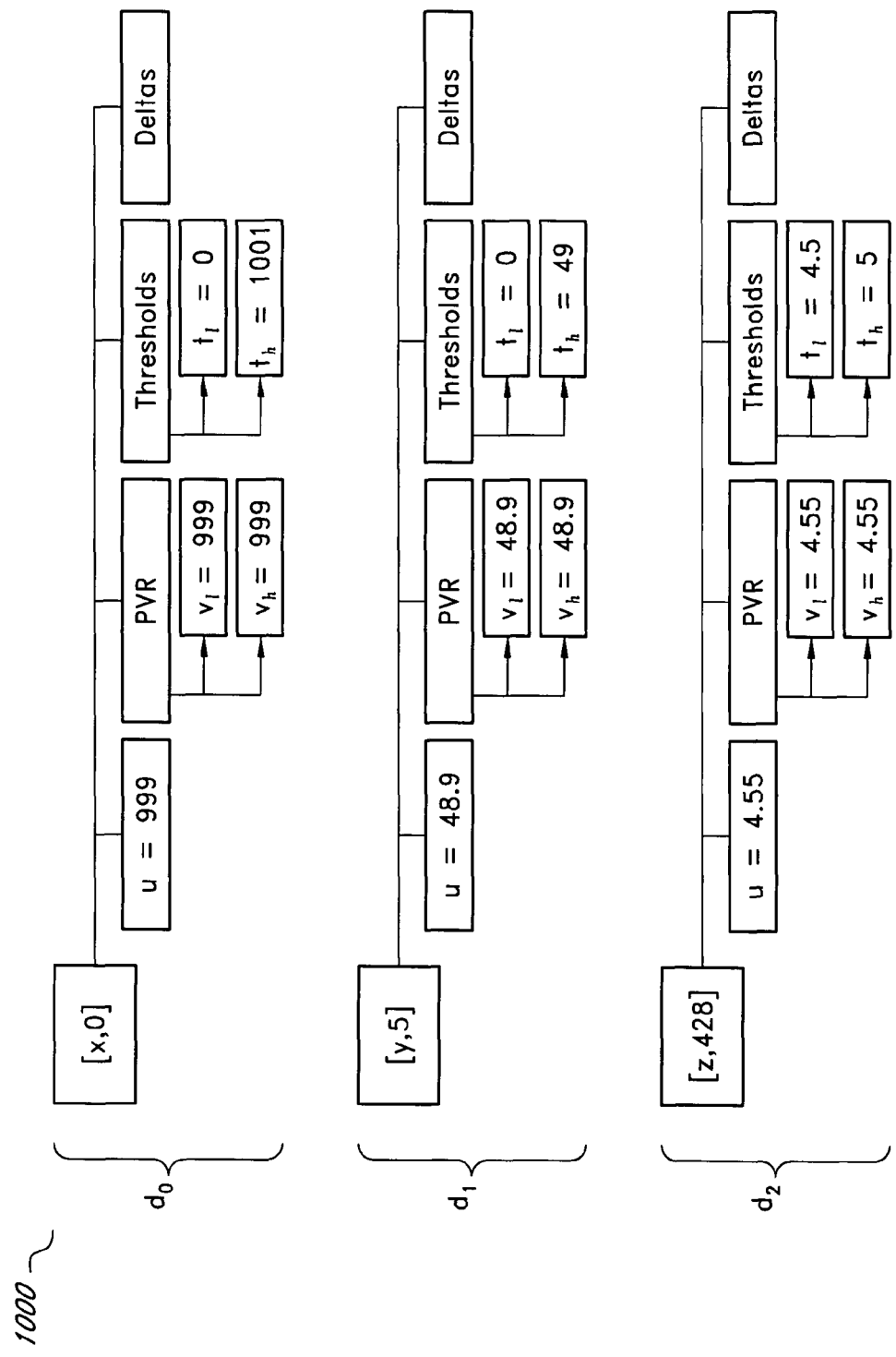
Figure 10B:
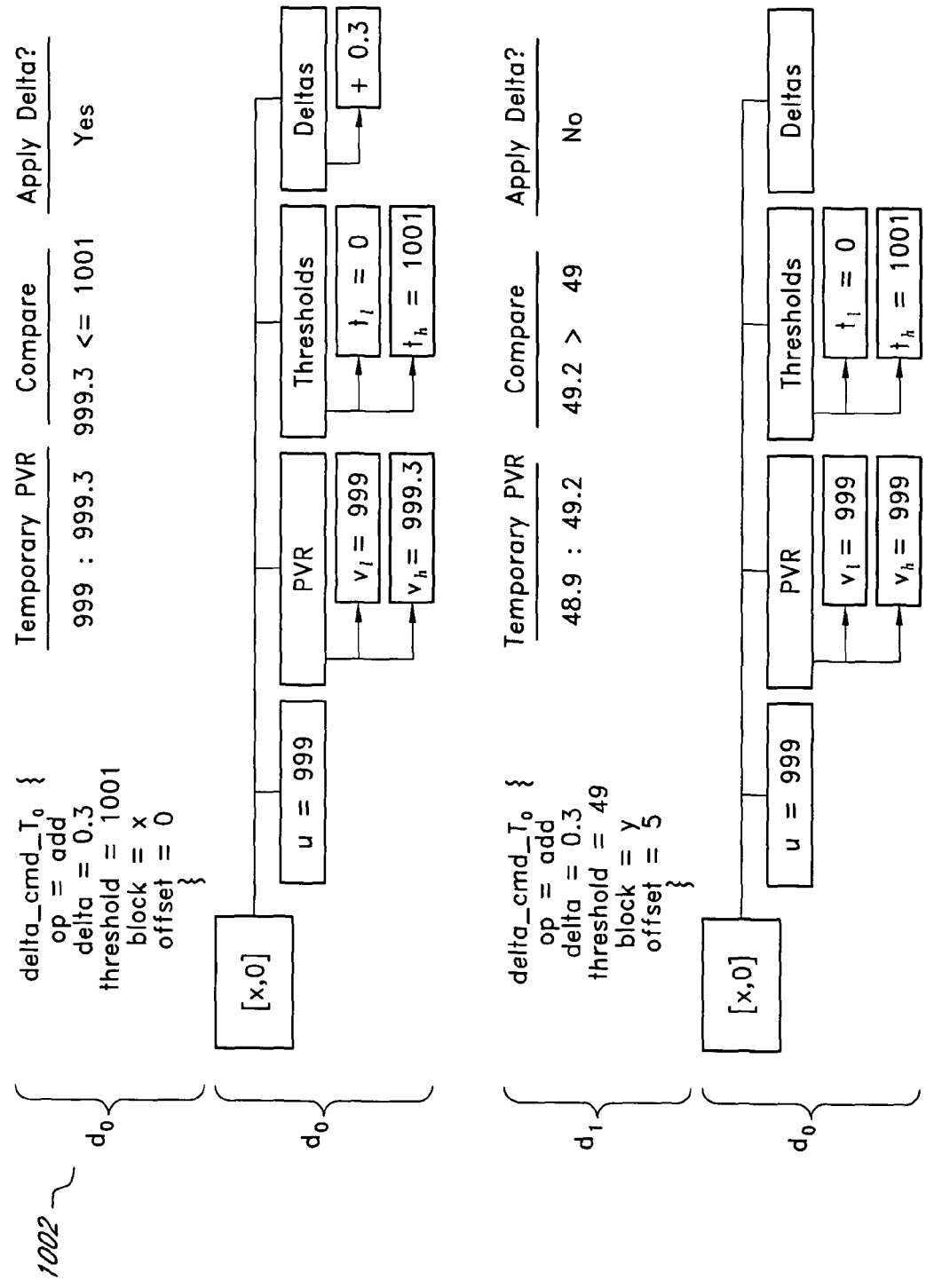
Figure 10D:
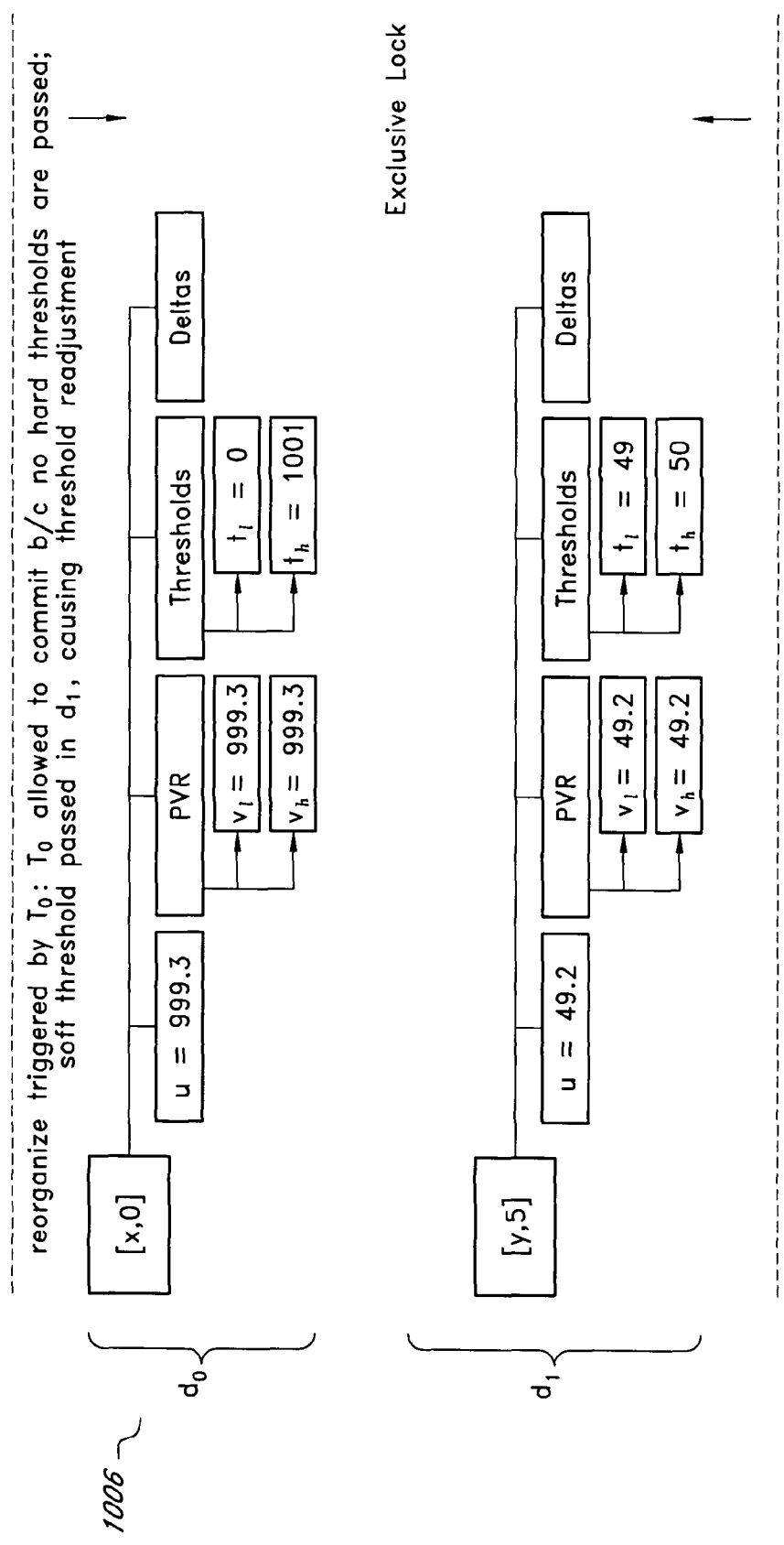
Figure 10E:
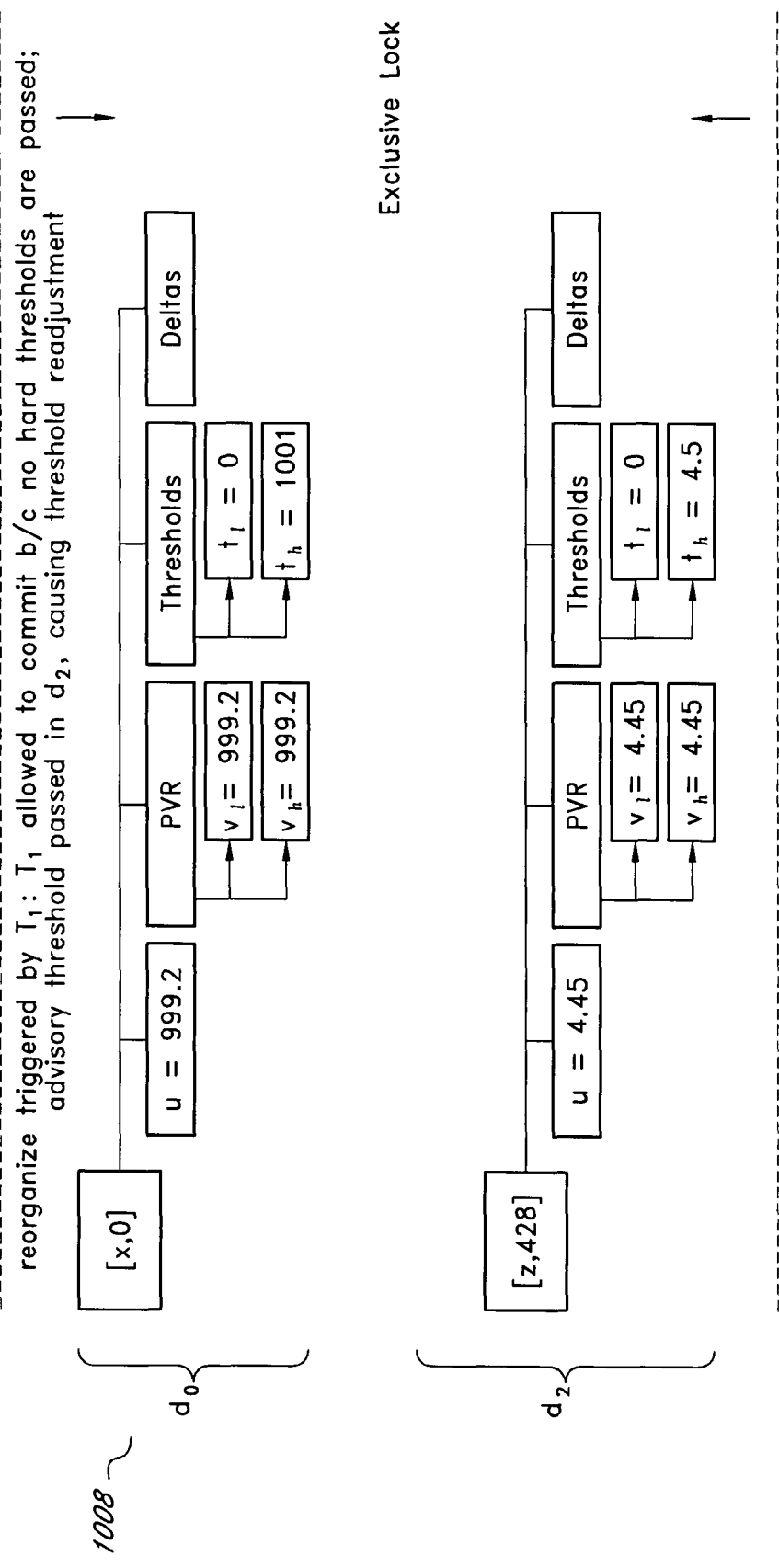
Figure 10F:
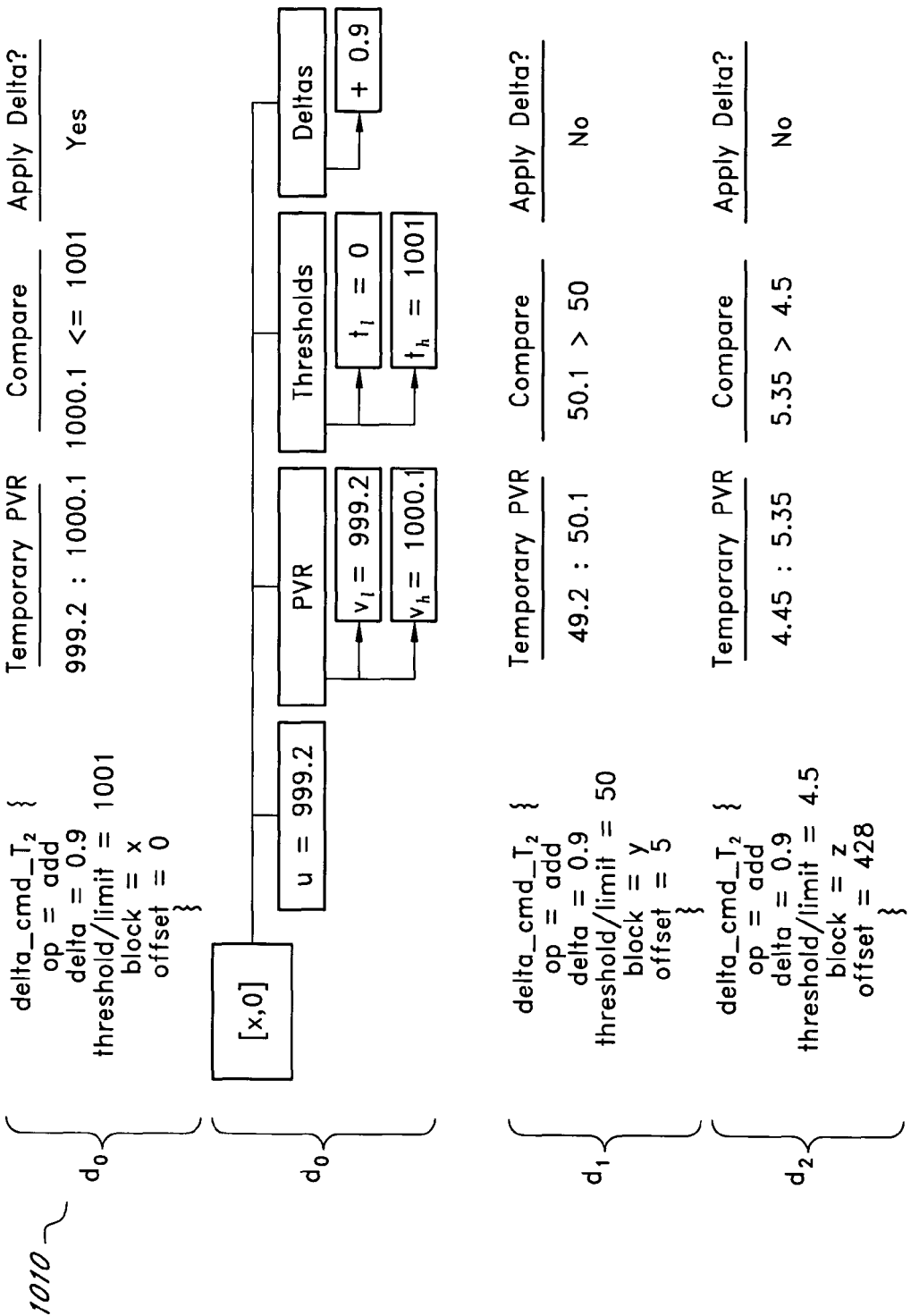
Figure 10G:
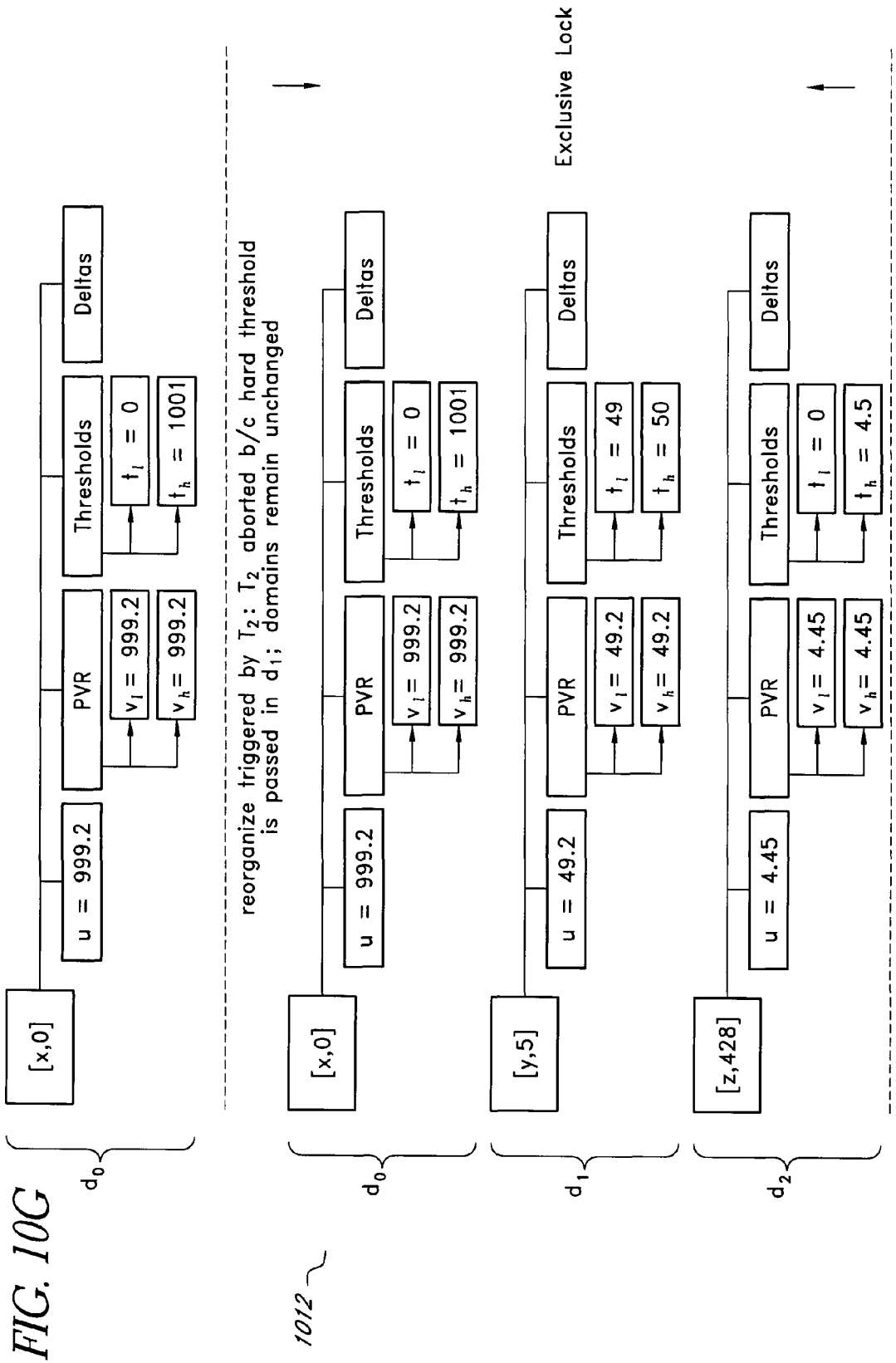

FIG. 7 and the accompanying text illustrate embodiments of several domains in an exemplary file system. FIG. 8 and the accompanying text illustrate exemplary threshold values defined for the exemplary domains. FIG. 9 illustrates one embodiment of a timing diagram of exemplary transactions that may cause the usage value of the exemplary domains to pass the exemplary thresholds. FIGS. 10A, 10B, 10C, 10D, 10E, 10F, and 10G illustrate, in greater detail, embodiments of the implementation of a quota accounting module that uses PVRs to manage the exemplary transactions.

A. Example Domains

FIG. 7 illustrates an example embodiment of three domains defined within a file system 700. File system 700 includes various directories and files organized in a tree-like data structure. As illustrated, there are three domains $(d_0, d_1, d_2)$ defined within file system 700. A domain is a set of directories and files associated together. Domain $d_0$ includes all of the files and directories within the /ifs/eng/ directory, which includes the following files and directories: eng/, quota_design.doc, home/, tyler/, quota_pseudocode.doc, pete/ and quota_patent_app.doc. Domain $d_1$ includes all of the files and directories owned by pete in the /ifs/eng/ directory, which includes the following files and directories: eng/, quota_design.doc, pete/ and quota_patent_app.doc. Domain $d_2$ includes all of the files in the directory ifs/eng/home/tyler/, which includes the following files and directories: tyler/, quota_pseudocode.doc and quota_patent_ap.doc.

FIG. 8 and Table 3 illustrate one embodiment of the various thresholds defined for domains $d_0$, $d_1$, and $d_2$. Usage values are stored for the respective domains. The usage values corresponding to domains $d_0$ and $d_1$ are stored on the same participant node $P_0$, described in greater detail below with reference to FIG. 9, on block "x" at offset "0" and on block "y" at offset "5," respectively. The usage value corresponding to domain $d_2$ is stored on participant node $P_1$ on block "z" at offset "428." The initial usage of domain $d_0$ is 999 megabytes, of domain $d_1$ is 48.9 megabytes, and of domain $d_2$ is 4.55 megabytes. Domain $d_0$ has three defined thresholds including an advisory threshold at one thousand and one megabytes, a soft threshold at one thousand five hundred megabytes, and a hard threshold at two thousand megabytes. Domain $d_1$ has two defined thresholds, including a soft threshold at forty-nine megabytes and a hard threshold at fifty megabytes. Domain $d_2$ also has two defined thresholds, including an advisory threshold at 4.5 megabytes and a hard threshold at five megabytes.

TABLE 3

| Domain | Participant (block, offset) = usage | Advisory Threshold | Soft Threshold | Hard Threshold |
|---|---|---|---|---|
| $d_0$ | $P_0$ (x, 0) = 999 MB | 1,001 MB | 1,500 MB | 2,000 MB |
| $d_1$ | $P_0$ (y, 5) = 48.9 MB | None | 49 MB | 50 MB |
| $d_2$ | $P_1$ (z, 428) = 4.55 MB | 4.5 MB | None | 5 MB |

B. Example Transactions

FIG. 9 illustrates one embodiment of a timing diagram of multiple transactions in embodiments of an incremental computing system. Incremental computing system 900 is a distributed file system, which includes an initiator node 902, node I, and two participant nodes 904, nodes $P_0$ and $P_1$. The timing diagram illustrates the order of messages sent and received by the various described nodes in the incremental computing system 900 as three transactions, $T_0$, $T_1$, and $T_2$, are accounted for in the system.

In the illustrated embodiment, the various nodes of the distributed file system may process transactions according to a global transaction system. A global transaction system in which embodiments of systems and methods described herein may be implemented, is described in U.S. patent application Ser. No. 11/449,153 entitled "NON-BLOCKING COMMIT PROTOCOL SYSTEMS AND METHODS," filed Jun. 8, 2006, which is a continuation of U.S. patent application Ser. No. 11/262,306 entitled "NON-BLOCKING COMMIT PROTOCOL SYSTEMS AND METHODS," filed Oct. 28, 2005, which claims priority to Application No. 60/623,843, filed Oct. 29, 2004, all of which are hereby incorporated by reference herein in their entirety.

In state 906, delta commands corresponding to transactions $T_0$ are sent from the initiator node I to participant node $P_0$. There are two delta commands corresponding to transaction $T_0$, each delta command corresponding to one of the two domains to which transaction $T_0$ corresponds. In state 906, the initiator node I also sends delta commands corresponding to transaction $T_1$ to participant nodes $P_0$ and $P_1$. Each of the delta commands corresponds to one of the respective domains to which transaction $T_1$ corresponds. The usage field for domain $d_0$ is stored on participant $P_0$, the usage field corresponding to domain $d_2$ is stored on participant $P_1$. Thus, delta commands are sent to both participant nodes $P_0$ and $P_1$. Because the usage field for domain $d_1$ is stored on participant node $P_0$, both delta commands corresponding to transaction $T_1$ are sent to participant node $P_0$. Transactions $T_1$ and $T_2$ are sent within a close period of time. Although in the illustrated embodiment, the delta commands arrive in the order in which they were sent, in other examples/embodiments the delta commands may arrive in an order different from their sending order. Generally speaking, the respective delta commands for transactions $T_1$ and $T_2$, the delta commands corresponding to $T_1$ and $T_2$ may be processed concurrently by participant nodes $P_0$ and $P_1$. Generally speaking, this concurrency may be between the respective participant nodes, or between the respective delta commands being executed on a particular participant node.

After participant nodes $P_0$ and $P_1$ determine whether or not the respective deltas can be applied without passing a threshold, participant nodes $P_0$ and $P_1$ send to the initiator node I a return message indicating a Boolean response of whether the delta may be applied without passing a threshold. In state 908, participant $P_0$ sends return values for the delta commands corresponding to transaction $T_0$. The return value for the delta command corresponding to domain $d_0$ is "Yes," indicating that the delta may be applied to domain $d_0$ without passing a threshold. The return value for the delta command corresponding to domain $d_1$ is "No," indicating that the delta cannot be applied without passing its threshold. In state 910, participants $P_0$ and $P_1$ return respective values for the delta commands corresponding to transaction $T_1$. The return value for the delta transaction corresponding to domain $d_0$ is "Yes," indicating that the delta can be applied without passing a threshold. The return value for the delta command corresponding to domain $d_2$ is "No," indicating that the delta cannot be applied without passing a threshold.

Because transactions $T_0$ and $T_1$ could each respectively cause a respective usage value to pass a threshold (transaction $T_0$ could cause usage for domain $d_1$ to pass a threshold; transaction $T_1$ could causes usage for domain $d_2$ to pass a threshold), a reorganization is executed for each transaction respectively. Thus, in state 910, a reorganization is executed corresponding to transaction $T_0$. In state 912, a reorganization is executed corresponding to $T_1$.

In state 914, initiator node I sends respective delta commands corresponding to transaction $T_2$. Because the usage fields for domains $d_0$ and $d_1$ are stored on participant $P_0$, the two respective delta commands corresponding to these domains are sent to participant $P_0$. The delta command corresponding to domain $d_2$ is sent to participant $P_1$ because the usage value corresponding to $d_2$ is stored on participant $P_1$. In state 916, participants $P_0$ and $P_1$ send the respective return values for transaction $T_2$ corresponding to domains $d_0$, $d_1$, and $d_2$. The return value for the delta command corresponding to $d_0$ is "Yes," indicating that the delta may be applied to the usage field of corresponding to $d_0$ without passing a threshold. The return values for the delta commands corresponding to domains $d_1$ and $d_2$ are "No," indicating that the delta value cannot be applied to the respective usage fields of domains $d_1$ and $d_2$ without passing the respective thresholds for these domains. This occurs in state 916. In state 918, a reorganization is executed corresponding to transaction $T_2$ because the thresholds corresponding to domains $d_1$ and $d_2$ could be passed if the respective delta of transaction $T_2$ is applied.

FIGS. 10A, 10B, 10C, 10D, 10E, 10F, and 10G illustrate, in more detail, embodiment of the execution of the delta commands corresponding to transactions $T_0$, $T_1$, and $T_2$, which are described above in the timing diagram illustrated in FIG. 9. In 1000, the respective usage fields for domains $d_0$, $d_1$, and $d_2$ are illustrated along with their corresponding PVR data structures. The usage value for domain $d_0$ is stored on block "x" of participant $P_0$ at offset "0." The initial usage value of domain $d_0$ is "999." Because there are no deltas yet associated with the usage value for domain $d_0$, the PVR is [999:999]. In other words, the low value $v_l$ of the PVR is "999," and the high value $v_h$ of the PVR is "999." There are two thresholds defined for domain $d_0$, the low threshold set to "0" and the high threshold set to "1001." There are no deltas yet for the usage value of domain $d_0$.

The usage value of domain $d_1$ is stored on disc block "y" of participant $P_0$ at offset "5." The initial usage value of domain $d_1$ is "48.9." Because there are no deltas yet for the usage value of domain $d_1$, the PVR of the usage for domain $d_1$ is [48.9:48.9]. In other words, the low value $v_l$ of the PVR corresponding to domain $d_1$ is "48.9," and the high value $v_h$ of the PVR corresponding to domain $d_1$ is "48.9." There are two thresholds defined for domain $d_1$, the low threshold set to "0" and the high threshold set to "49." As mentioned above, there are no deltas defined for the usage of domain $d_1$.

The usage value for domain $d_2$ is stored on disc block "z" of participant $P_2$ at offset "428." The initial usage value is "4.55." Because there are no deltas yet defined for the usage value on domain $d_2$, the PVR of the usage for domain $d_2$ is [4.55:4.55]. In other words, the low value $v_l$ of the PVR for the usage value corresponding to domain $d_2$ is 4.55, and the high value $v_h$ of the PVR corresponding to usage for domain $d_2$ is also 4.55. There are two thresholds defined for the usage value corresponding to domain $d_2$, the low threshold set to "4.5," and the high threshold set to "5." As mentioned above, there are no deltas yet defined for the usage value corresponding to domain $d_2$.

Table 4 illustrates one embodiment of the initial domain usage values described above, and also illustrates the potential incremental affects of three transactions, $T_0$, $T_1$, and $T_2$, on the domain usage.

TABLE 4

|  | $d_0$ | $d_1$ | $d_2$ |
|---|---|---|---|
| Initial Usage Value for Domain $d_n$ | 999 MB | 48.9 MB | 4.55 MB |
| $T_0$ write (quota_design.doc) | +0.3 MB | +0.3 MB | N/A |
| $T_1$ write (quota_pseudocode.doc) | −0.1 MB | N/A | −0.1 MB |
| $T_2$ write (quota_patent_app.doc) | +0.9 MB | +0.9 MB | +0.9 MB |

In 1002, the respective delta commands corresponding to transaction $T_0$ are received by participant $P_0$. There are two delta commands corresponding to the two domains $d_0$ and $d_1$, the domains affected by transaction $T_0$. In other words, transaction $T_0$ modifies files and/or directories within domain $d_0$ and $d_1$, changing the usage values corresponding to these respective domains. Although in the illustrated embodiment the delta_cmd_$T_0$ corresponding to domain $d_0$ is processed before the delta_cmd_$T_0$ corresponding to $d_1$, in other embodiments the delta commands may be processed in a different order.

The delta_cmd_$T_0$ corresponding to domain $d_0$ includes an operator type field set to "add," a delta field set to "0.3," a threshold field set to "1001," a block field set to "x," and an offset field set to "0." In order words, the delta_cmd_$T_0$ corresponding to do requests whether "0.3" may be added to the usage level corresponding to domain $d_0$, which is stored on block "x" at offset "0," without passing the threshold "1001." $T_0$ could cause the PVR of the usage value for domain $d_2$ to be [999:999.3]. In other words, if $T_0$ executes (commits), then the usage of domain $d_0$, in combination with any other pending transactions, could be "999.3." If transaction $T_0$ does not execute (aborts), then the usage value for domain $d_0$ could be "999." Because the high value $v_h$ of the PVR corresponding to domain $d_0$ is less than the high threshold corresponding to domain $d_0$, the delta can be applied without passing a threshold. Subsequently, the delta is written to the journal, as described in greater detail above with reference to FIGS. 3, 4A, and 4B. The in-memory structures tracking the possible value range and the deltas are modified. Specifically, the high value $v_h$ of the PVR corresponding to $d_0$ is now "999.3." Furthermore, the delta value "+0.3" is stored in memory.

The delta_cmd_$T_0$ corresponding to domain $d_1$ includes an operator type field set to "add," a delta field set to "0.3," a threshold field set to "49," a block field set to "y," and an offset field set to "5." In order words, the delta_cmd_$_{T0}$ corresponding to $d_1$ requests whether "0.3" may be added to the usage level corresponding to domain $d_1$, which is stored on block "y" at offset "5," without passing the threshold "49." $T_0$ could cause the PVR corresponding to domain $d_1$ to be [48.9:49.2]. In other words, the delta corresponding to transaction $T_0$ would push the high value of the possible value range of the PVR to "49.2." Thus, if transaction $T_0$ executes (commits), then the usage value for domain $d_1$, in combination with any other pending transactions, could be "49.2." If, however, the transaction $T_0$ does not execute (aborts), then the usage value of domain $d_1$ could be "48.9." Because the possible high value of the PVR is greater than the value of the high threshold corresponding to domain $d_1$, the delta corresponding to transaction $T_0$ cannot be applied without passing a threshold. Because transaction $T_0$ could cause the usage value of $d_1$ to pass a threshold, the return value of delta_cmd_$T_0$ for domain $d_1$ is "No." Transaction $T_0$, therefore, requests an exclusive lock. Because transaction $T_0$ would not have passed a threshold in domain $d_0$, as discussed above, the delta was applied to the data structures corresponding to domain $d_0$. Because transaction $T_0$ is now suspended until it acquires an exclusive lock, the data structures corresponding to domain $d_0$ are rolled back to their condition prior to transaction $T_0$. Thus, the PVR for usage in domain $d_0$ is "999:999," and there are no pending deltas.

In 1004, the delta commands corresponding to transaction $T_1$ are processed. As mentioned above, although in the illustrated embodiment, the respective delta commands are processed in the order of $d_0$ and then $d_2$, in other embodiments the delta commands may be processed in a different order. The delta_cmd_$T_1$ corresponding to domain $d_0$ includes an operator type field set to "sub," a delta field set to "0.1," a threshold field set to "0," a block field set to "x," and an offset field set to "0." In order words, the delta_cmd_$T_1$ corresponding to $d_0$ requests whether "0.1" may be subtracted from the usage level corresponding to domain $d_0$, which is stored on block "x" at offset "0," without passing the threshold "0." Transaction $T_1$ could decrease the low value $v_l$ of the PVR the usage value for domain $d_0$ to "9.2." Thus, the temporary PVR of the usage value of domain $d_0$, in combination with any other transactions, is [99.2:99.3]. Because the low value $v_l$ of the PVR corresponding to the usage field of domain $d_0$ is greater than or equal to the low threshold corresponding to domain $d_0$, the delta value of delta_cmd_$T_1$ can be applied without crossing a threshold. Subsequently, the delta is written to the journal, as described in greater detail above with reference to FIGS. 3, 4A, and 4B. The in-memory structures tracking the possible value range and the deltas are modified. Specifically, the low value $v_l$ of domain $d_0$ is decremented by the delta value "0.1." Furthermore, the delta value "–0.1" is also recorded in memory, as a pending delta.

The delta_cmd_$T_1$ corresponding to domain $d_2$ includes the following data fields: an operator type field set to "sub," a delta field set to "0.1," a threshold field set to "4.5," a block field set to "z," and an offset field set to "428." In other words, the delta_cmd_$T_1$ requests whether "0.1" may be subtracted from the usage value corresponding to domain $d_2$, which is stored on block "z" at offset "428," without passing the threshold "4.5." Transaction $T_1$ could cause the PVR corresponding to domain $d_2$ to be [4.45:4.55]. Because transaction $T_1$ could cause the usage value of $d_2$ to pass a threshold, the return value of delta_cmd_$T_1$ for domain $d_2$ is "No." Transaction $T_1$, therefore, requests an exclusive lock. Because transaction $T_1$ would not have passed a threshold in domain $d_0$, as discussed above, the delta was applied to the data structures corresponding to domain $d_0$. Because transaction $T_1$ is now suspended until it acquires an exclusive lock, the data structures corresponding to domain $d_0$ are rolled back to their condition prior to transaction $T_1$. Thus, the PVR for usage in domain $d_0$ is still "999:999," and there are no pending deltas.

In 1006, the PVR module reorganizes domains $d_0$ and $d_1$ based on transaction $T_0$. Because transaction $T_0$ could cause the usage value of domain $d_1$ to pass the corresponding soft threshold in the upward direction, transaction $T_0$ is processed with an exclusive lock, and the relevant domains $d_0$ and $d_1$ are reorganized. During the reorganization, transaction $T_0$ is allowed to commit because no hard thresholds are passed. Because transaction $T_0$ would increment the respective usage values of domains $d_0$ and $d_1$ by "0.3," the usage value of domain $d_0$ is set to "999.3," and the usage value of domain $d_1$ is set to "49.2." The respective PVR values are adjusted to reflect the respective usages for domains $d_0$ and $d_1$. Because no thresholds were passed in domain $d_0$, the thresholds remain the same for $d_0$. Because transaction $T_0$ causes the usage value of domain $d_1$ to pass the soft threshold for domain $d_1$ in the upward direction, the thresholds are adjusted. The low threshold for domain $d_1$ is now the soft threshold of "49" and the high threshold for domain $d_1$ is now the hard threshold "50."

Because transaction $T_1$ could also cause one of the usage values of domains $d_0$ and $d_2$ to pass a threshold, in 1008, domains $d_0$ and $d_2$ are reorganized by transaction $T_1$. During the reorganization, transaction $T_1$ is allowed to commit because no hard thresholds are passed. With respect to domain $d_0$, the usage value is decremented to "999.2." Because transaction $T_1$ does not cause the usage value of domain $d_0$ to pass a threshold, the thresholds for domain $d_0$ remain the same. With respect to domain $d_2$, the usage value is decremented to 4.45. Because the new decremented usage value passes the advisory threshold in the downward direction, the thresholds are readjusted. The adjusted low threshold is now "0," and the adjusted high threshold is now the advisory threshold "4.5."

In 1010, the delta commands corresponding to transaction $T_2$ are processed. With respect to domain $d_0$, delta_cmd_$T_2$ includes the following data fields: an operation type field set to "add," a delta field set to "0.9," a threshold field set to "1001," a block field set to "x," and an offset field set to "0." In other words, delta_cmd_$T_2$ requests whether "0.9" may be added to the usage value corresponding to $d_0$, which is stored on block "x" at offset "0," without passing the threshold "1001." Thus, the temporary PVR is [99.2:1000.1]. Said differently, delta_cmd_$T_2$ could increment the high value $v_h$ of the PVR corresponding to domain $d_0$ to "1000.1." Because 1000.1 is less than or equal to 1001, the delta may be applied without passing a threshold. In other words, because the high value $v_h$ of the PVR for domain $d_0$ would be less than the high threshold for $d_0$, the delta may be applied. Subsequently, the delta is written to the journal, as described in greater detail above with reference to FIGS. 3, 4A, and 4B. The in-memory structures tracking the possible value range and the deltas are modified. Subsequently, the high value $v_h$ of the PVR for $D_0$ is adjusted to "1000.1" and the delta value "+0.9" is recorded in system memory.

With respect to domain $d_1$, delta_cmd_$T_2$ includes the following data fields: an operation type field set to "add," a delta field set to "0.9," a threshold field set to "50," a block field set to "y," and an offset field set to "5." In other words, delta_cmd_$T_2$ requests whether "0.9" may be added to the usage value corresponding to domain $d_1$, which is stored on block "y" at offset "5," without passing the threshold "50." Transaction $T_2$ could cause the PVR for $d_1$ to be [49.2:50.1]. In other words, delta_cmd_$T_2$ could increment the high value $v_h$ of the PVR of domain $d_1$ to "50.1." Because 50.1 is greater than 50, the delta_cmd_$T_2$ could cause $d_1$ to pass a threshold. Specifically, the transaction $T_2$ could cause the usage value of domain $d_1$ to pass the high threshold, which is a hard threshold. Because transaction $T_2$ could cause the usage value of $d_1$ to pass a threshold, the return value of delta_cmd_$T_1$ for domain $d_1$ is "No."

With respect to domain $d_2$, delta_cmd_$T_2$ includes the following data fields: an operation type field set to "add," a delta field set to "0.9," a threshold field set to "4.5," a block field set to "z," and an offset field set to "428." In other words, delta_cmd_$T_2$ requests whether "0.9" may be added to the usage value corresponding to domain $d_2$, which is stored on block "z" at offset "428," without passing the threshold "4.5." If delta_cmd_$T_2$ is applied, the PVR for $d_2$ would be [4.45:5.35]. In other words, the delta_cmd_$T_2$ would increase the high value $v_h$ of the PVR of domain $d_2$ to "5.35." Because 5.35 is greater than 4.5, which is the high threshold, the delta_cmd_$T_2$ could cause the usage value of domain $d_2$ to pass a threshold. Because transaction $T_2$ could cause the usage value of $d_2$ to pass a threshold, the return value of delta_cmd_$T_1$ for domain $d_2$ is "No."

Because transaction $T_2$ could cause the usage value of either $d_1$ or $d_2$ to pass a threshold, transaction $T_2$ requests an exclusive lock. Because transaction $T_2$ would not have passed a threshold in domain $d_0$, as discussed above, the delta was applied to the data structures corresponding to domain $d_0$. Because transaction $T_2$ is now suspended until it acquires an exclusive lock, the data structures corresponding to domain $d_0$ are rolled back to their condition prior to transaction $T_2$. Thus, the PVR for usage in domain $d_0$ is "999.2:999.2," and there are no pending deltas.

In 1012, domains $d_0$, $d_1$, and $d_2$ are reorganized because transaction $T_2$ could cause one or more thresholds to be passed in the respective domains. Specifically, because transaction $T_2$ could cause the usage values of domains $d_1$ and $d_2$ to pass respective thresholds, the relevant domains are reorganized. Because transaction $T_2$ could cause the usage of domain $d_1$ to pass a hard threshold, transaction $T_2$ is aborted. Accordingly, the usage values of domains $d_0$, $d_1$, and $d_2$ remain the same. Similarly, the PVRs and thresholds for domains $d_0$, $d_1$, and $d_2$ also remain the same. In the illustrated embodiment, during reorganization, the transaction with the exclusive lock is processed serially with respect to the different affected domains. For example, transaction $T_2$ may be processed first with respect to domain $d_0$ and then domain $d_1$. Because transaction $T_2$ would not cause domain $d_0$ to pass a threshold, the data structures corresponding to $d_0$ may be adjusted before it is discovered that transaction $T_2$ would cause domain $d_1$ to pass a hard threshold, triggering an abort of transaction $T_2$. Accordingly, during reorganization, some data structures may be changed and then rolled back after discovering that a hard threshold is passed. Although the final states of the three respective domains are illustrated in the example above, the temporary modification and subsequent readjustment are not illustrated.

VI. Resource Usage Management

In many computing environments it is desirable to manage usage of one or more resources by consumers of the resources. Resource usage management may include, for example, determining the types of resources to be managed, tracking and accounting for the usage of these resources, reporting resource usage to a system administrator, and/or enforcing limits on the resource usage. The types of resources accounted for may represent resources that are part of the computing environment (for example, physical space on a storage medium) or external to the environment (for example, monetary value of banking or brokerage accounts). Consumers of the resources may include, for example, users having system accounts in the computing environment as well as processes and threads that consume computing resources.

For purposes of illustration, embodiments of systems and methods for resource usage management will be described with reference to a distributed computing environment and in particular with reference to quota tracking systems and methods for a distributed file system. The systems and methods disclosed herein are not limited to these illustrative embodiments and are applicable to a wide range of implementations. For example, a bank may wish to track account balances for its account holders, or a securities brokerage may wish to track the trading activity of participants on an securities exchange. In an Internet context, an Internet Service Provide may wish to monitor and enforce limits on bandwidth use.

FIG. 11 schematically illustrates one embodiment of a distributed computing system 1100*a* that comprises N threads 1102 labeled as $S_i$, where index i runs from 0 to N-1.

In one embodiment, the computing system 1100*a* is a distributed file system and the threads 1102 comprise nodes of the file system. In this example, a resource R having usage U (on some or all of the threads $S_i$) is tracked by an accounting system 1104 denoted by C in FIG. 11 and is checked against at least one threshold H. In a file system embodiment, the resource may comprise physical space in a quota domain on the file system, and the threshold H may be a hard, soft, and/or advisory threshold described above. If a request for the resource will cause the resource usage U to pass the threshold H, the accounting system 1104 may take a suitable enforcement action, which may depend on the threshold type. For example, in a file system embodiment, if a request to write a new file or modify an existing file will cause the usage U to pass a hard threshold H, the accounting system 1104 may prevent writing the new file or modifying the existing file. If, in this example, the threshold H were an advisory threshold, the accounting system 1104 may allow the new file to be written or the existing file to be modified and may communicate an appropriate notification to the resource requestor and/or a file system administrator.

The implementation of the accounting system 1104 illustrated in FIG. 11 may suffer a disadvantage, because all of the updates, on any of the threads $S_i$, to the resource usage U are processed by the single thread $S_0$. If the number (or rate) of updates becomes too large, capacity of the thread $S_0$ may be insufficient to handle the updates, and the thread $S_0$ may become a bottleneck for the computing system 1100*a*.

FIG. 11 illustrates an alternative implementation that addresses this disadvantage. In this example implementation, a computing system 1100*b* also comprises N threads 1102 labeled as $S_i$. An accounting system 1108 is allocated among the threads 1102 as N subsystems $C_i$. Although FIG. 11 illustrates each thread $S_i$ as having a single subsystem $C_i$, in other embodiments, a different allocation may be used, and a particular thread $S_i$ may be allocated 0, 1, 2, 3, 7, 23, or any other number of accounting subsystems 1108. Also, although FIG. 11 illustrates the same number of subsystems $C_i$ as threads $S_i$, in other embodiments, the number of subsystems $C_i$ may be less than, or greater than, the number of threads $S_i$. The total usage U of the resource may be divided into subusages $U_i$ for each of the subsystems $C_i$. Similarly, the threshold H may be divided into subthresholds $H_i$. In certain embodiments, it may be desirable to provide an exact accounting for the resource usage U on the system 1100*b*. Accordingly, in these embodiments, the organization into subsystems $C_i$ may be made so that the sum of the subusages $U_i$ equals the total usage U and the sum of the subthresholds $H_i$ equals the threshold H.

The implementation of the accounting system 1108 advantageously may avoid or reduce the likelihood of a bottleneck, because updates to resource usage on the computing system 1100*b* are processed by the N threads $S_0$ to $S_{N-1}$ rather than by one thread (as in system 1100*a*) or a few threads. An additional advantage is that the accounting system 1108 is scalable. For example, if new threads are added to (or existing threads are removed from) the distributed computing system, the number of accounting subsystems can be increased or decreased to accommodate the change. Additionally, distributed computing systems may have a very large number of users consuming resources. The number of subsystems $C_i$ in the accounting system 1108 may be suitably scaled to handle resource usage by the users.

FIG. 11 illustrates another aspect of the organization of the accounting system 1108 into subsystems $C_i$. In the thread $S_2$, resource subusage $U_2$ has passed the threshold $H_2$. The usual system enforcement action taken when a threshold is passed may be, for example, to prevent further writes to a file system domain. However, as can be seen in FIG. 11, depicted subsystem usages $U_i$ have not passed the corresponding sub-thresholds $H_i$ in the other illustrated threads: $S_0$, $S_t$, and $S_{N-1}$. Accordingly, although the subusage in the subsystem $C_2$ indicates that an enforcement action should be taken, the total usage U (summed over all threads) may be less than the threshold H, which indicates that no enforcement action should be taken. To avoid or reduce the likelihood this outcome, certain embodiments reorganize the accounting system into a new set of subsystems and reallocate the new subsystems among the threads $S_t$ when a subusage $U_t$ passes (or approaches) a subthreshold $H_t$. Reorganization may also occur if system properties and/or parameters change such as, for example, if the number N of threads and/or the threshold H change.

A. Quota Accounting System For A Distributed File System

Illustrative embodiments of systems and methods for resource usage management in the context of a quota accounting system for file system domains will now be discussed. The quota accounting system may be configured to track, for example, usage of storage capacity in a domain of a file system such as, for example, the domains $d_0$, $d_1$, and/or $d_2$ of the file system 700 described with reference to FIG. 7. The storage capacity in the domain may be measured via one or more metrics including, for example, physical space (for example, megabytes on a disk drive), logical space (for example, physical space less certain file system metadata) and/or number of files in the domain. In certain embodiments, logical space includes physical space less redundant space used for increased data protection (for example, mirroring, parity, and/or other metadata).

FIG. 12 illustrates an embodiment of an example of an accounting system $C_0$ (shown by reference numeral 1200a) for the domain $d_0$ that has been organized into three accounting subsystems $C_{00}$, $C_{01}$, and $C_{02}$ (shown by reference numeral 1200b), each of which tracks usage in a portion of the domain. In the context of a distributed file system, the accounting subsystems will be called "constituents." The constituents may be allocated among nodes of the distributed file system. A node may be allocated 0, 1, 2, 3, 5, 17, or any other number of constituents.

The domain $d_0$ tracked by the accounting system $C_0$ may be associated with one or more thresholds or "limits," any of which may be advisory, soft, or hard as described above with reference to FIG. 8. In this example, three limits are associated with the quota on the domain $d_0$. The physical limit of 2 gigabytes represents total physical space used to store the files and directories of the domain $d_0$. The file limit of 302 files represents the number of files in the domain $d_0$, and the logical limit of 1.5 gigabytes represents the physical space of the domain $d_0$ less certain file system overhead. Total current usage on the domain $d_0$ is 1 gigabyte.

As mentioned, the accounting system $C_0$ may be organized into the constituents $C_{0i}$, where the index i runs from 0 to N-1, where N is the number of constituents (3 in FIG. 12). Various methods for selecting the number N of constituents will be described more fully below. In some embodiments, the usage and limits of the domain are divided substantially equally among the constituents. If a quantity does not divide evenly, the quantity is divided as evenly as possible subject to the restriction that no lower-indexed constituent has a lower value than a higher-indexed constituent. For example, FIG. 12 illustrates the division of the usage and the physical, file, and logical limits among the three constituents $C_{0i}$.

FIG. 12 also illustrates examples of how the system handles pending transactions that change resource usage. In the accounting system 1200a, four pending transactions 1210 are pending. In some implementations, the transactions may comprise delta transactions, which provide incremental changes to the value of a data field and which permit the system to process multiple concurrent transactions (for example, see the discussion with reference to FIG. 1). FIG. 12 illustrates (in the column labeled Delta Operations Example) four example delta transactions 1210, which change the physical size of the quota domain by amounts (in megabytes): +20 MB, −100 MB, +300 MB, and +50 MB. As described above, in some embodiments, these four example concurrent delta transactions may be processed without regard to the order in which they were sent.

If the accounting system is organized into the constituents $C_{0i}$ (such as the system 1200b), the transactions 1210 are distributed to the constituents $C_{0i}$. FIG. 12 illustrates two examples 1210a and 1210b of how the transactions 1210 may be distributed 1210a and 1210b to the three constituents $C_{00}$, $C_{01}$, $C_{02}$ (see columns labeled Delta Operations Example 1 and Delta Operations Example 2). In some embodiments, the transactions 1210 are distributed randomly to the constituents, which advantageously causes the quota accounting processing load to be shared relatively evenly among the constituents.

It may be desirable for the quota domain accounting system to enforce "limit exactness," in which the usage level relative to the limits is known and in which the usage level takes account of, and does not exclude, pending modifications to the domain. By enforcing limit exactness, an accounting system advantageously can determine whether the current usage level violates any limit and take suitable action if the limit is violated. Enforcing limit exactness, however, may lead to disadvantages in some incremental computing systems that utilize delta transactions. For example, before the accounting system can determine the current usage, the system may stop ongoing transactions and wait for pending transactions either to commit or abort. This approach, however, may lead to serialization of the transactions.

To avoid or reduce the likelihood of serialization, certain embodiments of the accounting system use possible value ranges (PVRs) to track the upper and lower bounds of the possible range for the usage. The use of PVRs advantageously permits the system to process multiple concurrent delta transactions while enforcing limit exactness. In some embodiments, methods similar to the method 450 illustrated in FIG. 4B may be used to determine whether applying a delta to a constituent usage will cause an associated PVR boundary to pass a constituent usage limit. In one embodiment, pending delta transactions in which a boundary of the PVR does not pass the limit are permitted to complete, because such transactions will not cause a limit violation. However, if the pending delta transaction will cause a boundary of the PVR to cross a limit, the delta transaction is rejected. In this case, as will be further described below, the accounting system may take suitable action to reorganize the constituents.

Figure 13:
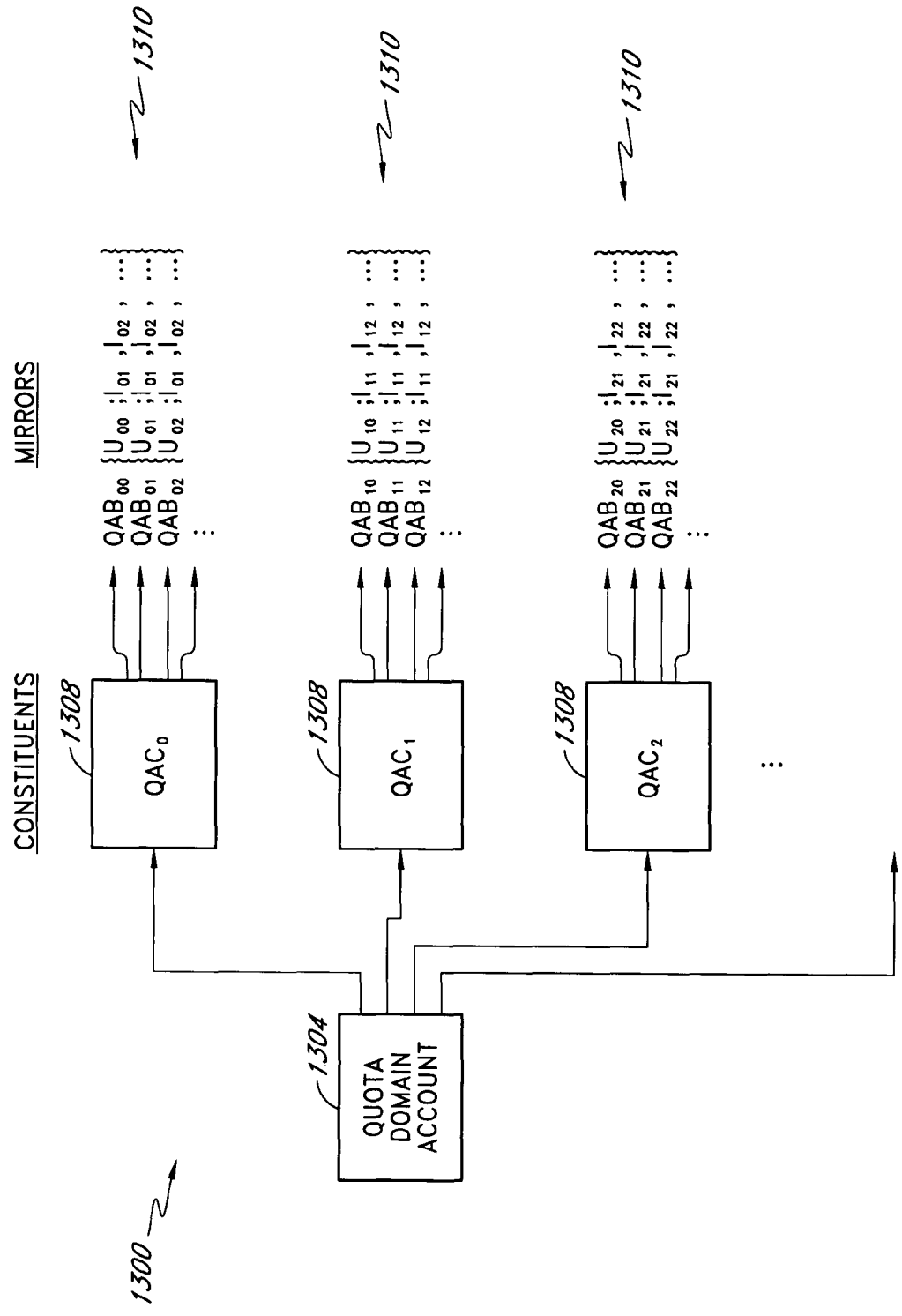
FIG. 13 illustrates an embodiment of an abstract data structure that can be used to implement a quota domain account for tracking resource usage for a quota domain.

FIG. 13 illustrates an embodiment of an abstract data structure 1300 that can be used to implement a quota domain account 1304 for tracking resource usage U for the quota domain. The resource may include, for example, physical space, logical space, and/or number of files in the quota domain. The quota domain account may have one or more limits (or thresholds) $l_j$, where index j runs from 1 to L, the number of limits. For example, in some embodiments, three limits (for example, an advisory, a soft, and a hard limit) are provided for each resource whose usage U is tracked.

The quota domain account 1304 is organized into a number N of quota account constituents 1308. In various embodiments, the number N may be fixed at system initiation or may be dynamically selected depending on system usages and limits. The constituents are labeled $QAC_i$, where index i runs from 0 to N-1. Each constituent $QAC_i$ tracks usage $U_i$ in a portion of the quota domain. As mentioned above, the resource usage U may be divided among the constituents so that $$\sum_{i=0}^{N-1} U_i = U.$$

Additionally, each constituent $QAC_i$ may have constituent limits $l_{ij}$ that may be determined according to $$\sum_{i=0}^{N-1} l_{ij} = l_j.$$

In certain embodiments, division of the resource usage U and the limits $l_j$ is made as equal as possible among the constituents to balance the processing load on the constituents.

The file system may provide increased protection for the integrity of file system data such as, for example, by providing error detection, and/or error correction including, for example, parity protection and/or mirrored protection. In some embodiments providing mirrored protection, identical copies of the files are mirrored on different nodes. For example, if a particular file system node fails, if a media error occurs on part of a storage device (for example, a disk drive), or if other file system problems occur, a mirrored file system advantageously enables the user to have continued access to information in the file by accessing a mirrored copy of the file. In many embodiments, the protection process is transparent to the user, who need not (and typically does not) know which nodes actually provide the data. The level of protection provided by mirroring may be denoted by a protection value P, which in some embodiments is an integer that reflects the number of independent mirrored versions of the file stored by the file system. For example, if a file system has "3×" protection, the value of P equals 3, meaning 3 identical versions of each file are maintained.

The quota domain account 1304 may provide mirroring in order to increase the integrity of the quota accounting. In some embodiments, each quota accounting constituent 1308 is mirrored P times. FIG. 13 illustrates mirroring of each constituent $QAC_i$ in P mirrored quota accounting blocks 1310. The quota accounting blocks are denoted as $QAB_{ik}$, where the index i runs over the number of constituents (for example, from 0 to N-1) and index k runs over the number of mirrors (for example, from 0 to P-1). Each quota accounting block $QAB_{ik}$ may be configured to track the usage $U_i$ and the limits $l_{ij}$ in the corresponding constituent $QAC_i$. In certain embodiments, the constituent limits are tracked and managed by the QAB data structures. In other embodiments, the constituent limits are tracked and managed by the constituents 1308 or by the quota domain account 1304.

As mentioned above, in some embodiments, the quota accounting blocks $QAB_{ik}$ are configured to manage usage of more than a single resource in a constituent $QAC_j$. For example, usage of resources such as physical space, logical space, and/or the number of files may be tracked in some or all of the constituents. In such embodiments, there may be a separate set of limits l for each resource usage that is tracked (for example, advisory, soft, and/or hard limits for physical space, advisory, soft, and/or hard limits for logical space, and so forth).

Figure 14:
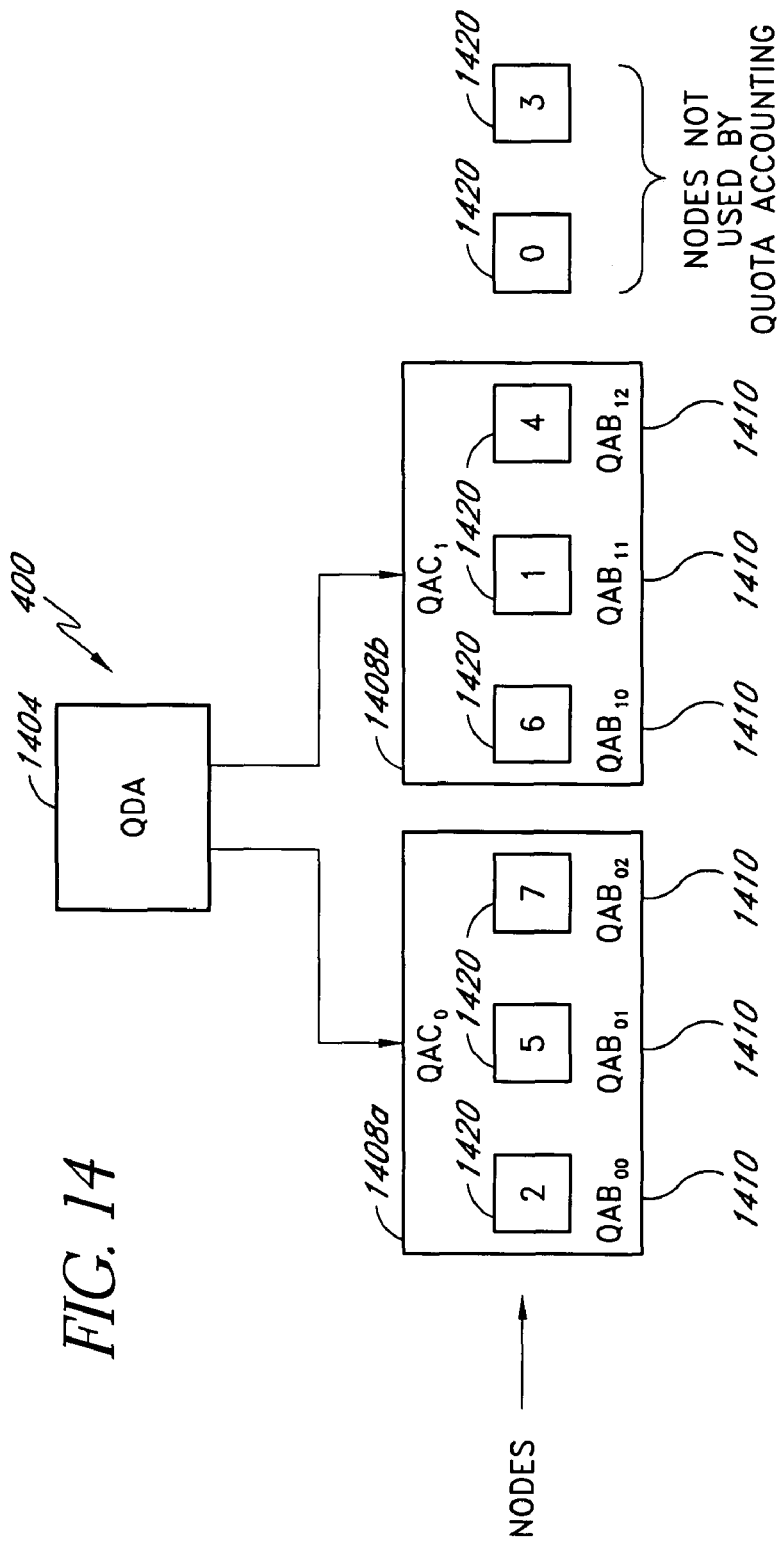
FIG. 14 illustrates an embodiment of an example allocation of quota account constituents and mirrored quota accounting blocks in a quota domain system.

FIG. 14 illustrates an embodiment of an example allocation of quota account constituents $QAC_i$ and mirrored quota accounting blocks $QAB_{ik}$ in a quota domain system 1404. In this example, the quota domain system 1404 is implemented on a distributed file system having 8 nodes 1420 and a protection level P=3. In certain embodiments, the number of constituents N is selected according to $$N = \left\lfloor \frac{\text{NODES}}{P} R \right\rfloor, \quad (1)$$

where NODES is the number of nodes, P is the protection level, and R is a tunable parameter that represents the maximum number of constituents per node in the file system. For example, the value R=1 provides 1 constituent per node, R=2 provides 2 constituents per node, and R=⅓ provides that roughly ⅓ of the nodes have a constituent. In Equation (1), the symbol ⌊ ⌋ represents the mathematical floor operator, which returns the largest integer less than or equal to its argument. In other embodiments, other mathematical functions (for example, ceiling, integer part, and so forth) may be used to determine the number of constituents. In the example illustrated in FIG. 14, Equation (1) demonstrates that there are 2 constituents 1408a and 1408b. Because file system provides 3× protection, each constituent 1408a, 1408b comprises three nodes, which may be selected randomly (with removal) from the available nodes. As depicted in FIG. 14, the constituent 1408a comprises the three nodes 2, 5, and 7, and the constituent 1408b comprises the three nodes 6, 1, and 4. The nodes 0 and 3 are not used by the quota domain accounting system 1404.

In some embodiments, if nodes are added to (or removed from) the file system, the quota domain accounting system 1404 may reorganize and utilize a new (and possibly different) number of constituents determined from Equation (1). For example, if 4 nodes were added to the file system illustrated in FIG. 14 (making a total of 12 nodes), Equation (1) indicates there should be 4 quota constituents. Each constituent would be mirrored 3 times; therefore, each node in the file system would be utilized by quota accounting.

B. Reorganization

Certain embodiments of the quota accounting system provide for reorganization of the constituents based on the occurrence of various events. Quota accounting systems may provide for several events that trigger reorganization. For example, if a request to modify resource usage in the quota domain causes constituent usage to pass a constituent limit (for example, from under-to-over quota or from over-to-under quota) or if the request causes a data value's PVR boundary associated with constituent usage to pass a constituent limit, then the accounting system may reorganize. Such reorganization may be appropriate, because although resource usage in a particular constituent may be near a quota limit, there may be adequate resources on the other constituents in the domain to support the request. By reorganizing the constituents, and their associated usages and limits, the accounting system advantageously will be able to more evenly balance the usage load among the constituents.

Figure 15:
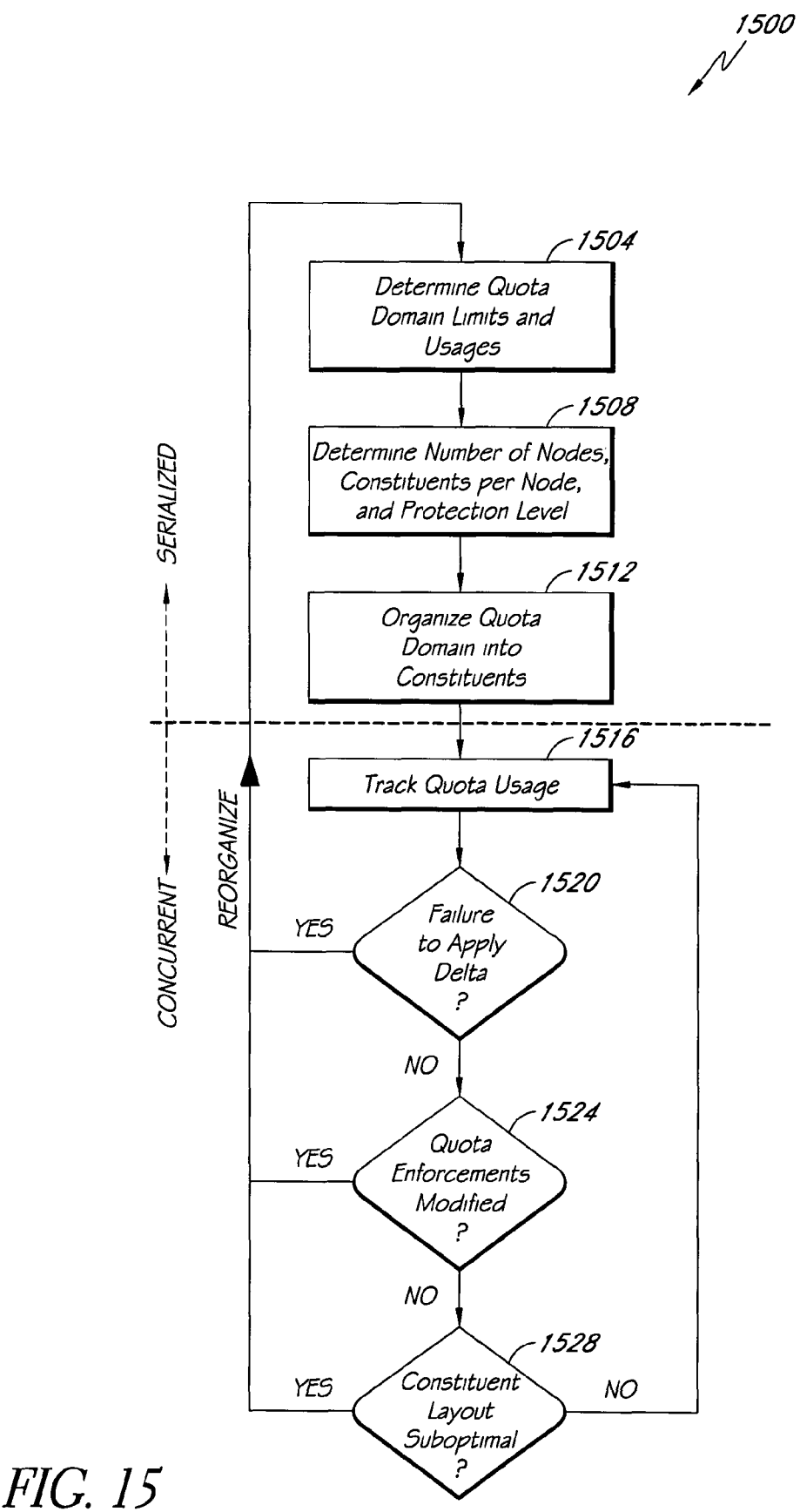
FIG. 15 is a flow chart that illustrates an embodiment of a constituent reorganization method for a quota accounting domain.

FIG. 15 is a flow chart that illustrates an embodiment of a constituent reorganization method 1500. The method 1500 may be implemented by a quota constituent module of the system module 210 of the computing system 200 illustrated in FIG. 2. In state 1504, the quota constituent module determines usages and limits among the current constituents. This information may be calculated and/or received from an administrator of the system. In state 1508, the module determines system information including, for example, the number of available nodes in the file system, the protection level, and other adjustable parameters (for example, the constituents per node parameter R). This information may be calculated and/or received from an administrator of the system. In state 1512, the quota constituent module organizes the quota domain account system into constituents. FIG. 14 discussed above provides one example of the organization of a quota domain accounting system organized into 2 constituents (each mirrored 3 times) on a file system having 8 nodes.

State 1516 represents the typical operating state of the accounting system, in which the quota constituent module tracks resource usage in each of the constituents. System embodiments utilizing incremental delta transactions and PVR usage ranges advantageously can process multiple concurrent transactions while enforcing limit exactness.

The quota constituent module monitors the status of the quota accounting system to determine whether an event has occurred that may trigger a reorganization of the constituents. FIG. 15 depicts three possible events, shown in states 1520, 1524, and 1528, that may trigger the quota constituent module to reorganize. In other embodiments, there may be fewer or greater reorganization events, and the events may be different from the illustrated examples.

State 1520 has been described above and represents the event where a request for resource modification is rejected because a limit would be passed (for example, by resource usage and/or by a PVR boundary). For example, in some embodiments, an incremental delta request that would cause constituent usage (or a PVR value associated with constituent usage) to pass a limit is rejected₁ and an error message is communicated to the quota constituent module. In response to the error message, the quota constituent module returns to state 1504 to reorganize the quota accounting system.

State 1524 represents events in which system parameters (for example, limits, PVRs, the R parameter, and so forth) have been changed. For example, if a PVR boundary associated with resource usage is modified₁ and the new PVR boundary is sufficiently "close" to (or passes) the nearest limit, the quota constituent module may return to state 1504 and reorganize the constituents. Reorganization caused by events in state 1540 advantageously handles cases where resource usage is increasing in a quota domain and the number of constituents should increase to provide better concurrency for resource requests. For example, in one embodiment, the number N of constituents grows in proportion to allocated resources, which beneficially provides that the file system resources allocated to the quota accounting blocks make up only a relatively small fraction of the total resources.

State 1528 represents any event in which the layout of the constituents on the nodes of the file system is suboptimal. The quota constituent module may track one or more heuristics that measure a quality factor for the constituent organization, and if the quality factor is suboptimal the module causes a return to state 1504 for reorganization. In certain embodiments, determination of whether the constituent layout is suboptimal is handled in state 1520.

Figure 16:
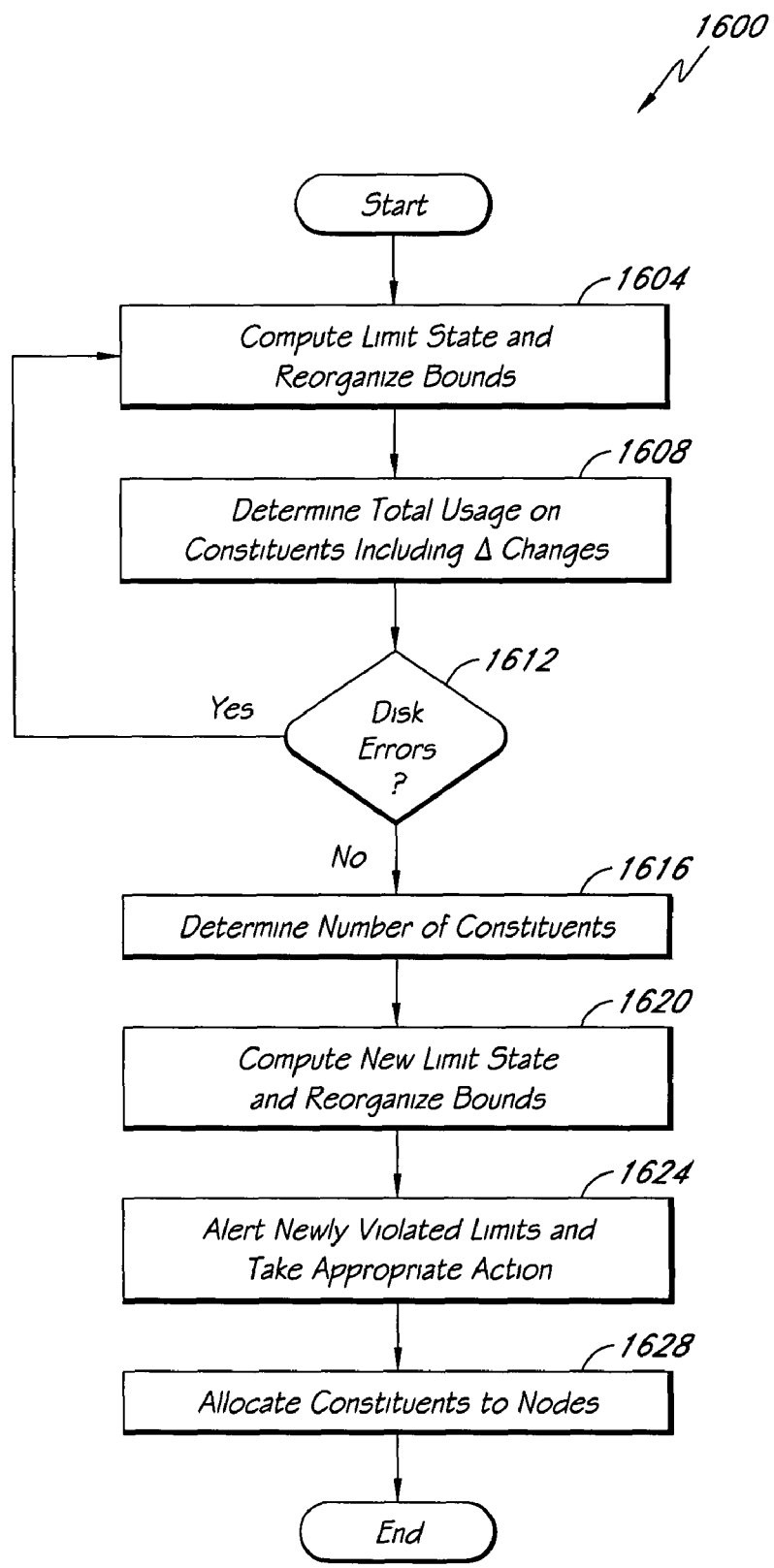
FIG. 16 is a flow chart that illustrates an embodiment of a method by which a quota constituent module can organize a quota domain into constituents.

FIG. 16 illustrates in more detail an embodiment of state 1512 of FIG. 15, in which the quota constituent module organizes the quota domain into constituents. In state 1604, the module determines the current limit state, which includes information identifying which, if any, limits have been violated on any of the constituents. In some embodiments, the limit state is represented as a bit state identifying the violated limits. For example, if no limits have been violated, the limit state is empty (or null). If one or more limits have been violated, the limit state comprises a set including the violated limits as members.

In some embodiments, the module also determines one or more reorganize bounds that represent usage levels at which reorganization should occur. For example, the reorganize bounds may comprise a pair of values, $[B_{low}, B_{high}]$, which designate a lower ($B_{low}$) and an upper ($B_{high}$) usage value (for example, measured in megabytes or number of files). In this example, if current resource usage passes $B_{low}$ from above or $B_{high}$ from below, the quota constituent module causes a reorganization to occur. In some embodiments, the reorganize bounds may be different from a limit range, which may be defined as a half-open interval $(l_{low}, l_{high}]$ having a lower limit $l_{low}$ and an upper limit $l_{high}$. A limit range may be defined, for example, by dividing the range from 0 to a suitable maximum value for each resource type (for example, physical, logical, files) by all the limits applicable to that resource type (including advisory, soft, and hard limits). In various embodiments, the maximum value, denoted by max_value, may be infinite or a suitably large value (for example, $2^{64}-1$ bytes for a physical or logical space limit). Returning to the example shown in FIG. 8, the domain $d_0$ has four limit ranges of [0, 1001 MB], (1001 MB, 1500 MB], (1500 MB, 2000 MB], and (2000 MB, max_value]. In this example, the first limit range [0, 1001 MB] is a closed at the lower usage boundary so that a domain having no usage (0 MB) does not violate usage quotas. In some embodiments, the reorganize bounds are selected to fall within a particular limit range, for example, $l_{low} \leq B_{low} \leq B_{high} \leq l_{high}$. Each limit range may have different reorganize bounds. An advantage of using reorganize bounds is that the quota constituent module can, if needed, force a reorganization to occur at suitable resource usage values within a limit range.

In state 1608, the quota constituent module determines the total usage U by combining the constituent usages $U_i$, after completion of pending incremental delta transactions. In state 1612, the module determines whether there are any disk errors such as, for example, errors caused by defective disk blocks in the storage 208 that cannot be written to or read from. Advantageously, these defective blocks can be identified and tracked so that no further reads or writes are performed therein. If disk errors are found, the module returns to state 1604 and 1608 and recomputes the limit state, reorganize bounds, and usage. State 1612 is optional in some embodiments, and in other embodiments, it may be performed less frequently than at every constituent reorganization.

In state 1616, the quota constituent module determines the number N of constituents, for example, by use of an algorithm such as Equation (1). Other algorithms for determining the number N of constituents will be described below. In state 1620, the module determines the new limit state and reorganize bounds for the number of constituents determined in state 1616. In state 1624, the module takes suitable action if there are any new limit violations (for example, if the limit state is not empty). In certain embodiments, the actions may include notifying the system administrator and/or user of the violation (for example, by e-mail), compressing old or less-frequently used files, moving files to a different storage device, and so forth.

Figure 17:
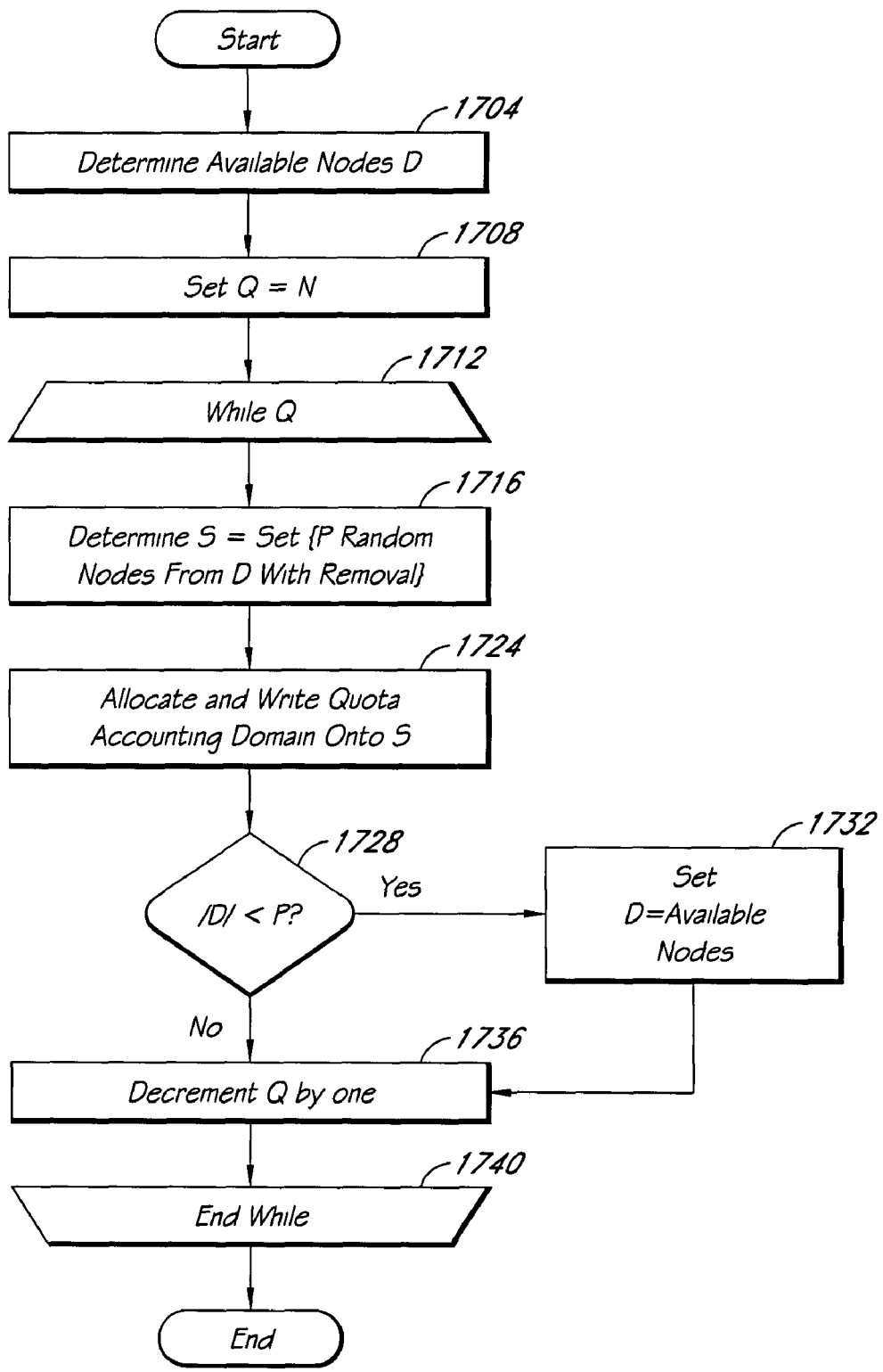
FIG. 17 is a flow chart that illustrates an embodiment of a method by which the quota constituent module can allocate the constituents to nodes of a file system.

In state 1628, the quota constituent module allocates the constituents to nodes of the file system. FIG. 17 is a flow chart that illustrates in more detail an embodiment of state 1628. In state 1704, the quota constituent module determines the availability of nodes on the file system to serve as constituents. The set of available resources on the nodes (for example, disks with space for allocating the quota accounting constituents) will be denoted by D, and the number of available nodes will be denoted by |D|. In state 1708, the quota constituent module initializes a counter Q to the number of constituents determined in state 1616 shown in FIG. 16. States 1712-1740 represent an iterative block that the quota constituent module performs while the counter Q is nonzero. In state 1716, the module determines a set of nodes S that will be used for a constituent. To account for mirroring, the set S comprises P nodes, which may be randomly chosen from the available nodes D. In other embodiments, other selection criteria may be used, such as, for example, round robin, least recently used, and so forth. The P nodes selected in state 1716 are removed from the set of available nodes D, and the number of available nodes |D| is decremented by P.

In state 1724, the quota constituent module allocates the quota accounting domain onto the set of nodes S. For example, the module may set up a quota domain accounting data structure such as described with reference to FIG. 13. In state 1728, the module checks whether the number of available nodes |D| is less than the protection level P. If |D| is not smaller than P, there are enough remaining nodes to allocate the next constituent (accounting for the protection level), and the module decrements the counter Q by one in state 1736 and returns to state 1712 if the counter is nonzero. However, in state 1728, if the number of available nodes |D| is smaller than the protection level P, then there are too few nodes remaining to provide a separate mirror on each node. In this case, the quota constituent module continues in state 1732, where the set D is equated to the currently available node resources. The quota constituent module then continues in state 1736 as described above and continues to allocate quota accounting domains onto the available nodes, each of which may be allocated more than one accounting domain.

C. Number of Constituents

When the quota accounting system is reorganized, the number N of constituents may be selected based at least in part on factors including, for example, the number of nodes, the protection level, and constituent usages relative to the limit ranges. In various embodiments, the quota accounting system may utilize one or more parameters to provide suitable control over how the number of constituents is determined. An example of one such parameter is the constituents per node parameter R (described above with reference to Eq. (1)), which can be set to provide an allocation of approximately R constituents per node.

In certain embodiments, the number N of constituents is fixed until a reorganization occurs. During the reorganization, the quota constituent module (in state 1616 shown in FIG. 16) determines an updated number of constituents based on current system properties. The updated number may be the same as, less than, or greater than the previous number of constituents.

Figure 18:
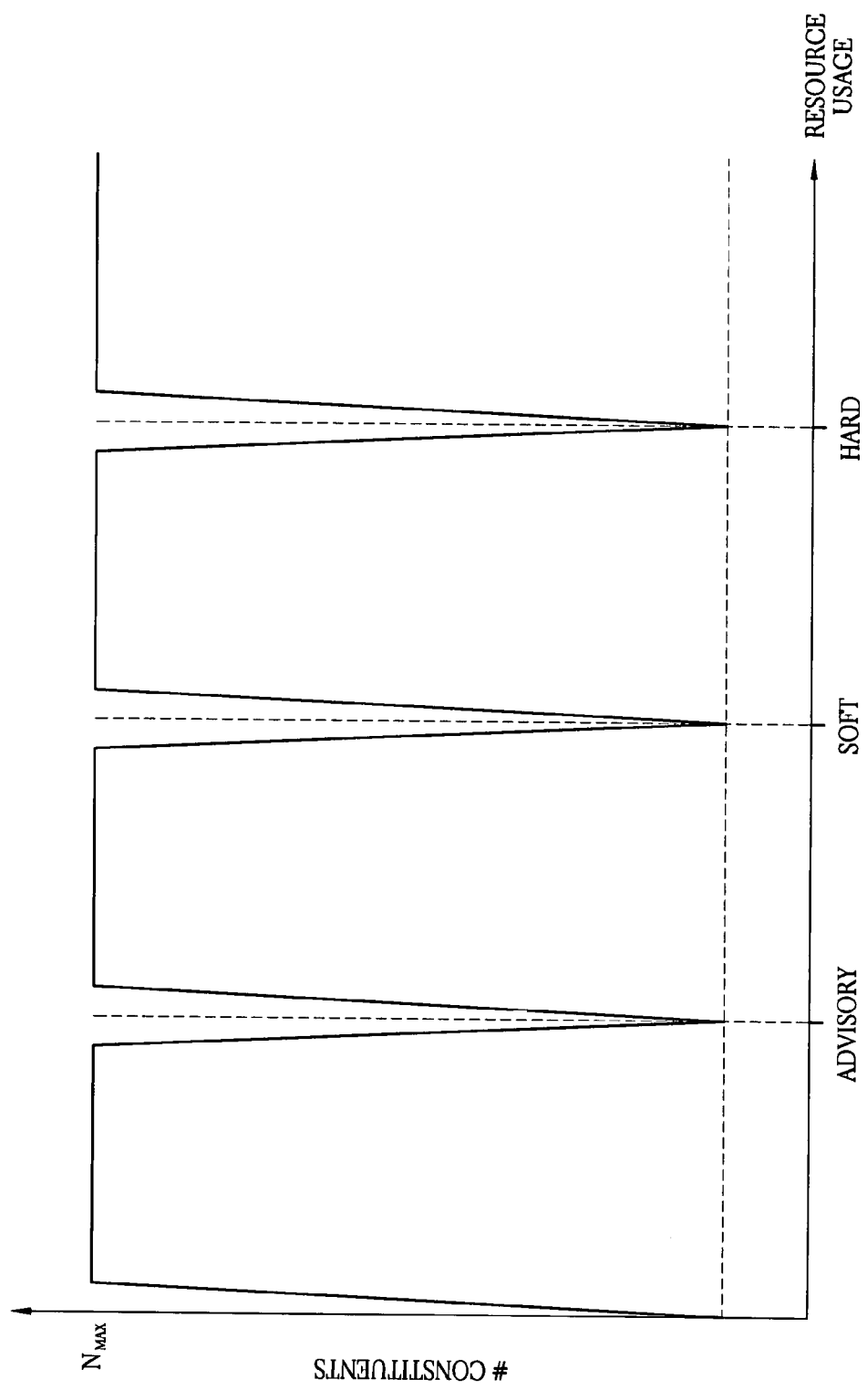
FIG. 18 is a graph schematically illustrating one example embodiment of how the number of constituents may depend on proximity of resource usage to a limit, such as, for example, an advisory, a soft, or a hard limit.

FIG. 18 is a graph schematically illustrating one example embodiment of how the number of constituents may depend on proximity of resource usage to a limit, such as an advisory, soft, or hard limit. In this example, the number of constituents can range between a minimum of one and maximum of $N_{max}$. In some embodiments, the maximum number $N_{max}$ is determined from Equation (1). As seen in FIG. 18, the number of constituents decreases (to the minimum of one) as the resource usage nears any of the limits, which advantageously reduces the likelihood of processing bottlenecks as the limit is passed. In some embodiments, as the usage nears a limit, the number of constituents linearly ramps down to one. For example, in an embodiment, the number of constituents is determined according to N=max(min($N_{max}$, Span), 1), where Span measures the "distance" of the resource usage from the nearest limit, and max and min are mathematical maximum and minimum functions, respectively. In one embodiment, if the usage is U and the nearest limit is l, then the Span may be defined as Span=floor(abs(U−l)/span_size), where floor has been defined above and abs is absolute value. The adjustable parameter span_size may depend on factors including the resource type (for example, physical, logical, or files) and the limit type (for example, advisory, soft, or hard). The slope of the linear ramps near the limits in FIG. 18 is inversely proportional to the magnitude of the parameter span_size. If span_size is selected to be sufficiently large, the number of constituents will remain near one, because, in general terms, the usage will be within one "Span" of the limit at substantially all times. Conversely, if span_size is selected to be sufficiently small, the number of constituents will remain near $N_{max}$ except for a relatively narrow region near the limit. In other embodiments, the number of constituents as a function of "Span" may be selected differently such as, for example, by selecting nonlinear functions to ramp down the number of constituents as usage nears a limit.

It will be recognized that during a reorganization, the number N of constituents may be selected based on a wide variety of mathematical functions, heuristics, goals, parameters, and so forth. Three example reorganize modes will now be described: "singleton," "linear," and "1-or-N."

1. Singleton Mode

In this mode, the number N of constituents is always equal to one. When reorganization occurs, the new quota accounting domain may be randomly assigned to a node (which may differ or be the same as the previous accounting node).

In embodiments using reorganize bounds, the bounds may be set to match the limit range currently bounding the usage: $B_{low}=l_{low}$ and $B_{high}=l_{high}$. FIG. 19A is one embodiment of a graph that illustrates that the number of constituents in the singleton mode is always one, regardless of the "distance" of the resource usage from any of the limits (for example, Span).

2. Linear Mode

In linear mode, the "distance" of the resource usage U from the nearest bound of the limit state ($l_{low}$, $l_{high}$] is measured by the Span variable according to:

$$\text{Span} = \left\lfloor \frac{\min(\text{abs}(l_{high} - U), \text{abs}(U - l_{low}))}{\text{span\_size}} \right\rfloor \quad (2)$$

For example, if the span_size is 10 MB, the current usage U=75 MB, and the limit state is (20 MB, 100 MB], then Equation (2) indicates the Span is 2. In linear mode, the number N of constituents is equal to the current Span, bounded by the range [1, $N_{max}$], for example, N=max(min (Span, $N_{max}$), 1). FIG. 19B is one embodiment of a graph that illustrates the number of constituents that will be selected during a linear mode reorganization as a function of the Span at the time of the reorganization. Note that since the number of constituents is held fixed at other times, the graph in FIG. 19B (and FIG. 19C) is not a dynamic representation of the actual number of constituents in the quota domain accounting system at any particular Span value. FIG. 20B, to be discussed below, illustrates such a dynamic representation of the number of constituents as a function of usage.

If the accounting system uses reorganize bounds, the bounds are determined in the following manner in some embodiments. The bounds may be set differently based on which of the limits is "nearest" to the current usage U and whether changes in usage are moving current usage U toward or away from the nearest limit. In some implementations, the reorganize bound in the direction of the near limit is set equal to the limit itself. A rationale for this selection is that choosing a bound with a smaller value would cause unnecessary reorganizations to occur as the limit is approached.

The reorganize bound in the direction of the far limit may be set differently depending upon whether the new number of constituents is equal to $N_{max}$. In some embodiments, if the new number of constituents is $N_{max}$, then the reorganize bound is set equal to the value of the far limit, because more frequent reorganization will not provide additional constituents since the number of constituents is already at the maximum value $N_{max}$. On the other hand, if the current number N of constituents is less than the maximum $N_{max}$, the reorganize bound B may be set equal to B=U+(N*span_size)/F, where F is a tunable ratio in the range (0, 1]. The parameter F represents a minimum average constituent utilization in the direction of the far limit in order to approximately double the number of constituents when reorganization occurs. For example, if F is set equal to ½, an average constituent utilization in the direction of the far limit of about 50% will result in approximately doubling the number of constituents at the next reorganization. If F is set equal to ¼, an average constituent utilization of only about 25% will result in approximately doubling the number of constituents at the next reorganization. A possible advantage of this choice for the value of the reorganize bound in the direction of the far limit is that by approximately doubling the number of constituents at a reorganization, the system performance may also approximately double, at least in cases where the number of constituents is a performance bottleneck. Additionally, if a resource user is rapidly writing a large amount of data, the user may reach the next reorganization point in about the same time it took to reach the previous reorganization point, even though twice as much data is being written.

3. 1-Or-N Mode

In 1-or-N mode, the number of constituents is 1 if the current Span is less than $N_{max}$ and is $N_{max}$ otherwise. In terms of the well-known ternary ?: operator, the number of constituents can be written N=(Span<$N_{max}$)? 1: $N_{max}$. In some embodiments, the Span is determined from Equation (2). FIG. 19C is one embodiment of a graph that illustrates the number of constituents that will be selected during a 1-or-N mode reorganization as a function of the Span at the time of the reorganization.

If the accounting system uses reorganize bounds, the bounds are determined in the following manner in some embodiments. The bound nearest the current usage U is selected using the algorithm for the linear mode. The bound farthest from the current usage is also selected using the linear mode algorithm, if the number of constituents is equal to the maximum $N_{max}$. If, instead, the current number of constituents is 1, the far bound is determined as B=U+N*span_size, which provides that reorganization will not occur until the distance from the near limit is sufficiently large to ensure that the next reorganization results in $N_{max}$ constituents.

D. Example of Linear Mode Reorganization

Figures 1, 20A:
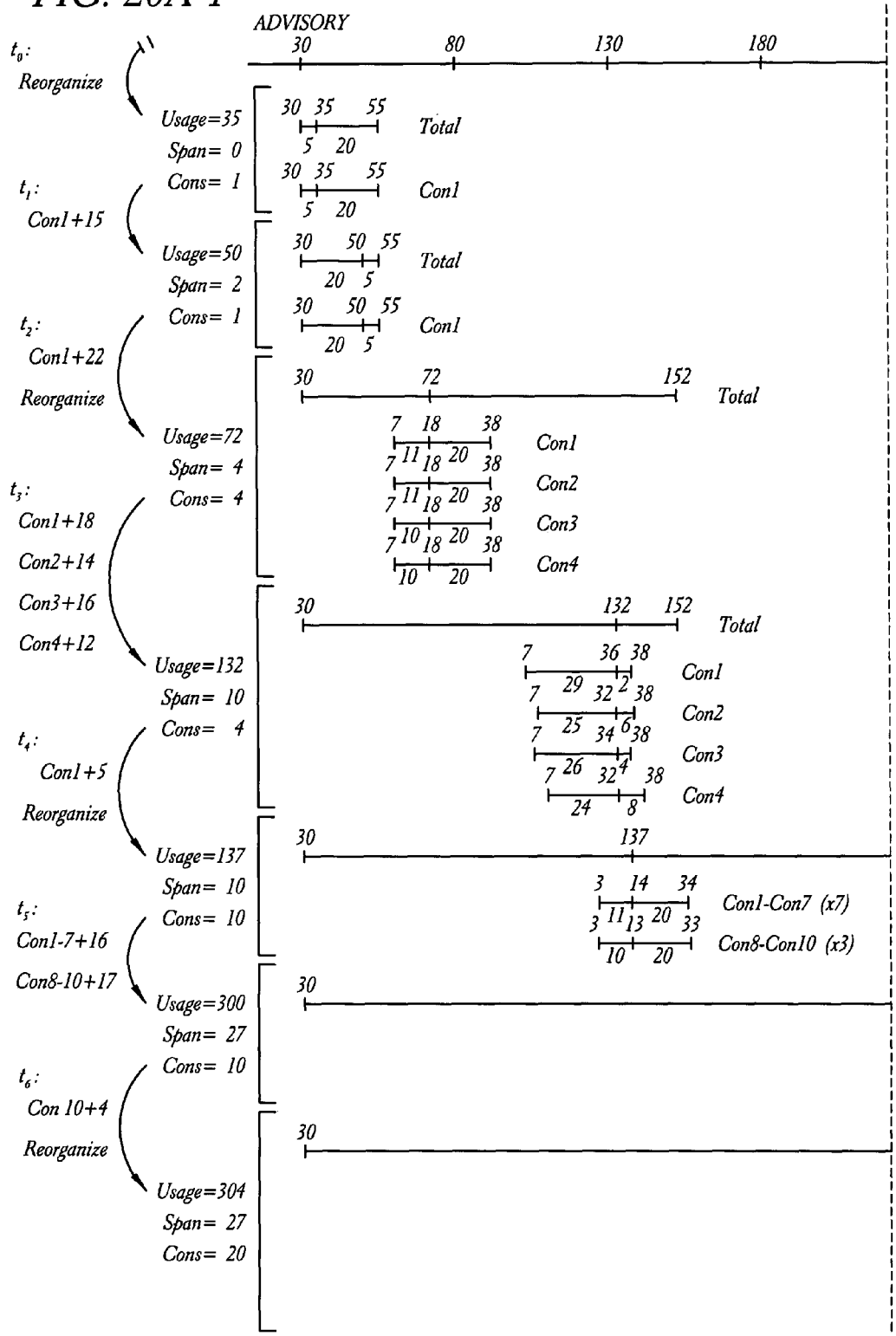
FIG. 20A is one example of a chart that illustrates properties related to the constituents of the quota accounting system at six snapshots in a time period during which several linear mode reorganizations occur.
Figures 2, 20A:
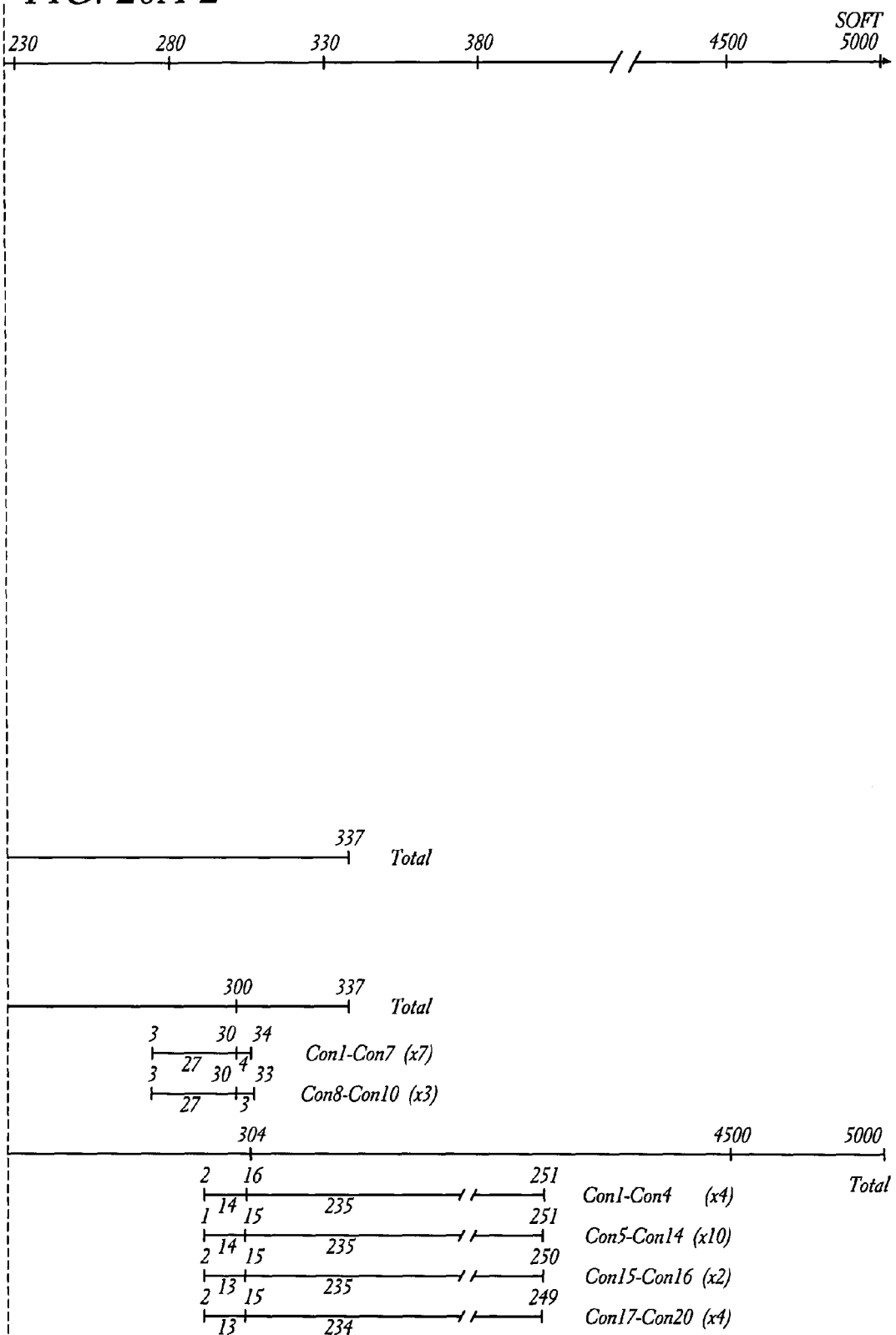

FIGS. 20A and 20B illustrate one embodiment of an example of linear mode reorganization on a distributed file system having a maximum number of constituents $N_{max}$=20 (for example, a 40 node cluster having 2× protection or a 60 node cluster having 3× protection). FIG. 20A is a chart that illustrates properties related to the constituents of the quota accounting system at six snapshots in time. The initial time is $t_0$, and the six snapshots occur at times $t_1$, $t_2$, $t_3$, $t_4$, $t_5$, and $t_6$.

During the timeframe shown in FIG. 20A, the quota constituent module coordinates three reorganizations at times $t_2$, $t_4$, and $t_6$ following an initial reorganization at $t_0$. This example is intended to illustrate some of the features and aspects of linear mode reorganization but is not intended to be limiting.

FIG. 20B is a graph that shows the number of constituents as a function of usage for the example system illustrated in FIG. 20A. The number of constituents starts at 1 and increases to 4, 10, and 20 following the 3 reorganizations. The usage at each reorganization is marked on the graph (for example, 72, 137, and 304). The graph demonstrates that the actual number of constituents in the file system at any time (for example, at any particular usage value on the graph) is not a direct mapping from the graph of the number of constituents versus Span illustrated in FIG. 19B. The actual number of constituents at any usage value can depend on the history of resource usage and previous numbers of constituents at earlier reorganizations.

Returning to the chart in FIG. 20A, the horizontal axis measures resource usage (in megabytes). The example quota accounting system includes an advisory limit at 30 and a soft limit at 5000; accordingly, the limit state for this system is (30, 5000]. The parameter span_size equals 10. The current Span may be calculated using the span_size parameter, the total usage for a given snapshot in time, and the current limits in the limit state (30 and 5000). Reorganize bounds $B_{low}$ and $B_{high}$ are determined according to the algorithm discussed above for the linear mode. At the top of FIG. 20A is the snapshot at the initial time to, and subsequent snapshots are displaced downward from the initial snapshot. Marked vertically along the chart at each of the times $t_i$ are the current usage, the Span (for example, determined from Eq. (2)), and the number of constituents ("Cons"). For example, at initial time to, the system has reorganized with a total usage of 35, 1 constituent, and the Span is 0.

For each snapshot, the horizontal bar marked "Total" depicts the usage and the reorganize bounds for the total quota domain. Below the "Total" bar are one or more bars showing usage and reorganize bounds for each of the constituents in existence at that snapshot. The constituent bars are labeled as "Con" followed by a numeral indexing the constituents. For readability at times $t_4$-$t_6$ where there are relatively many constituents, constituent bars having identical properties have been grouped together (for example, "Con1-Con7" at time $t_4$) and further labeled with a parenthetical indicator for the number of constituents in the grouping (for example, "x7"). Above each horizontal bar (whether for "Total" or "Con"), the reorganize bounds and the current usage are shown. Below each horizontal bar, the "distances" of the current usage from the low and high reorganize bounds are shown. As can be seen in FIG. 20A, at time $t_0$, the initial usage of 35 is between the lower reorganize bound (30) and the upper reorganize bound (50). In this case, the lower reorganize bound equals the value of the nearest limit (the advisory limit at 30), and the upper reorganize bound can be determined using the linear mode algorithm as $B_{high}$=U+N* span_size/F=35+1*10/(½)=55, where a minimum average constituent utilization of F=½ has been selected for this example. The distance between the usage and the reorganize bounds is 5 (to the lower bound) and 20 (to the upper bound). Similar calculations can be performed at each of the other snapshots using the information in the chart in FIG. 20A.

The state of the accounting system changes from snapshot-to-snapshot as incremental delta transactions are received and processed by the constituents. The left side of the chart shows the delta transaction(s) and the node(s) assigned to handle the transaction(s) at each snapshot. For example, moving from the initial state at $t_0$ to the first snapshot at $t_1$, constituent "Con1" processes an incremental delta transaction increasing usage by 15 megabytes ("+15"). This transaction causes usage to increase from 35 to 50, and span to increase from 0 to 2. The next delta transaction "+22" at time $t_2$ is processed by constituent "Con1" and causes the usage to increase to 72, which is above the upper reorganize bound at 55. Accordingly, the quota constituent module causes the quota accounting domain to reorganize.

Using the linear algorithm, the number of constituents after reorganization at time $t_2$ is equal to 4, because the Span (equal to 4) is less than the maximum number of constituents (equal to 20). The new upper reorganize bound for the total domain is 152 (for example, 72+4*10/(½)). FIG. 20A illustrates individual usages and reorganize bounds for the four constituents "Con1"-"Con4." As discussed above, the constituent usages and bounds are divided as equally as possible among the constituents. The graph in FIG. 20B illustrates the increase in the number of constituents from 1 to 4 at the usage level of 72.

At time $t_3$, each of the four constituents processes a delta transaction that increases the total usage to 132. Usage in each constituent remains below the corresponding reorganize bound. At time $t_4$, the first constituent "Con1" receives a delta request of "+5," which is sufficient to cause the usage to exceed the upper reorganize bound in the first constituent. Accordingly, the quota constituent module again reorganizes the quota accounting domain—this time into 10 constituents (see also the graph in FIG. 20B). At time $t_5$, the ten constituents receive delta requests that can be processed without causing any constituent usage to pass a corresponding constituent bound. The total usage increases to 300.

The final illustrated delta transaction at time $t_6$ is sufficient to increase usage in constituent "Con10" above the reorganize bound, so the quota constituent module causes a third reorganization at this time. The total usage (304) is sufficiently far from the lower reorganize bound, that the Span (27) exceeds the maximum number of constituents (20). Accordingly, the number of constituents increases to the maximum number $N_{max}$ rather than the Span. FIG. 20B illustrates the increase in constituents from 10 to 20 at the third reorganization at a usage value of 304. Because the number of constituents has reached its maximum value, the upper reorganize bound is set equal to the far limit, which in this case is the soft limit at 5000.

Further delta transactions at times beyond $t_6$ that increase the usage will not increase the number of constituents, which has reached its maximum value. If usage continues to increase and the soft limit at 5000 is approached, further reorganizations will reduce the number of constituents. Near the soft limit, the number of constituents may reach the minimum value of 1.

VI. Other Embodiments

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A method of implementing domain quotas within a data storage system, comprising:
   receiving at least one quota related to a size of a data domain, wherein the data domain associates a subset of data storage within a data storage system, wherein the size_measures the subset, and wherein the at least one quota defines a threshold size for the data domain;
   receiving a data transaction;
   computing a domain usage value based on the data transaction in combination with a subset of other pending data transactions;
   if the domain usage value, determined by execution of instructions by a processor, passes the at least one quota, disallowing the data transaction until the other pending data transactions have resolved; and then,
   while postponing subsequent data transactions, permitting the data transaction; and
   computing, respectively, a maximum possible size or a minimum possible size of the data domain based on the permitted data transaction, wherein the maximum possible size or the minimum possible size is used for determining whether a subsequent domain usage value based on the subsequent data transactions passes the at least one quota or a different quota.

2. The method of claim 1, if it is determined that the domain usage value passes the at least one quota, further comprising permitting the data transaction and sending a notification that the at least one quota has been passed.

3. The method of claim 1, if it is determined that the domain usage value passes the at least one quota, further comprising permitting the data transaction and monitoring a condition associated with the size of the data domain being past the at least one quota.

4. The method of claim 3, wherein the condition is an amount of time that the size of the data domain is past the at least one quota.

5. The method of claim 1, if it is determined that the domain usage value passes the at least one quota, further comprising denying the data transaction.

6. The method of claim 1, wherein the domain usage value comprises a maximum possible size or a minimum possible size of the data domain, the method further comprising comparing the maximum possible size or the minimum possible size to the at least one quota.

7. The method of claim 1, wherein the data storage system is associated with at least one of the following: a distributed storage system, a file system, and a distributed file system.

8. The method of claim 1, wherein the data transaction and the other pending data transactions are uncommitted, concurrent transactions.

9. The method of claim 1, wherein the at least one quota is specific to at least one of the following: whether the data transaction either increments or decrements the size of the data domain, the data domain, a subset of a combination of the data transaction and the other pending data transactions.

10. The method of claim 1, further comprising, if permitting the data transaction causes the at least one quota to pass the threshold size of the data domain, performing at least one of the following: sending an advisory notice that the threshold has been passed and keeping a reference associated with a time at which the threshold is passed.

11. A non-transitory computer-readable medium having instructions stored thereon for implementing, when the instructions are executed, domain quotas within a data storage system, the non-transitory computer-readable medium comprising_instructions for:
   receiving at least one quota related to a size of a data domain, wherein the data domain associates a subset of data storage within a data storage system, wherein the size_measures the subset, and wherein the at least one quota defines a threshold size for the data domain;
   receiving a data transaction;
   computing a domain usage value based on the data transaction in combination with a subset of other pending data transactions;

if the domain usage value passes the at least one quota,
disallowing the data transaction until the other pending data transactions have resolved; and then,
while postponing subsequent data transactions,
permitting the data transaction; and
computing, respectively, a maximum possible size or a minimum possible size of the data domain based on the permitted data transaction, wherein the maximum possible size or the minimum possible size is used for determining whether a subsequent domain usage value based on the subsequent data transactions passes the at least one quota or a different quota.

12. A system for implementing domain quotas within a data storage system, the system comprising:
a processor configured to execute a quota module;
the quota module configured to:
receive at least one quota related to a size of a data domain, wherein the data domain associates a subset of data storage within a data storage system, wherein the size measures the subset, and wherein the at least one quota defines a threshold size for the data domain;
receive a data transaction;
compute a domain usage value based on the data transaction in combination with a subset of other pending data transactions;
if the domain usage value passes the at least one quota, disallow the data transaction until the other pending data transactions have resolved; and then,
while postponing subsequent data transactions,
permit the data transaction; and
compute, respectively, a maximum possible size or a minimum possible size of the data domain based on the permitted data transaction, wherein the maximum possible size or the minimum possible size is used to determine whether a subsequent domain usage value based on the subsequent data transactions passes the at least one quota or a different quota.

13. The system of claim 12, if the domain usage value passes the at least one quota, the quota module further configured to disallow the data transaction until the other pending data transactions have resolved, and then to permit the data transaction and to send an advisory notice that the size of the data domain has passed the at least one quota.

14. The system of claim 12, if the domain usage value passes the at least one quota, the quota module further configured to disallow the data transaction until the other pending data transactions have resolved, and then to permit the data transaction and to monitor a condition associated with the size of the data domain being past the at least one quota.

15. The system of claim 14, wherein the condition is an amount of time.

16. The system of claim 12, if the domain usage value passes the at least one quota, the quota module further configured to permit the data transaction and to determine whether a subsequent domain usage value based on subsequent data transactions passes a different quota from the at least one quota.

17. The system of claim 12, wherein the system is at least one of the following: a distributed storage system, a file system, and a distributed file system.

18. The system of claim 12, further comprising:
a persistent storage;
the processor further configured to execute a journal module, the journal module configured to store in the persistent storage the data transaction after determining the domain usage value passes the at least one quota.

19. The system of claim 12, wherein the data transaction is associated with an incremental value of the size of the data domain, the system further comprising:
a persistent storage;
the processor further configured to execute a journal module, the journal module configured to store in the persistent storage the data transaction until the data transaction either commits or aborts,
wherein the quota module is further configured to compute a maximum possible size or a minimum possible size of the data domain based on the incremental value of the data transaction that committed or aborted.

* * * * *

UNITED STATES PATENT AND TRADEMARK OFFICE
CERTIFICATE OF CORRECTION

PATENT NO. : 7,900,015 B2  
APPLICATION NO. : 11/787117  
DATED : March 1, 2011  
INVENTOR(S) : Neal T. Fachan et al.

Page 1 of 1

It is certified that error appears in the above-identified patent and that said Letters Patent is hereby corrected as shown below:

Title Page 5, Item (56) under OTHER PUBLICATIONS, column 2, line 20, change "11/787,2251" to --11/787,225--;

Column 10, line 20, change "Vista@ ," to --Vista@,--;

Column 21, line 25, change "embodiment" to --embodiments--;

Column 22, line 25, change "do" to --$d_0$--;

Column 22, line 45, change "delta_cmd_$_{T0}$" to --delta_cmd_$T_0$--;

Column 26, line 35, change "used$_1$" to --used,--;

Column 27, line 3, change "$S_i$" to --$S_1$,--;

Column 31, line 35, change "rejected$_1$" to --rejected,--;

Column 31, line 42, change "modified$_1$" to --modified,--;

Column 33, line 15, change "used$_1$" to --used,--;

Column 33, line 23, change "nodes." to --nodes--;

Column 36, line 29, change "to," to --$t_0$,--;

Column 36, line 34, change "to," to --$t_0$,--;

Column 37, line 65, in Claim 1, change "size_measures" to --size measures--;

Column 38, line 58, in Claim 11, change "comprising_instructions" to --comprising instructions--; and Column 38, line 62, in Claim 11, change "size_measures" to --size measures--.

Signed and Sealed this  
Twenty-seventh Day of December, 2011

David J. Kappos  
*Director of the United States Patent and Trademark Office*